United States Patent
Meyer et al.

(10) Patent No.: US 7,897,277 B2
(45) Date of Patent: Mar. 1, 2011

(54) REVERSIBLE BATTERY CARTRIDGE

(75) Inventors: Craig S. Meyer, Fenton, MO (US);
Peter F. Hoffman, Avon, OH (US);
Joseph P. Gardner, North Ridgeville, OH (US); Daniel L. Stuckey, Lake Saint Louis, MO (US); David A. Furth, Skaneateles, NY (US)

(73) Assignee: Eveready Battery Company, Inc., St. Louis, MO (US)

( * ) Notice: Subject to any disclaimer, the term of this patent is extended or adjusted under 35 U.S.C. 154(b) by 587 days.

(21) Appl. No.: 11/718,150

(22) PCT Filed: Jan. 30, 2007

(86) PCT No.: PCT/US2007/061285

§ 371 (c)(1),
(2), (4) Date: Apr. 27, 2007

(87) PCT Pub. No.: WO2007/090112

PCT Pub. Date: Aug. 9, 2007

(65) Prior Publication Data

US 2009/0154148 A1      Jun. 18, 2009

Related U.S. Application Data

(60) Provisional application No. 60/803,761, filed on Jun. 2, 2006, provisional application No. 60/763,238, filed on Jan. 30, 2006.

(51) Int. Cl.
*H01M 2/10* (2006.01)

(52) U.S. Cl. .................... 429/100; 429/9; 429/123

(58) Field of Classification Search ............... 429/9, 429/96–100, 123, 159, 179
See application file for complete search history.

(56) References Cited

U.S. PATENT DOCUMENTS

| 3,192,378 | A |   | 6/1965  | Oldenburger |
| 3,217,224 | A |   | 11/1965 | Sherwood |
| 3,486,944 | A | * | 12/1969 | O'Donnell et al. ............ 429/99 |
| 5,164,761 | A |   | 11/1992 | Isono et al. |

(Continued)

FOREIGN PATENT DOCUMENTS

CA         2097982 A1    12/1994

(Continued)

OTHER PUBLICATIONS

Exhibit A, "Intermatic 3-In-1 Light", Photographed Aug. 31, 2007, 3 pp.

(Continued)

*Primary Examiner*—Stephen F Husar
(74) *Attorney, Agent, or Firm*—Gregory J. Adams

(57) ABSTRACT

A lighting apparatus includes an electrical contact that receives power from an external power source, a battery receiving region, and a battery backed light source. A user interface receives an input indicative of a first desired operation of the lighting apparatus when power is available from the AC power source and a second desired operation of the battery backed light source in the absence of power from the AC power source. Electrical circuitry uses battery power to operate the battery backed light source in the absence of power from the AC power source based on the second desired operation.

9 Claims, 40 Drawing Sheets

U.S. PATENT DOCUMENTS

| | | | |
|---|---|---|---|
| 5,183,712 A * | 2/1993 | Beldock et al. ............... 429/9 |
| 5,272,606 A | 12/1993 | Blaney |
| 5,645,341 A | 7/1997 | Liao |
| 5,763,872 A | 6/1998 | Ness |
| D411,326 S | 6/1999 | Roorda |
| 6,050,708 A | 4/2000 | Roorda |
| 6,508,566 B1 | 1/2003 | Roorda |
| 6,676,274 B1 | 1/2004 | Rafferty |
| 6,762,583 B2 | 7/2004 | Ho et al. |
| 6,989,217 B2 | 1/2006 | Suto |
| 7,183,014 B2 | 2/2007 | Sasaki et al. |
| 7,298,113 B2 | 11/2007 | Orikasa |
| 2002/0158605 A1 | 10/2002 | Sharrah et al. |
| 2003/0003349 A1 | 1/2003 | Reise |
| 2003/0146735 A1 | 8/2003 | Barbeau |
| 2004/0264187 A1 | 12/2004 | Vanderschuit |
| 2005/0194930 A1 | 9/2005 | Barbeau |
| 2005/0269987 A1 | 12/2005 | Lin |
| 2006/0262545 A1 | 11/2006 | Piepgras et al. |
| 2006/0278816 A1 | 12/2006 | Booty |
| 2007/0014105 A1 | 1/2007 | Noguchi et al. |

FOREIGN PATENT DOCUMENTS

| | | |
|---|---|---|
| DE | 29723182 U1 | 6/1998 |
| GB | 2207744 A | 2/1989 |
| GB | 2380541 A | 4/2003 |
| GB | 2401262 A | 11/2004 |
| GB | 2415494 A | 12/2005 |
| JP | 2002218038 A | 8/2002 |
| WO | 02/01923 A1 | 1/2002 |

OTHER PUBLICATIONS

Communication pursuant to Article 94(3) EPC, for Application No. 07710384.4, mailed Jul. 24, 2009, European Patent Office, Netherlands.

Patent Cooperation Treaty (PCT), International Search Report and Written Opinion for Application No. PCT/US2007/070072, Filed May 31, 2007, Mailed Mar. 28, 2008, European Patent Office, Netherlands.

* cited by examiner

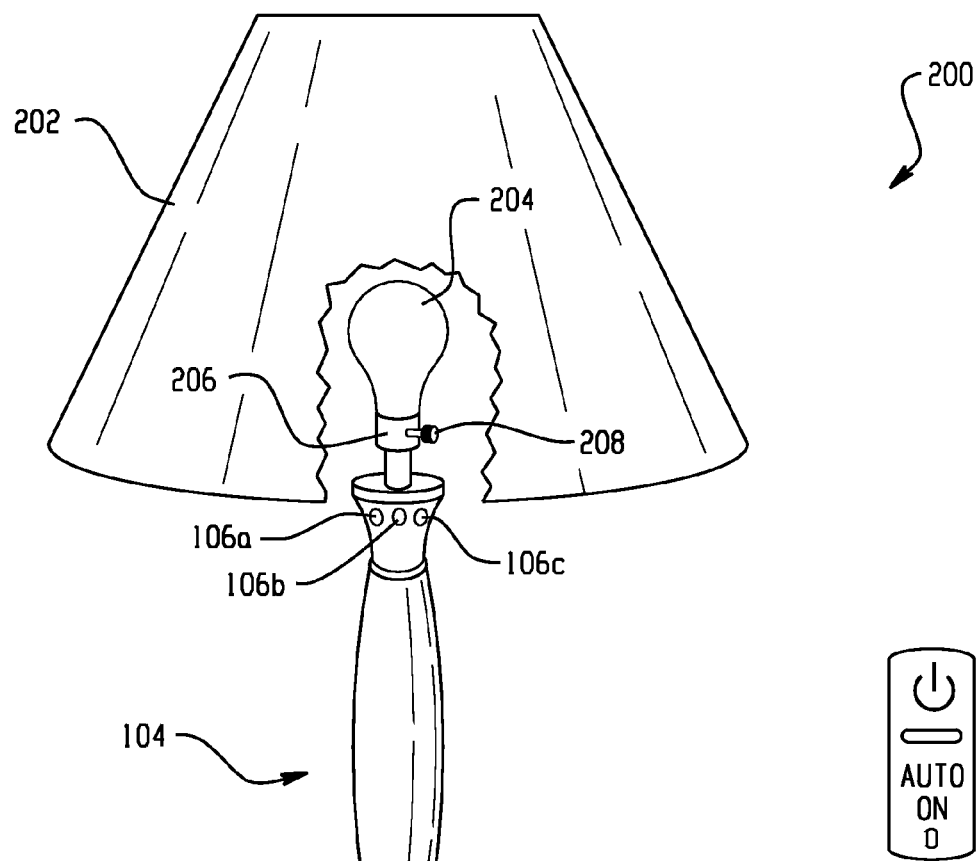
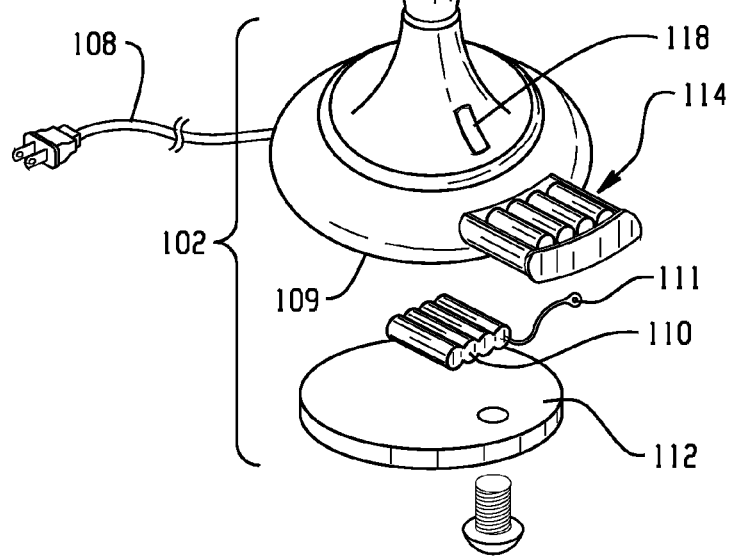
Fig. 3A
Fig. 3B

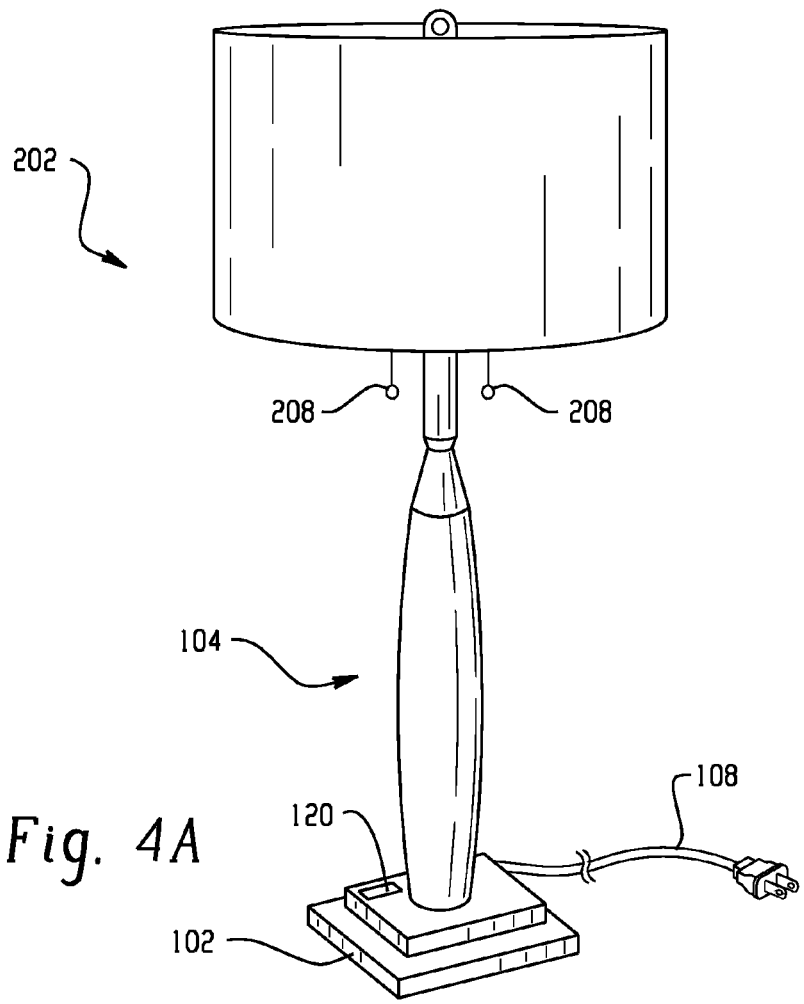
Fig. 4A
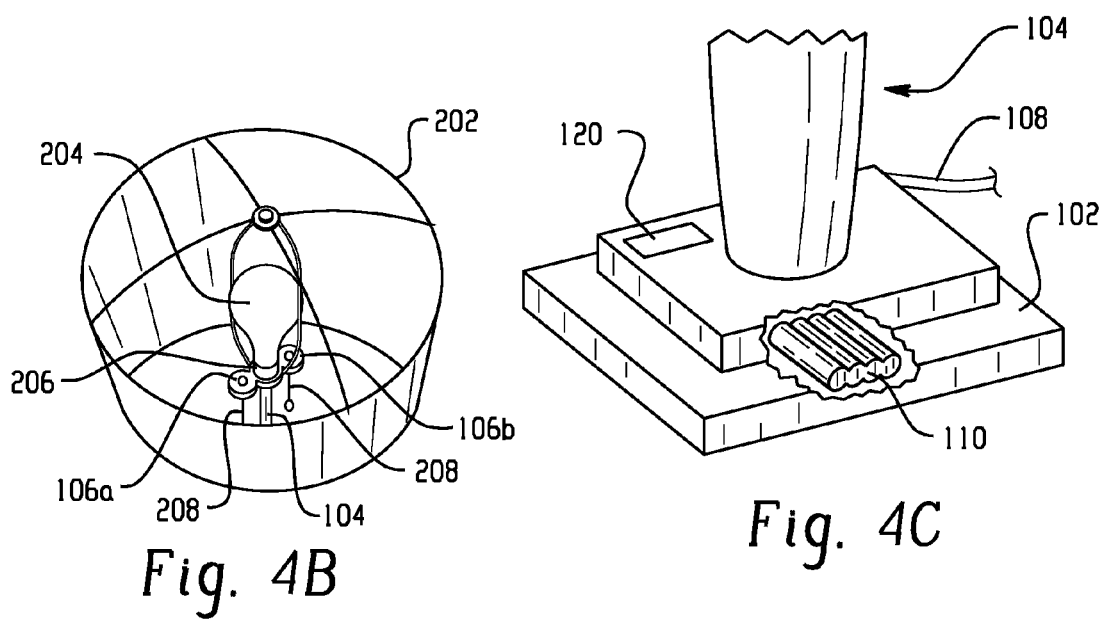
Fig. 4B
Fig. 4C

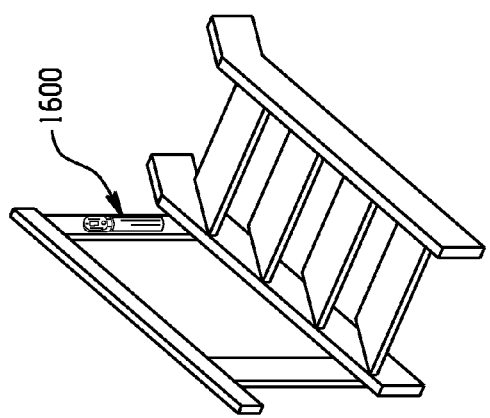
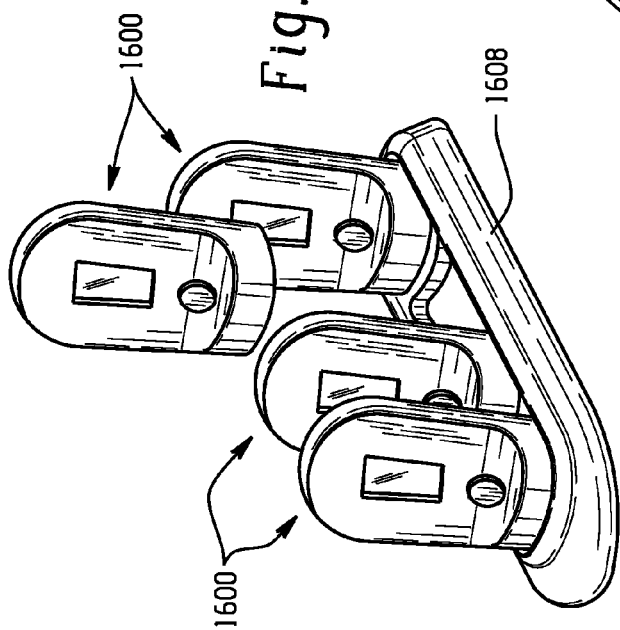
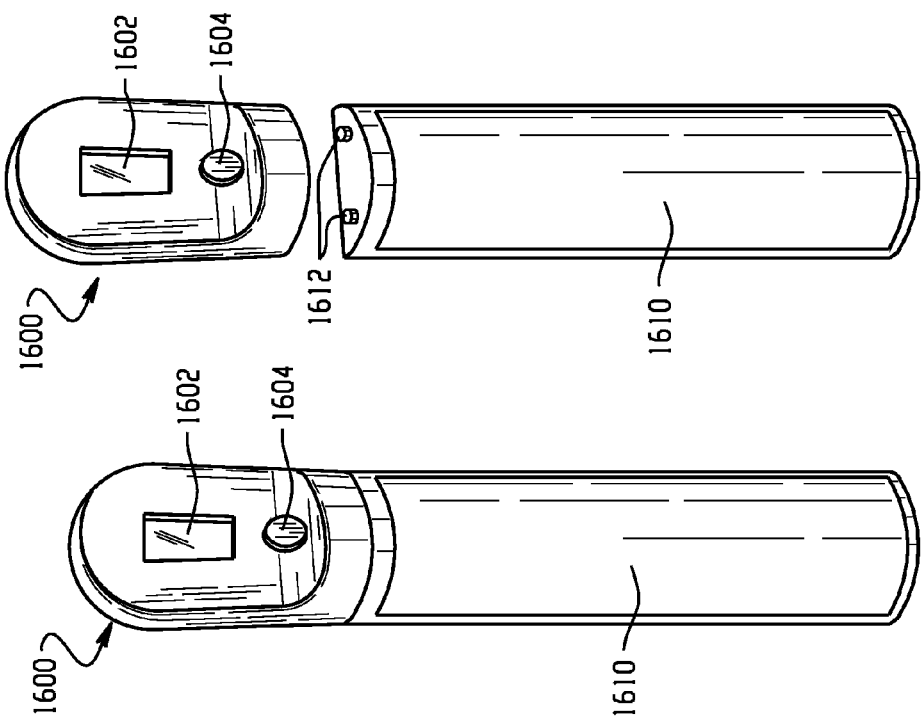

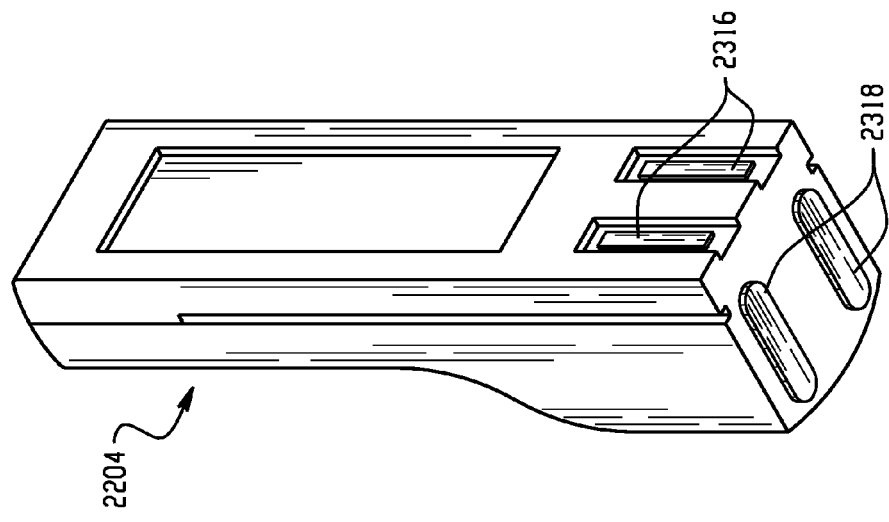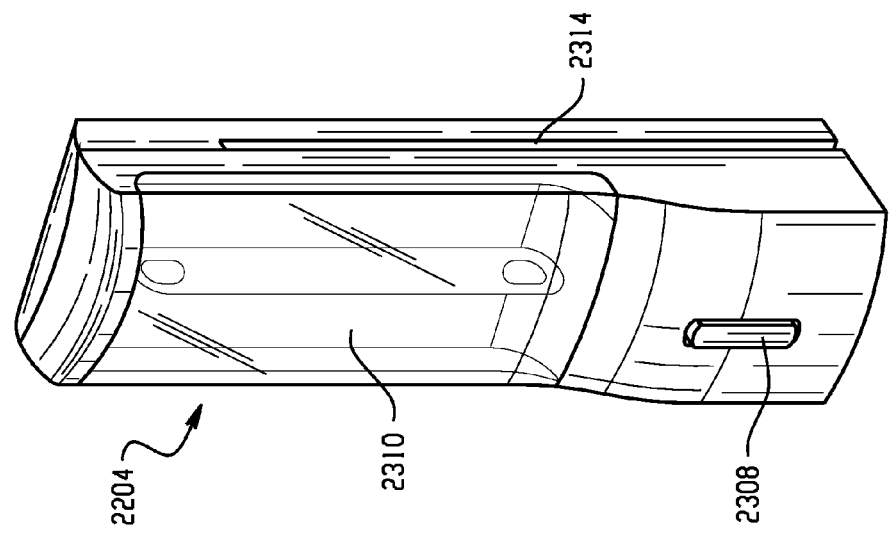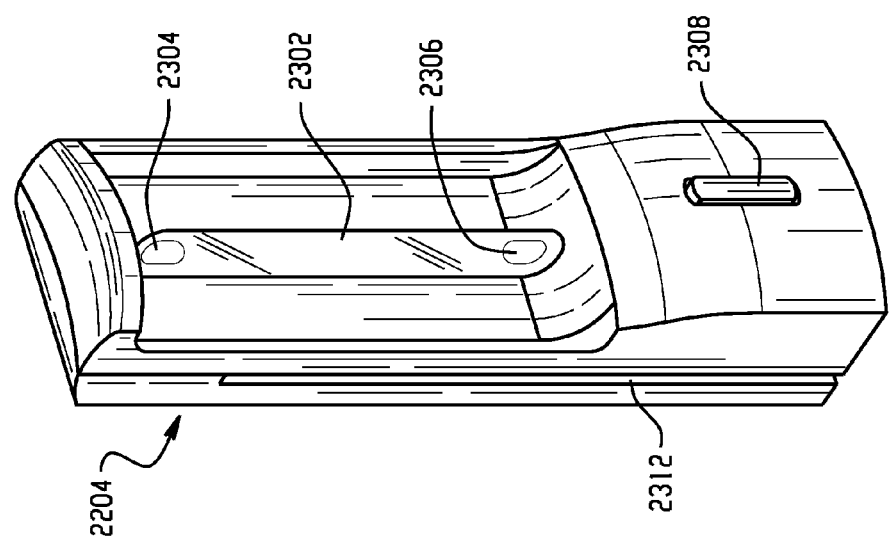

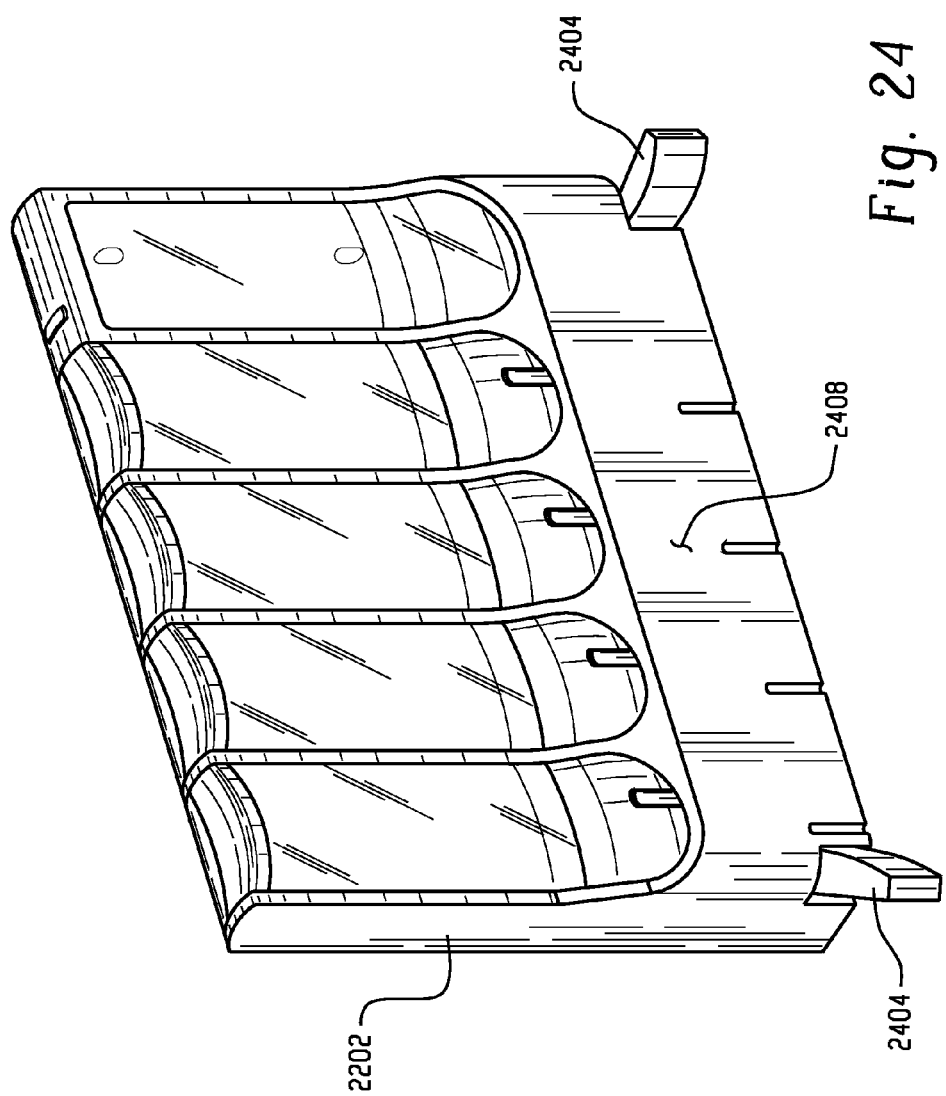

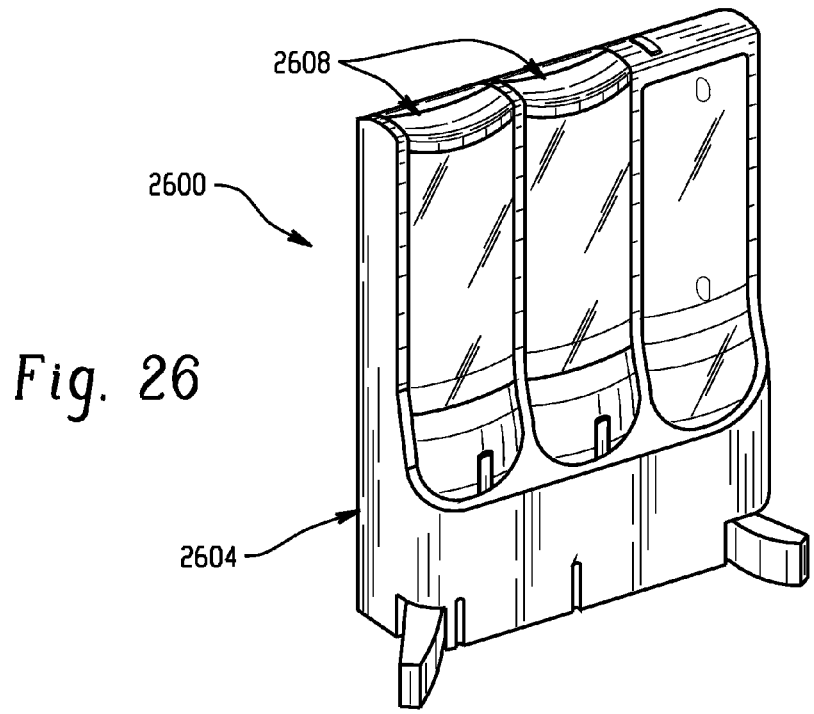
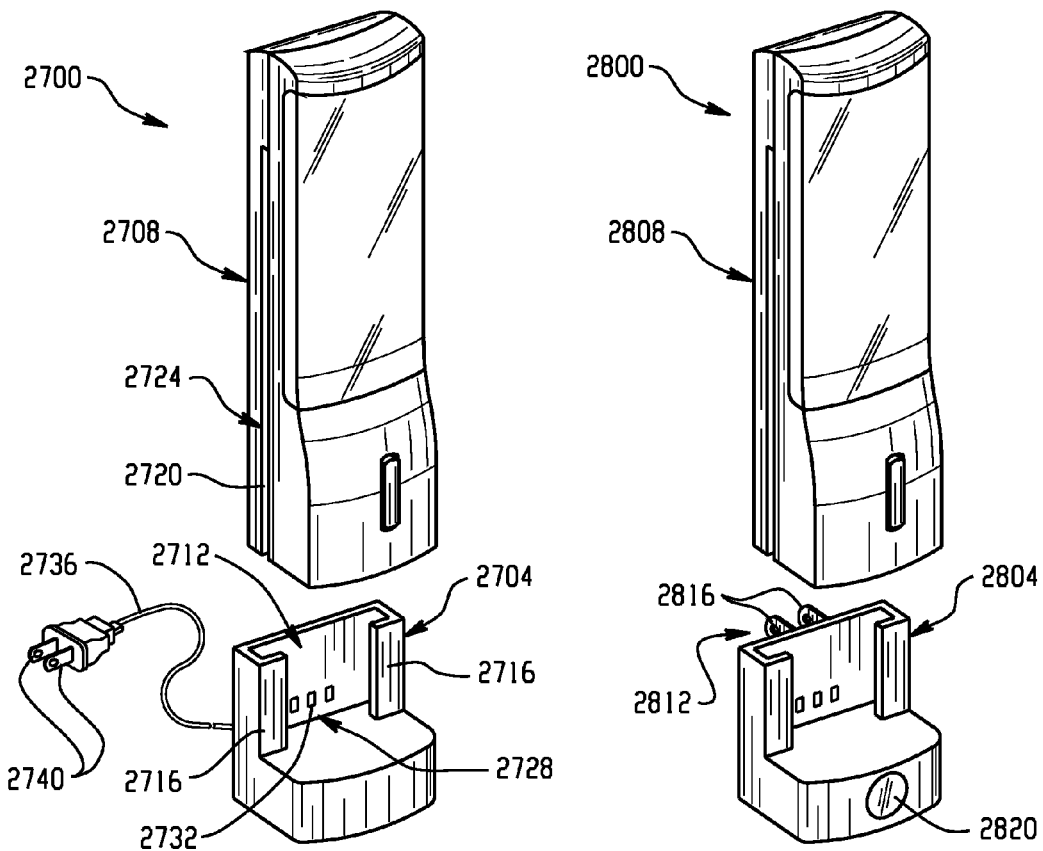
Fig. 26
Fig. 27
Fig. 28

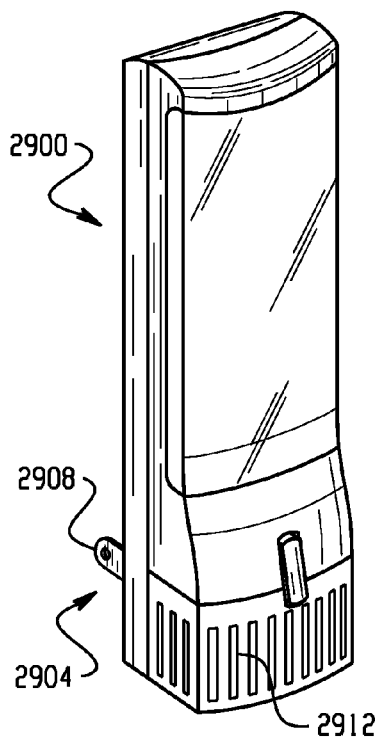
Fig. 29
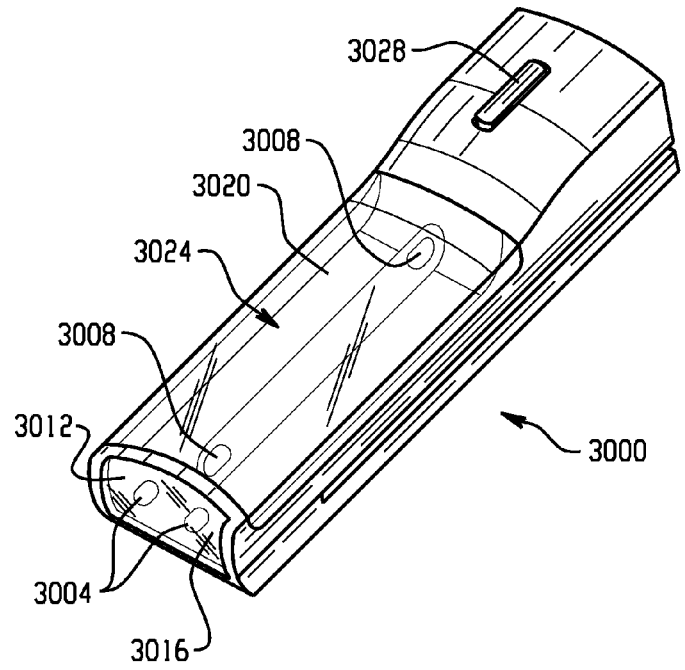
Fig. 30
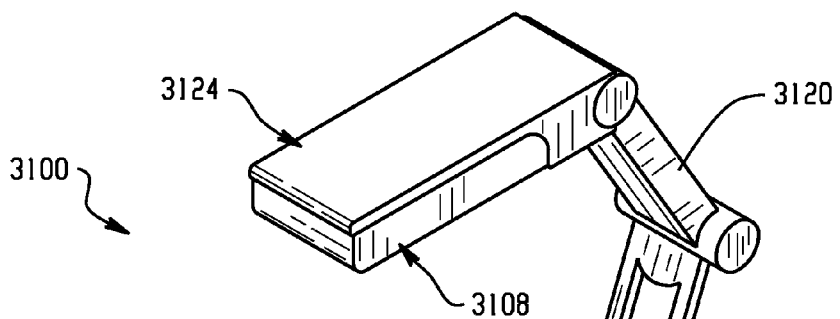
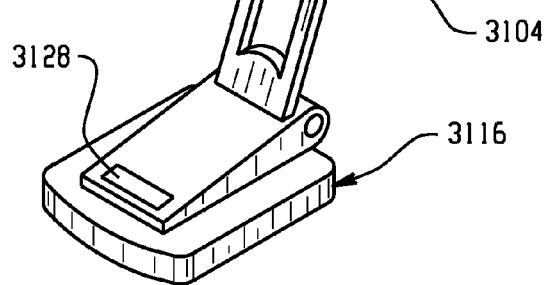
Fig. 31

REVERSIBLE BATTERY CARTRIDGE

CROSS REFERENCE TO RELATED APPLICATIONS

This application is the National Stage of International Application No. PCT/US07/61285, filed on Jan. 30, 2007, and entitled BATTERY POWERED LIGHTING APPLIANCE, which claims the benefit of U.S. Provisional Application No. 60/803,761, filed Jun. 2, 2006 and U.S. Provisional Application No. 60/763,238 filed Jan. 30, 2006.

BACKGROUND

The present application relates generally to a lighting appliance having a battery powered light. While it finds particular application to floor, desk, lamp, under cabinet, sconce, pendant, and portable lighting appliances having battery powered lighting, it also contemplates other lighting appliances having battery powered lighting.

Lighting appliances that produce ambient lighting can be found in homes, offices and the like to provide everyday lighting. For instance, a ceiling light has been provided in the kitchen to provide ambient lighting during the day, for example, to supplement sunlight, if needed, and especially at night so that humans can see where they are going and what they are doing.

Unfortunately, some lighting appliances are dependent upon power from an alternating current (AC) power source such that when AC power is unavailable, the lighting appliance is unable to produce light. For instance, a floor lamp has included a light that is powered by power received through an electrical connection between the floor lamp and an AC electrical receptacle. When AC power is unavailable, the light of the floor lamp cannot be turned on. As a consequence, the user may be left without light at night during a power outage.

Such lighting appliances have often been semi-fixed or fixed at a location. For example, although the floor lamp noted above may be moved from one location to another, it needs to be close enough to an AC electrical receptacle so that it can be plugged into the AC electrical receptacle to receive power. In addition, when it is moved from one location to another location, it is unplugged and thus does not receive AC power for illuminating the light. In another example, the ceiling light noted above has been fixed in place in that it has been electrically tied into the main power line. As a consequence, such lighting appliances generally are inflexible in that they are geared towards particular applications.

SUMMARY

Aspects of the present application address these matters, and others.

In one aspect, a lighting apparatus includes an electrical contact that receives power from an external power source, a battery receiving region, and a battery backed light source. A user interface receives an input indicative of a first desired operation of the lighting apparatus when power is available from the AC power source and a second desired operation of the battery backed light source in the absence of power from the AC power source. Electrical circuitry uses battery power to operate the battery backed light source in the absence of power from the AC power source based on the second desired operation.

In another aspect, a lighting apparatus includes a first wireless communication interface, electrical circuitry that controls the lighting apparatus, a portable lighting appliance receiving region, and a portable lighting appliance. The portable lighting appliance includes a first auxiliary appliance and a second wireless communication interface. The electrical circuitry sends a control signal via the first wireless communication interface that is received by second wireless communication interface and the first auxiliary appliance operates based on the control signal.

In another aspect, a lighting system includes first and second lighting apparatuses. The first lighting appliance includes a first portable lighting appliance receiving region and a first battery charger that charges portable lighting appliances received in the first portable lighting appliance receiving region. The first portable lighting appliance includes first battery receiving region and a first light source that is powered by power supplied from the first battery receiving region when AC power is unavailable from the AC power source. The second lighting appliance includes a second portable lighting appliance receiving region and a second battery charger that charges portable lighting appliances received in the second portable lighting appliance receiving region. The second portable lighting appliance includes a second battery receiving region and a second light source that is powered by power supplied from the second battery receiving region when AC power is unavailable from the AC power source.

In another aspect, a method for operating a lighting apparatus includes monitoring a power status of an external power source, using power received from the external power source when power is available from the external power source to operate the lighting apparatus, using power from a rechargeable battery power source when power is not available from the external power source to operate the lighting apparatus; and activating a light source of the lighting apparatus according to a selected operation when the power is not available from the external power source.

Those skilled in the art will recognize still other aspects of the present application upon reading and understanding the attached description.

BRIEF DESCRIPTION OF THE DRAWINGS

The present invention is illustrated by way of example and not limitation in the figures of the accompanying drawings, in which like references indicate similar elements and in which:

FIGS. 3A and 3B show a perspective view of a first table lamp.
FIG. 4A is a perspective view of a second table lamp.
FIG. 4B is a perspective view of a second table lamp.
FIG. 4C is a cutaway perspective view of the base of a second table lamp.

FIGS. 16A, 16B, 16C, and 16D depict a battery powered lighting apparatus.

FIGS. 22 and 24 depict a fixed appliance.

FIGS. 23A, 23B, and 23C depict a portable appliance.

FIGS. 26-31 illustrate a family of appliances.

DETAILED DESCRIPTION

Figure 1A:
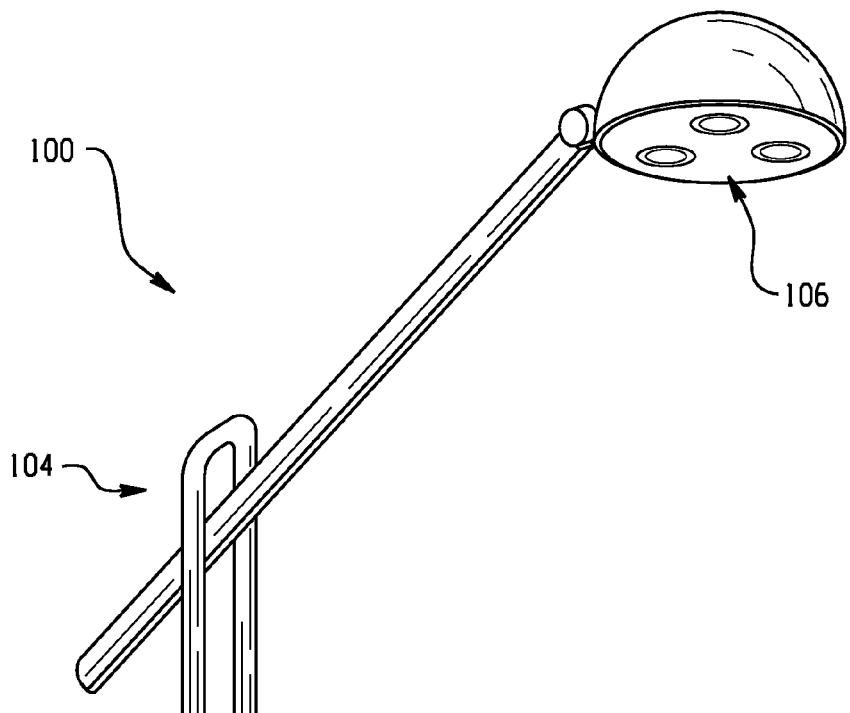
FIG. 1A is a perspective view of a first desk lamp.

With reference to FIG. 1A, a desk lamp 100 includes a base 102, a lamp supports 104, and a light source 106.

The base 102 is adapted for placement on a generally horizontal surface such as a desk, table, or the like. A conventional line cord and plug 108 allow the lamp 100 to be removably connected to a standard alternating current (AC) power receptacle. Disposed in the base 102 is a secondary battery receiving region 109 adapted to receive a battery pack containing one or more secondary (rechargeable) batteries 110. As an aid to installation and/or replacement, the secondary batteries 110 are connected to circuitry in the base 102 by an electrical connector 111 or by suitable battery contacts.

The battery receiving region 109 and thus the batteries 110 are accessed through a removable cover 112. As depicted in FIG. 1A, the secondary battery receiving region 109 is accessed from the bottom of the base 102, although access may be provided from another desired location such as the top or side. While depicted as being secured by a screw, the cover 112 may also be secured by way of a mechanical tab, thumbscrew, or the like which does not require the use of a tool. The cover 112 may take the form of a sliding, pivoting, or other cover.

The base 102 also includes a primary battery receiving region 113 adapted to receive one or more primary (single use) batteries 116 such as conventional AAA, AA, C, or D size cells, although the use of secondary batteries is also contemplated. The primary batteries 116 are likewise connected to the lamp 100 electrical circuitry by way of suitable battery contacts. As depicted, the primary batteries 116 are received in a tray 114 which is slidably inserted into the base 102. As with the secondary battery receiving region 109, the primary battery receiving region 113 may likewise be accessed from another desired location, or using another suitable cover configuration.

The lamp also includes user controls 118. With reference to FIG. 11B, the user controls 118 preferably include a switch 120 and a human readable indicator 122 such as a light emitting diode (LED), the functionality of which will be described more fully below.

The light source 106 includes an illumination source such as one or more LEDs, low voltage incandescent lamps, electroluminescent (EL) panels, other suitable light sources, or a combination thereof. In the embodiment of FIG. 1A, the light source 106 serves as the primary illumination source during normal AC powered operation as well as a backup illumination source in the event of an AC power loss.

The lamp 100 may also include an additional light emitting diode (LED) or other light source which provides local illumination in the vicinity of the primary battery receiving region 113 and/or the battery tray 114 as an aid to replacing the primary batteries 116 in the event of a power loss. The additional LED is advantageously powered by a lithium ion (Li-ion) coin cell and is automatically illuminated when the user accesses the primary battery receiving region 113, for example through a switch which is activated when the battery tray 114 is opened.

The lamp 100 may also include a universal serial bus (USB) port which provides power to a USB powered device.

Figure 8:
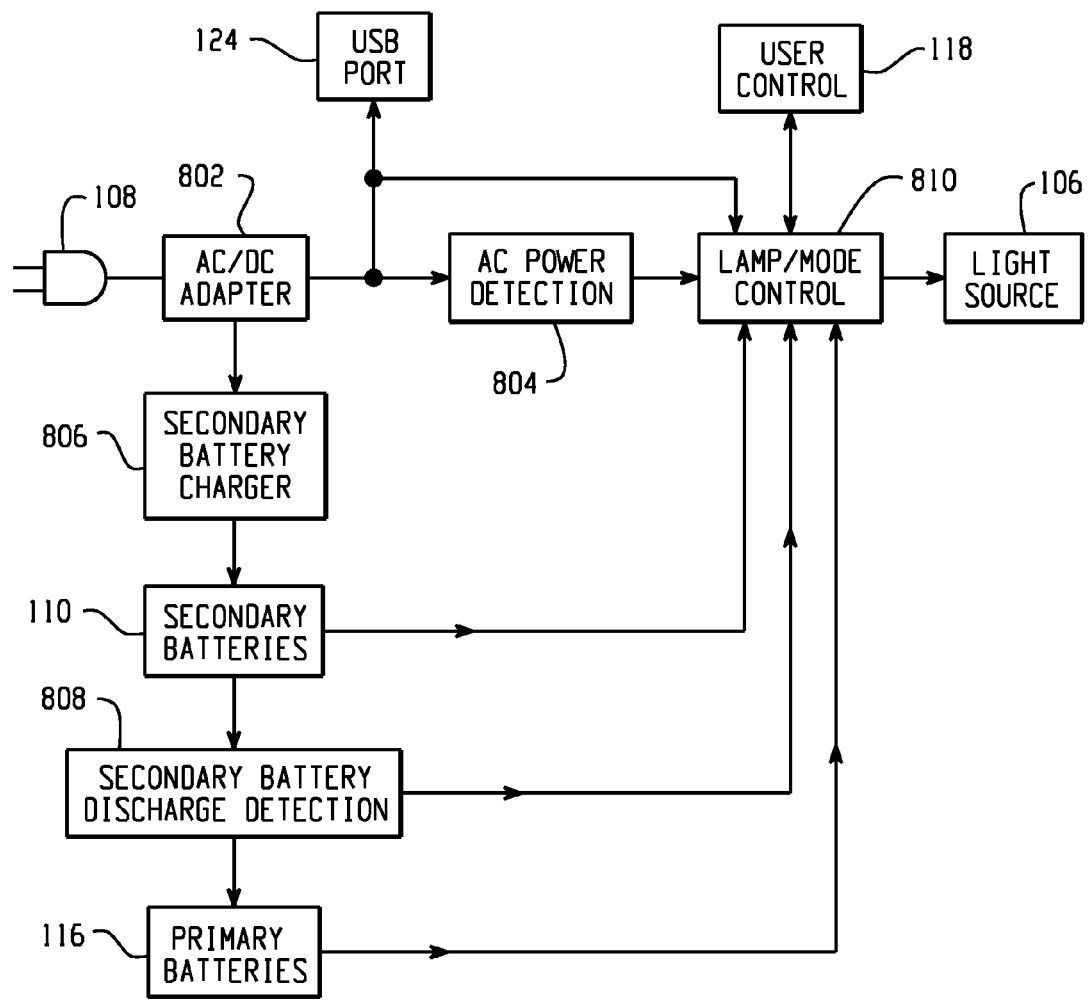
FIG. 8 is an electrical block diagram of a lamp.

FIG. 8 is a block diagram of the lamp's electrical circuitry. A power supply 802 such as an AC to DC adapter converts the AC power to a voltage level or levels suitable for supplying the electrical circuitry and the light source 106. Note that some or all of the power supply 802 may be located external to the lamp, for example in a conventional receptacle mounted power cube. An AC power detection circuit 804 detects the presence or absence of AC power. Secondary battery charging circuitry 806 receives energy from the power supply 802 and provides electrical energy for charging the secondary batteries 110. Secondary battery discharge detection circuitry 808 detects whether the secondary batteries 110 have become discharged, for example based on the secondary battery 110 voltage.

Lamp control circuitry 810 controls the electrical energy to the light source 106. The lamp control circuitry 810 preferably powers the light source using energy from the AC mains when AC power is available. In the absence of AC power, and as an aid to extending battery life, the light source 106 may be automatically switched a to a low powered or dim state using energy from the secondary 110 or primary 116 batteries. Various techniques may be employed to achieve low powered state. For example, where the light source includes a plurality of individual light sources, only a subset of the light sources 106 may be illuminated. The light sources 106 may also be driven at a reduced duty cycle using a pulse width modulation technique, either alone or in combination with illuminating a subset of the light sources 106.

Note that the USB port 124 may also be powered via the secondary 110 or primary batteries 116 in the event of an AC power loss. In such a case, the USB port 124 may be powered in all cases of an AC power loss, as a function of the lamp 100 operating mode, or via a dedicated on/off and/or mode switch.

Operation of the lamp control circuitry 810 and that of the user controls 118 will now be described with reference to Table 1, where the switch 120 is a three position switch or otherwise allows the user to select between On, Auto, and Off operating modes. The second column depicts the operating state of the light source 106 when AC power is available to the lamp or appliance. The third column depicts the operating state of the light source 106 when AC power is not available, as may occur for example in the case of a power outage or when the lamp or appliance is unplugged.

TABLE 1

| | Light Source 106 Status | |
|---|---|---|
| Switch 120 Position | AC Power On | AC Power Off |
| On | On | Off |
| Auto | Off | On/Dim |
| Off | Off | Off |

The foregoing arrangement is well suited to providing normal operation when AC power is available as well as backup lighting in case of an AC power loss. When placed in the Auto mode, the light source 106 is ordinarily not illuminated, although the indicator 122 is illuminated to indicate that the device is in the Auto mode. In the event of an AC power loss, the light source 106 is initially illuminated using energy from the secondary batteries 110. Note that the light source 106 is advantageously illuminated in a dim or reduced power state so as to conserve battery life. The user may then operate the light source 106 at full or otherwise at an increased brightness by placing the device in the On mode.

When in the Off mode, the light source 106 is not illuminated, irrespective of the availability of AC power. When in the On mode, the light source 106 is ordinarily illuminated using power from the AC power source. If AC power is lost, the light source 106 is turned off. Alternately, the light source 106 may be illuminated, preferably in a dim or reduced power state.

The user control 118 may also include a second switch 121. The first switch 120 allows the user to selectively turn on or otherwise vary the brightness of the light source 106, for example between off, on/low, on/medium/, and on/high states. The second switch 121 allows the user to switch the Auto mode on or off. When AC power is available, the light source 106 operates according to the setting of the first switch 120. Upon an AC power loss, the operating state of the light source 106 is a function of the second switch 121. If the Auto mode is turned on, the light source 106 is illuminated, preferably in a reduced power state and subject to further adjustment by the user. If the Auto mode is turned off, the light source 106 is not illuminated.

As noted above, the light source 106 is initially operated using energy from the secondary batteries 110 in the event of an AC power loss. Should the secondary batteries 110 become discharged, as may occur in the case of a relatively extended power outage, the light source 106 is operated using energy from the primary batteries 116. Upon switching to the primary batteries 116, the lamp 100 may be automatically returned to the Auto mode to increase battery life and to indicate that the secondary batteries 110 have become discharged. If desired, the user can then return the light source 106 to full or increased brightness via the switch 120. In the case of an even more extended power outage, the user may replace the primary batteries 116 as needed so that the light source 106 continues to operate. When the primary batteries 116 are replaced, the light source 106 is again preferably returned to the Auto mode.

Figure 1B:
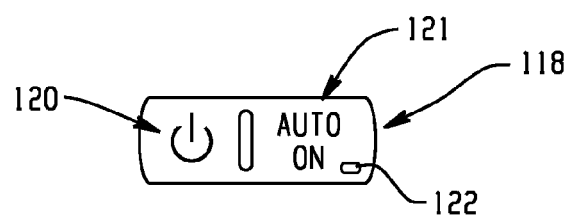
FIG. 1B depicts operating controls for a desk lamp.
Figure 2A:
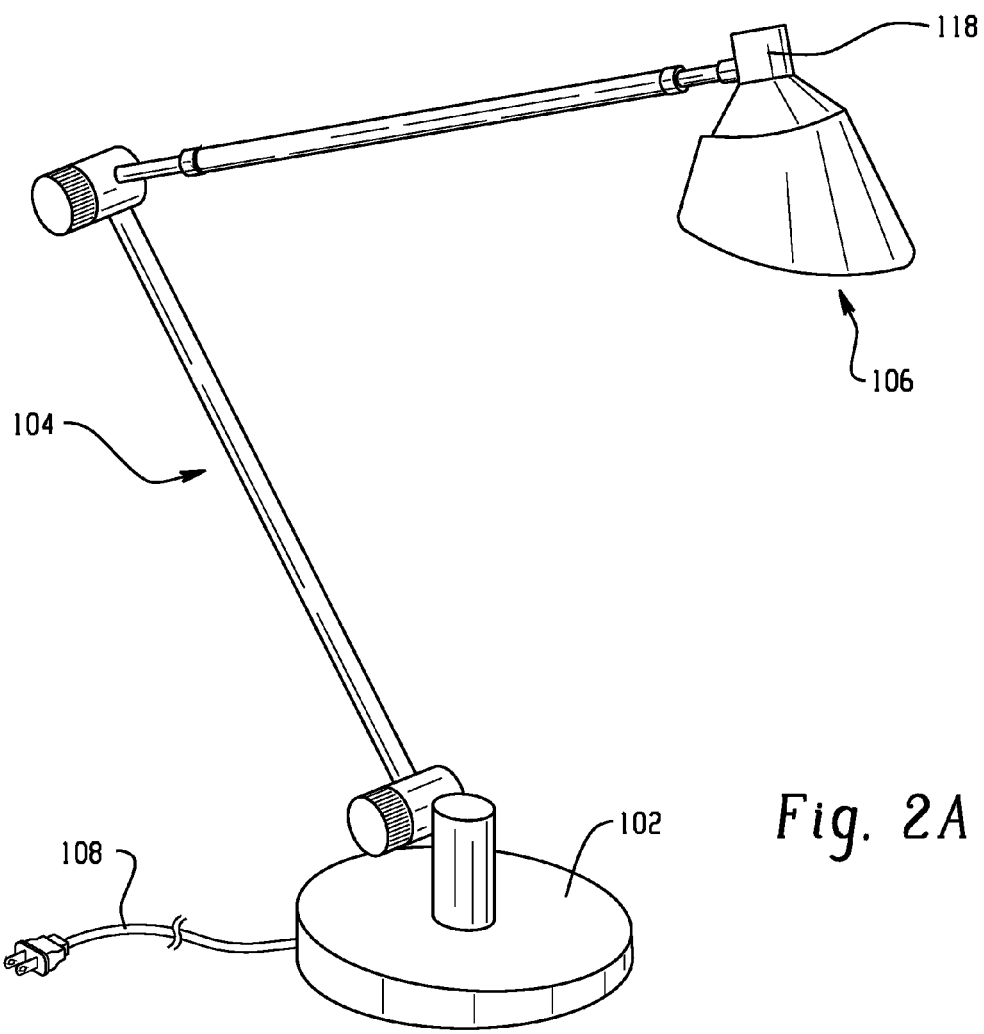
FIG. 2A is a perspective view of a second desk lamp.
Figure 2B:
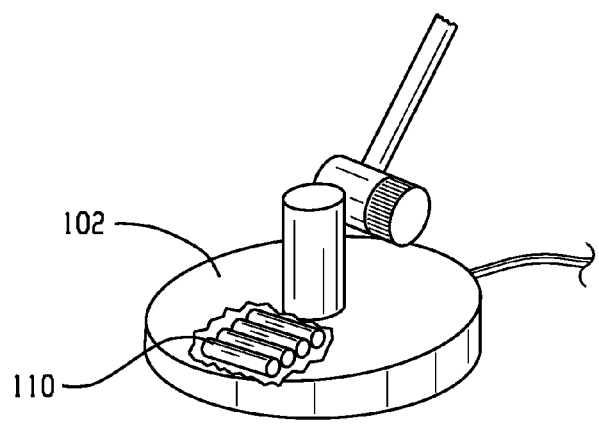
FIG. 2B is a cutaway view of the base of a second desk lamp.

FIGS. 2A and 2B depict an alternate implementation of a desk lamp, where like reference numerals denote features analogous to those described above in connection with FIG. 1. In FIG. 2B, the base 102 is shown in cutaway view to expose the secondary batteries 110 contained therein. Most notably, the primary batteries 116 and USB port 124 are omitted. The secondary battery discharge detection circuitry 808 described in FIG. 8 would likewise be omitted.

FIG. 3 depicts a table lamp 200, where like reference numerals again denote features analogous to those described above. The lamp 200 includes a lamp shade 202 shown in cutaway view to expose a primary light source 204, a light socket, 206, and a light switch 208. In one implementation, the socket 206 is a conventional light socket and switch adapted to receive a conventional incandescent light bulb, compact fluorescent lamp (CFL), halogen lamp, or the like. The switch 208 is a known light switch such as a turn knob switch which allows a user to selectively turn on or otherwise vary the brightness of the primary light source 204. The primary light source 204 preferably provides the light output typical of a table lamp. The light source 106 may be used to provide additional illumination during normal AC powered operation as well as backup illumination source in the event of an AC power loss.

As illustrated in FIG. 3, the light source 106 includes a plurality of light sources such as LEDs 106a, 106b, 106c which are radially spaced about the lamp portion 104 so as to provide a generally omnidirectional illumination pattern. Other numbers or arrangements of light sources 106 may also be used to provide a unidirectional or other desired illumination pattern; only a single light source 106 may also be provided.

Figure 9:
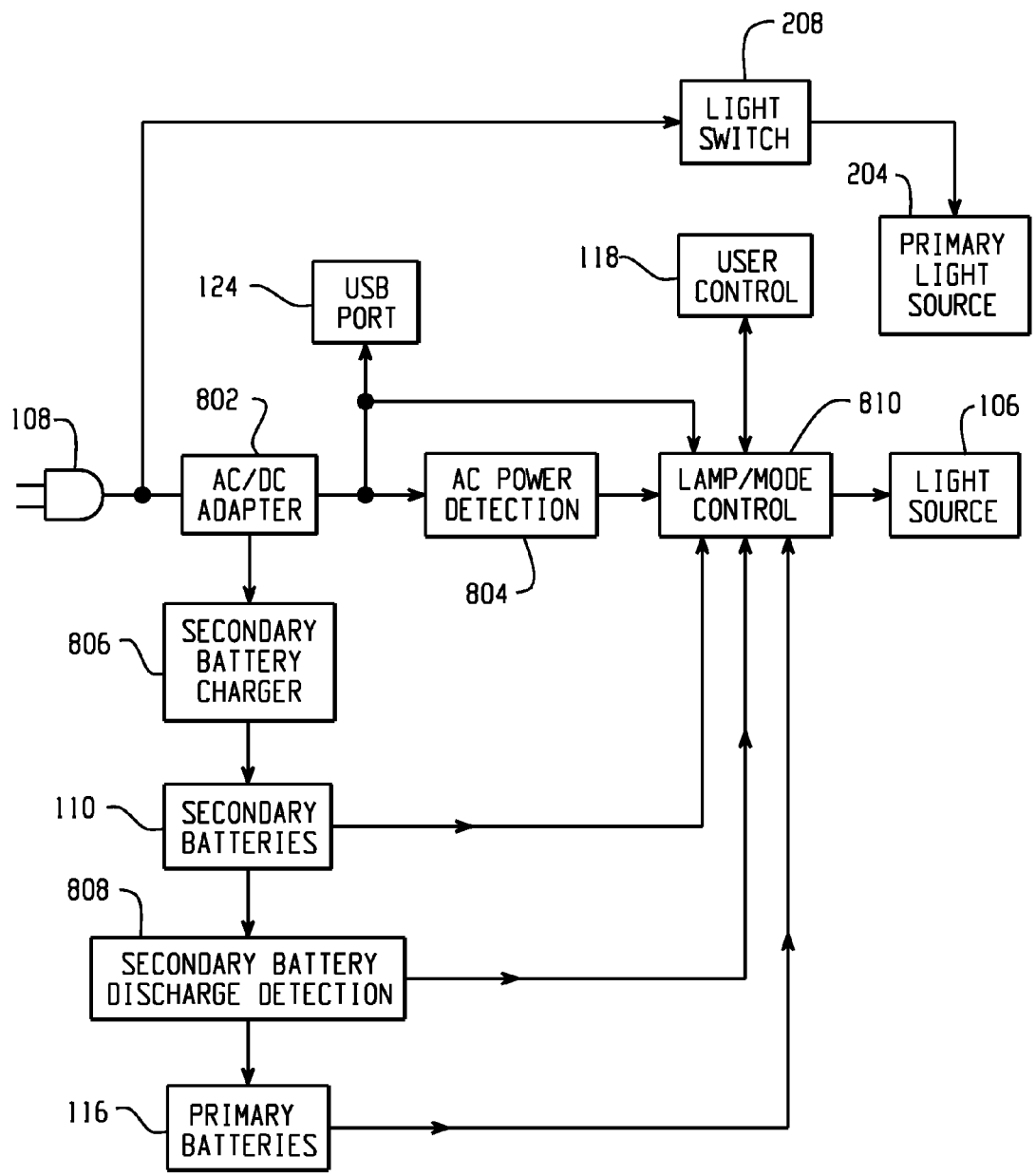
FIG. 9 is an electrical block diagram of a lamp.

FIG. 9 is a block diagram of the lamp's electrical circuitry. Operation of the electrical circuitry and the light source 106 is as discussed above in relation to FIG. 8 and Table 1. As can be seen in FIG. 9, however, the primary light source 204 is powered from the AC power lines and controlled independently through the light switch 208.

FIGS. 4A, 4B and 4C depict an alternate implementation of a table lamp, where like reference numerals denote features analogous to those described above in connection with FIGS. 1 through 3, although the primary batteries 116 and associated electrical circuitry have been omitted. As shown, the light sources 106a, 106b are disposed in two locations near the second light 204 and shine generally vertically, for example toward the base 102.

Also as illustrated in FIG. 4B, the light switch 208 includes one or more pull switches which are used to control the operation of the primary light source 204 and the light source 106. The light switch 208 allows the user to selectively turn on or otherwise vary the brightness of the lamp. For example, the switch 208 may accommodate four operating states or modes during normal AC powered operation: a first state in which both light source 106 and the second light source 204 are turned off, a second state in which only the light source 106 is illuminated, a third state in which the only the second light source 204 is illuminated, and a fourth state where both the light source 106 and the second light source 204 is illuminated. The switch 120 controls the operating mode of the light source 106 in the event of an AC power loss. In the Auto mode, the light source 106 is illuminated in the case of a power loss, irrespective of the position of the light switch. In the Off mode, the light source 106 is not illuminated in the event of power loss. According to another arrangement, switch 120 may be implemented via a pull switch.

Figures 5A, 5B, 5C:
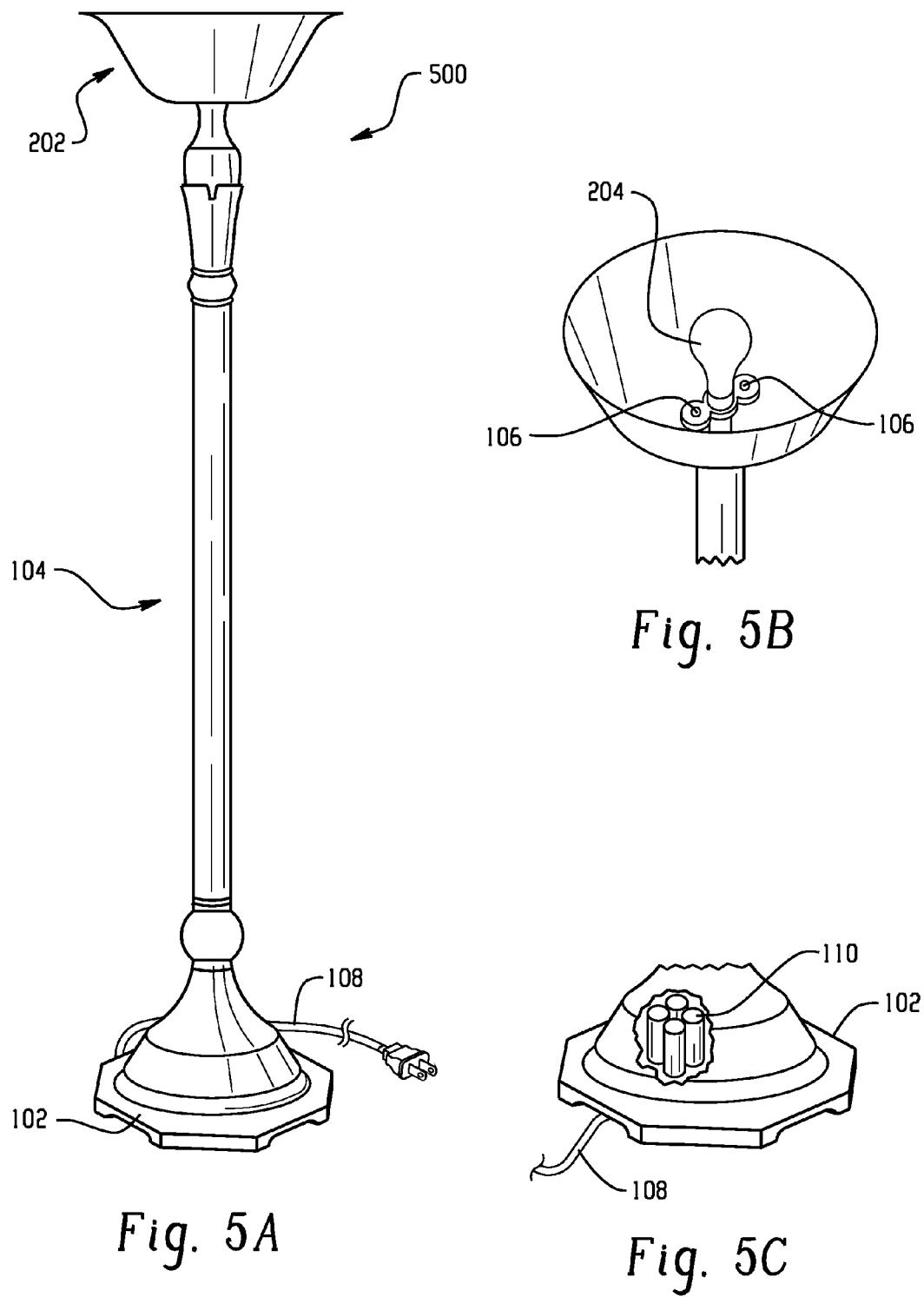
FIG. 5A is a perspective view of a floor lamp.
FIG. 5B is a perspective view of a floor lamp.
FIG. 5C is a cutaway perspective view of the base of a floor lamp.

FIGS. 5A, 5B, and 5C depict a floor lamp 500, again with like reference numerals denoting analogous features to those described above.

While the discussion above has focused on desk, table, and floor lamps, it will be appreciated that the form factor of the respective lamps is only exemplary, and other types of lamps such as wall or ceiling mounted lamps may also be implemented. The lamps may also be adapted for mounting and wiring to a conventional electrical box.

Moreover, the desk lamp 100 may include both a primary light source 204 and a light source 106; a table or floor lamp may likewise include only a light source 106. Also, while the secondary 110 batteries, primary batteries 116, and the electrical circuitry have been described as being located in the base, it will be appreciated that some or all of them may be located in another suitable location, for example in the lamp support member 104. As another, the floor lamp 500 may also be configured to accept primary batteries 116 as discussed above with the desk and table lamps. As still another, the primary light source 204 may also be implemented as an LED or other solid state light source, a low voltage lamp, or using other suitable technology.

Figure 6:
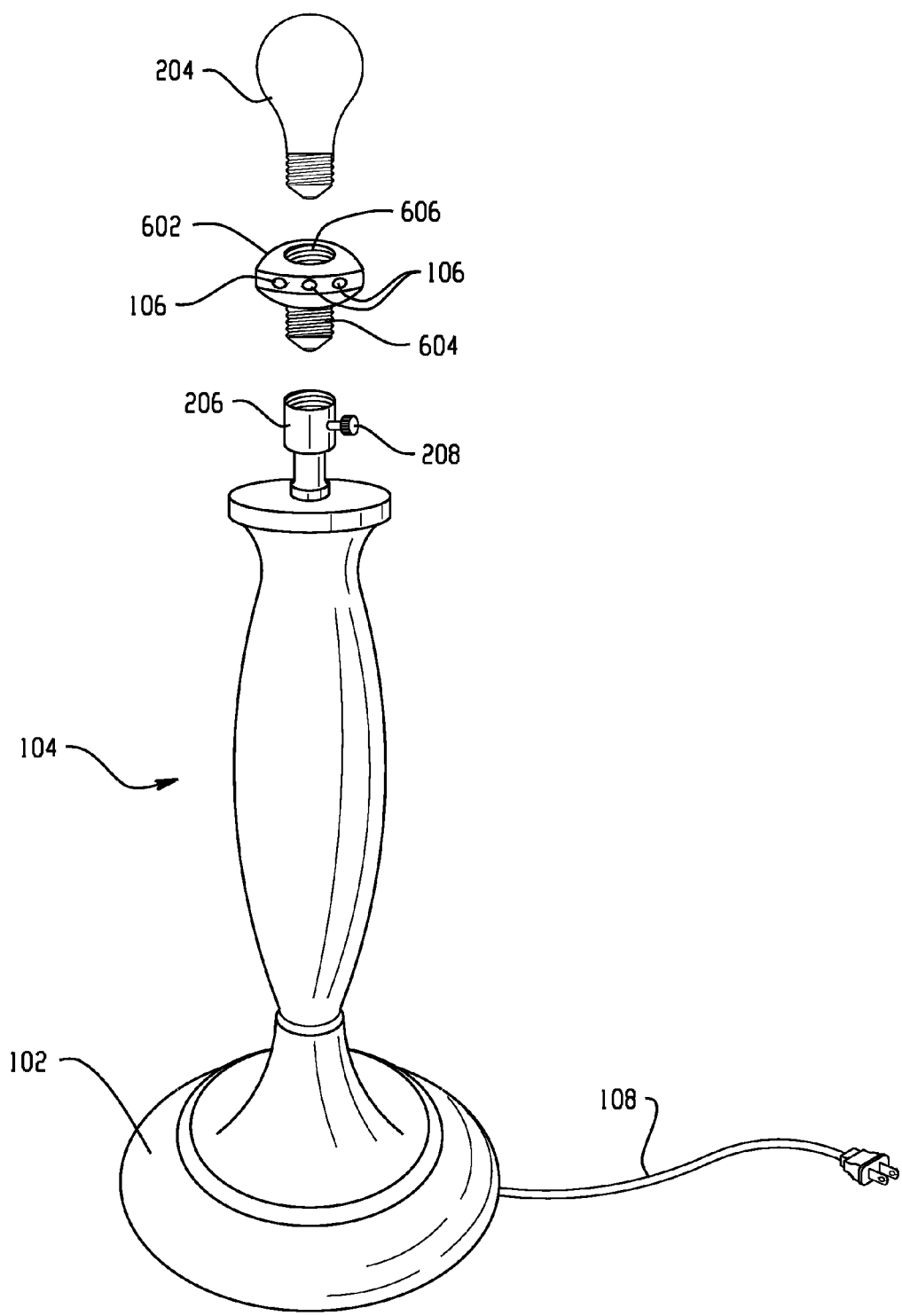
FIG. 6 is a perspective view showing a lamp having a battery-powered backup lighting device.

FIG. 6 depicts a battery powered backup lighting device 602 adapted for use with a standard A-lamp or general purpose bulb 204. The device 602 includes a screw in male lamp base 604 and a corresponding, coaxially displaced female lamp socket 606. The device includes one or more lights 106 and one or more secondary batteries 110. Circuitry disposed in the device 602 provides charger functionality to charge the secondary batteries when AC power is available to the lamp, and provides power from the secondary batteries 110 to the lights 106 where AC power is not available to the lamp. The device may also include a user control 118. As another alternative, the device 602 may detect current flow to the second light 204. When the second light 204 is turned off and AC power is available, the lights 106 are powered from energy obtained from the AC line. The precise form factor of the device will vary based on the technology of the bulb 204 and the configuration of it base 604, the number and type of light sources 106 and secondary batteries 110, and the corresponding electrical circuitry.

Figure 7A:
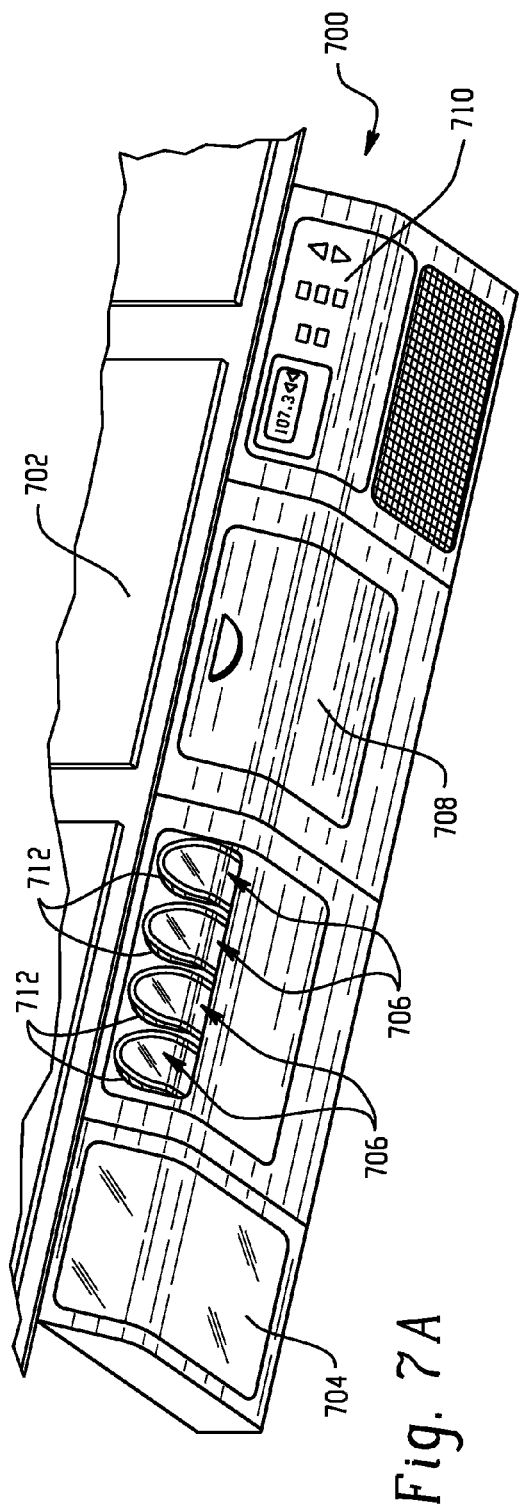
FIG. 7A is a perspective view of an under counter appliance including backup power capability.

FIG. 7A is a perspective view of an under counter or under cabinet appliance 700 having a battery backup capability. The appliance is configured to be suspended from a horizontal surface such as the underside of a standard kitchen, laundry room, or similar cabinet 702. The appliance includes one or more of fixed lighting 704, an electrical device 710 such as a clock radio, and a battery charger 708, and may also be configured to accept one or more portable lights 706. In normal operation, the appliance 700 receives power from the AC power mains.

The fixed lighting 704 may include one or both of the light source 106 and/or the primary light source 204. In view of the form factor of the appliance 700, conventional fluorescent tubes may be advantageously employed as the primary light source 204.

The appliance 700 also includes the secondary 110 and/or primary batteries 116, together with the desired user control 118, light switch 208, and associated circuitry as discussed above.

One or more receiving regions 712 are adapted to removably receive portable lights 706. Associated with the receiving regions 712 are electrical connections such as electrical contacts or inductively coupled connections for transferring energy to portable lights 706 when disposed in a receiving region 712.

Figure 7C:
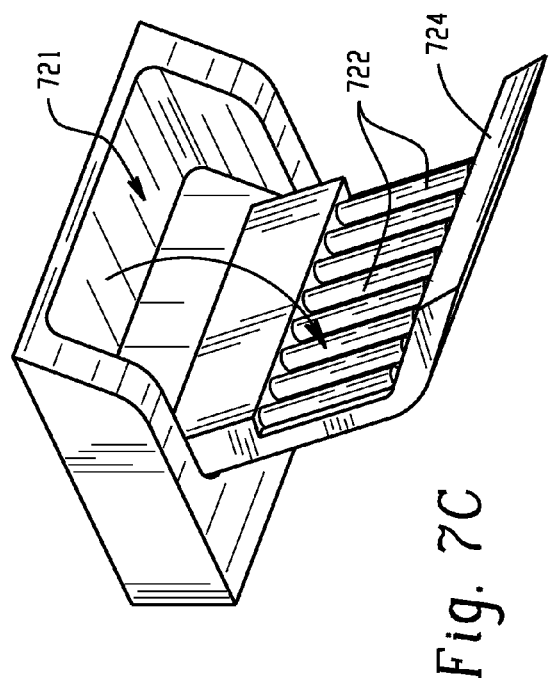
FIG. 7C is a perspective view showing a battery receiving region.
Figure 7B:
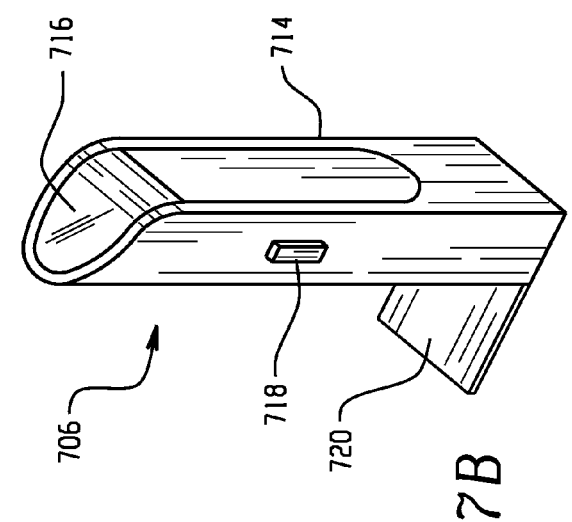
FIG. 7B is a perspective view of a hand held light.

With particular reference to FIGS. 7A and 7B, the portable lights 706 include a housing 714, a battery receiving region adapted to receive one or more secondary batteries and a light source 716 such as an incandescent bulb or LED, and a user operated switch 718 for turning the light source 716 on or off or otherwise controlling its brightness. In one embodiment, the housing includes a substantially flat surface or base which allows the device to be placed on a table or surface when removed from the appliance. As depicted in FIG. 7B, the housing 714 may also be adapted to removably engage a base 720. The portable lights 706 also include suitable electrical connections which correspond to those associated with the battery receiving regions 712 for receiving energy from a secondary battery charger located in the appliance 700. Hence, the portable lights 706 are maintained in a charged state during normal AC powered operation.

With particular reference to FIGS. 7A and 7C, the battery charger 708 can be used to charge secondary batteries to be used in still other appliances. The battery charger 708 includes a battery receiving region 721 adapted to receive one or more secondary batteries 722 for charging. In the illustrated embodiment, a battery holder 724 containing the requisite battery contacts and mechanical supports is pivotally mounted to the underside of the appliance 700. A sliding tray analogous to the battery tray 114, or other desired mechanical arrangements may also be implemented.

While the appliance 700 has been described primarily as an under cabinet device, it may also be configured for placement on a horizontal surface such as a countertop, table, or floor, or on a vertical surface such as a wall. It will also be appreciated that various combinations of the fixed lighting 704, portable lights 706, or electrical appliances 710 may be provided; one or more of them may be omitted.

As still another alternative, the fixed lighting 704 may be disposed in one or more auxiliary housings which are electrically connected to the main appliance 700 via suitable wiring. Still alternately, the portable lights 706 may be so configured. Such an arrangement allows the lighting to be distributed at desired locations along the length of a cabinet or counter so as to provide distributed lighting as well as convenient access to a portable light 706. Advantageously, the auxiliary housings may be provided with suitable connectors which allow multiple auxiliary lights to be daisy chained.

In operation, the fixed lighting 704 operates similarly to that described above in connection with FIGS. 1 through 5 above. One or more of the portable lights 706 may also be powered in the event of an AC power loss, particularly when the appliance 700 is in the Auto mode.

The electrical appliance 710 may also be powered from the secondary 110 and/or primary batteries 116 in the event of an AC power loss. The electrical appliance may also be activated upon a power loss when operated in an Auto mode.

Figure 10A:
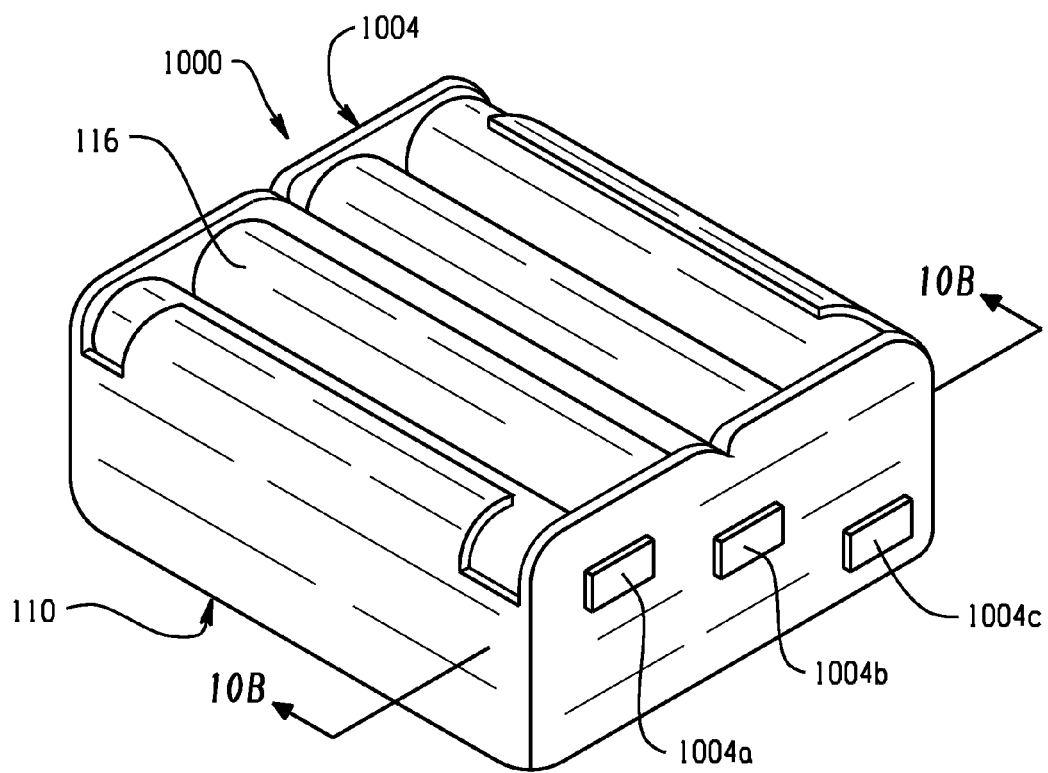
FIG. 10A is a perspective view of a battery cartridge.
Figure 10B:
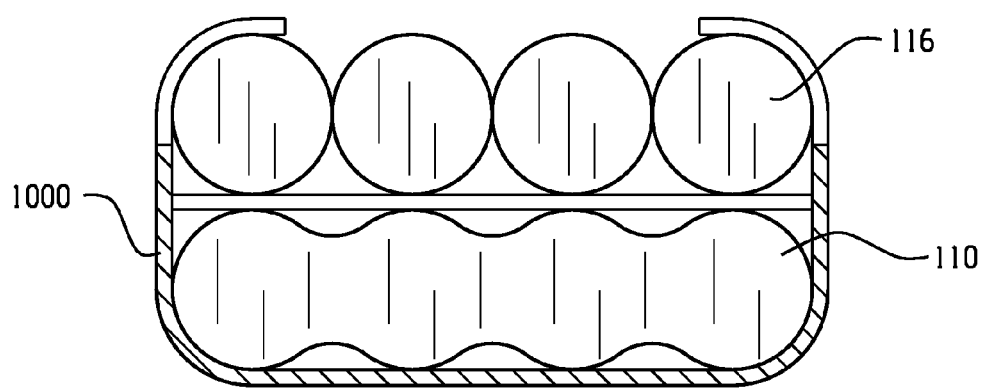
FIG. 10B is a sectional view of a battery cartridge along direction indicated in FIG. 10A.

Turning now to FIGS. 10A and 10B, the secondary 110 and primary 116 batteries may also be carried in a cartridge or holder 1000. While FIG. 10 depicts an arrangement adapted to accept 4 AA size primary 116 batteries, the cartridge may be configured to accept other sizes and numbers of batteries.

The cartridge 1000 includes three external electrical contacts 1004*a*, 1004*b*, and 1004*c*. One of the electrical contacts, for example the contact 1004*a*, is connected to the primary batteries 116 so as to provide a positive voltage connection. A second electrical contact, for the example contact 1004*c*, is connected to the secondary batteries 110 so as to provide a positive voltage connection. The third electrical contact 1004*b* is connected to provide a common or negative connection. Of course, the polarities may be reversed.

Figure 11:
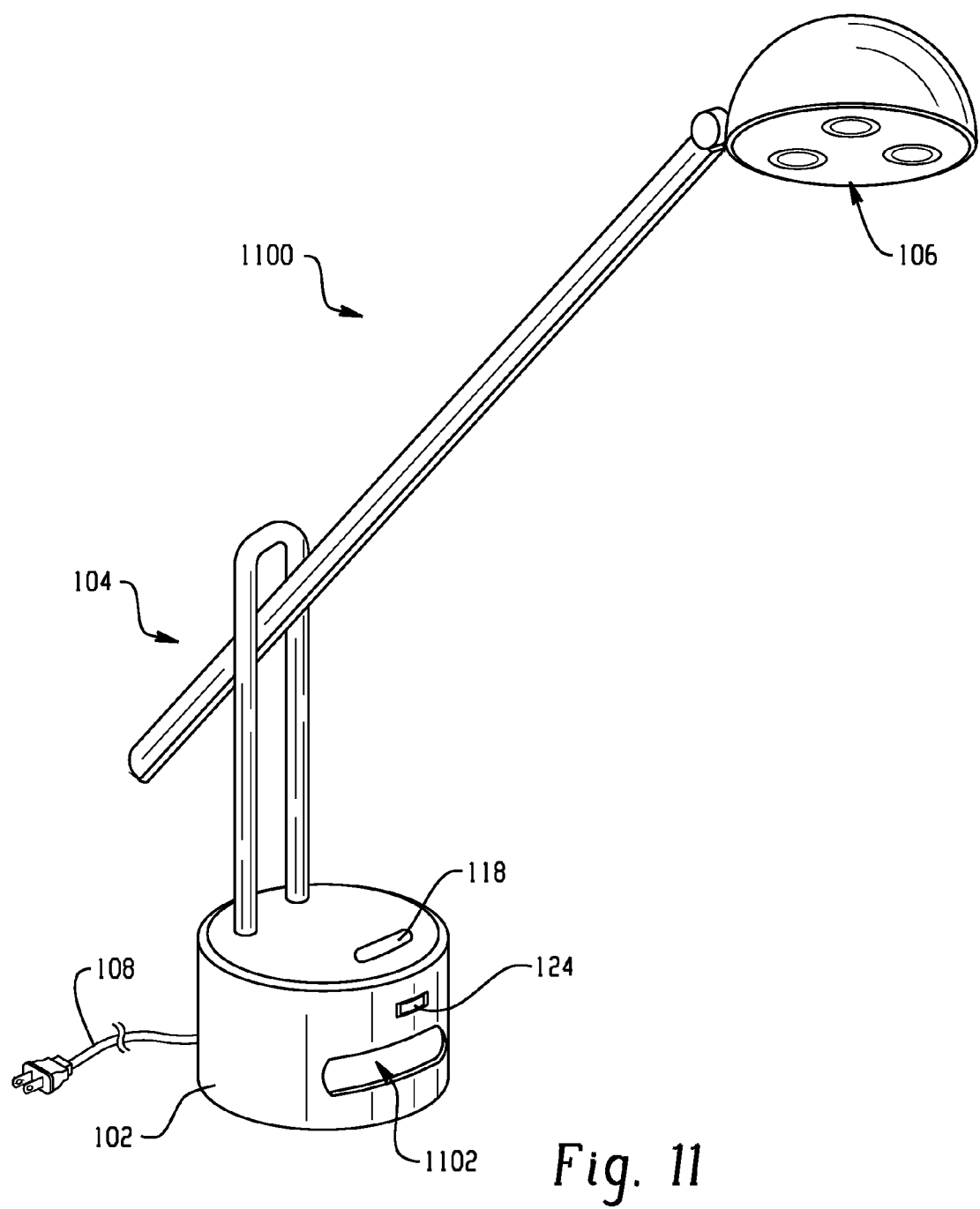
FIG. 11 is a perspective view of a lamp which accepts a battery cartridge.

With reference to FIG. 11, an electrical device such as a lamp 1100 analogous to that discussed above in connection with FIG. 1 includes a receiving region 1102 which receives the battery cartridge 1000 in first and second orientations. The lamp 1100 includes electrical contacts (not shown) corresponding to the contacts 1004. The contacts are arranged so that, when the cartridge 1000 is inserted in the first orientation (for example the orientation shown in FIG. 10A), the secondary batteries 110 are connected to the lamp circuitry. When the cartridge is flipped 180°, the primary batteries 116 are connected to the lamp circuitry.

Figure 12:
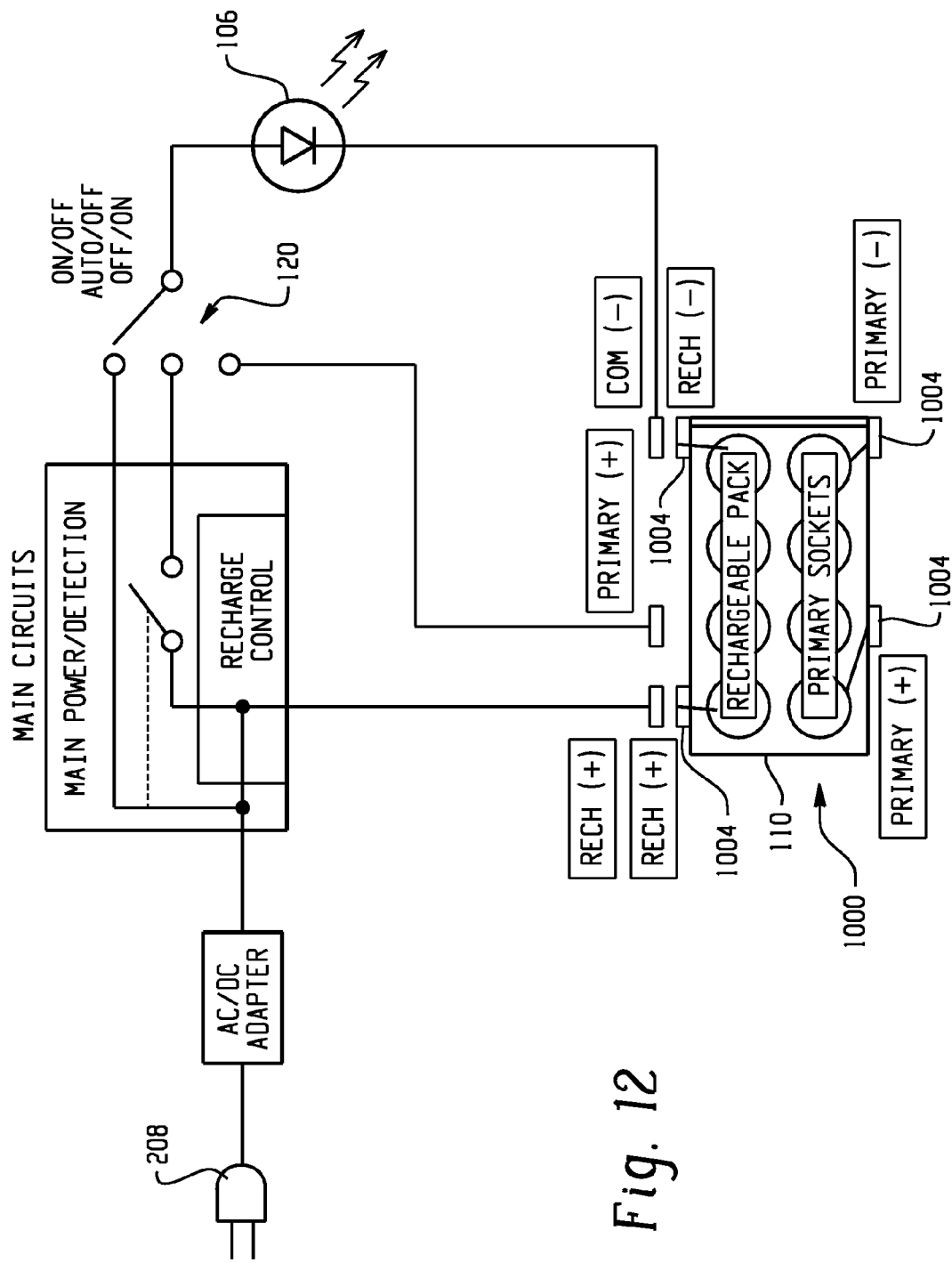
FIG. 12 is an electrical block diagram of a lamp and a battery cartridge.
Figure 13:
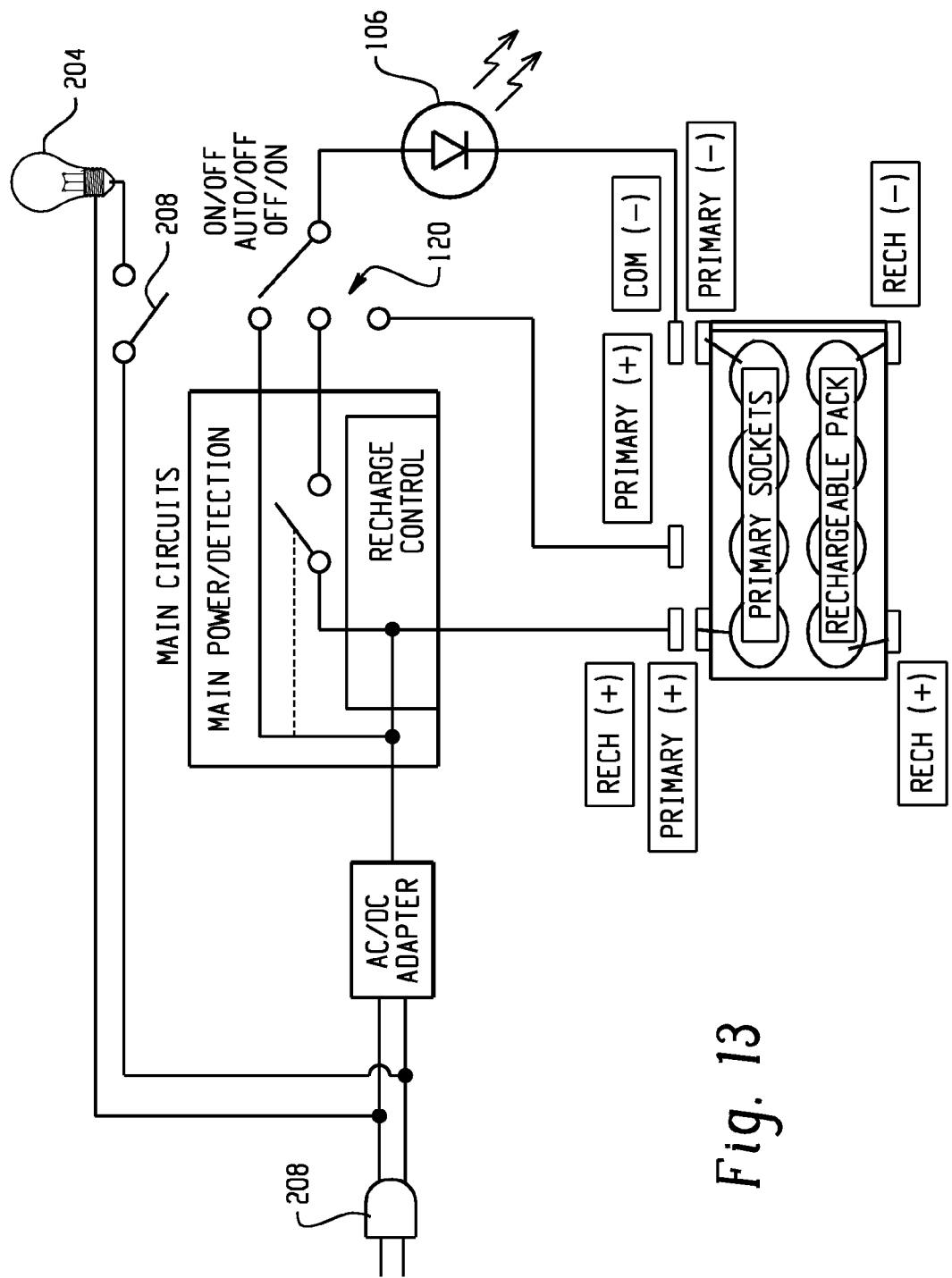
FIG. 13 is an electrical block diagram of a lamp and a battery cartridge.

Diagrams of the electrical connections for devices having only the light source 106 and both the light source 106 and the primary light source 204 are shown in FIGS. 12 and 13, respectively. As shown in FIGS. 12 and 13, the cartridge 1000 may also be provided with four (4) electrical contacts, with one pair being connected to the primary batteries 116 and the other to the secondary batteries 110, in which case the contacts in the lamp would be configured accordingly.

Verbiage, symbols, color coding, or other human perceptible indicators for communicating the orientation of the cartridge 1000 may be included on a second 1004 end thereof. Hence, the user is informed whether the secondary 110 or primary 116 batteries are connected to the circuitry. In one indication, the indicator includes color coding which coordinates with colors on the user control 118.

In operation, the user inserts the cartridge in the battery receiving region 1102 in the desired orientation. During normal operation, the cartridge 1000 is inserted in the first orientation. Accordingly, lamp's battery charging circuitry ordinarily maintains the secondary batteries 110 in the charged condition. Upon a loss of AC power, energy from the secondary batteries 110 is used to power the lamp as discussed above. Should the secondary batteries 110 become discharged, the user may elect to remove the cartridge 1000 from the lamp, rotate to the second position, and reinsert it. Energy from the primary batteries 116 is used to power the lamp. Should the primary batteries 116 become discharged, the user may remove the cartridge, replace the primary batteries 116 with fresh batteries, and reinsert the cartridge.

The foregoing arrangement provides the user with direct control over the batteries used to power the lamp while preventing the primary batteries 116 from receiving energy from the charger. The secondary battery charge detection circuitry 808 may also be omitted.

Note also that the cartridge or lamp may also include a user accessible switch which allows the user to switch between the secondary 110 and primary 116 batteries.

While the above discussion has focused on the use of the cartridge 1000 in connection with a desk lamp, it will be appreciated that the cartridge may be used in connection with a floor, desk, or other lamp, with the under cabinet 702 device, or with other devices.

Figure 14B:
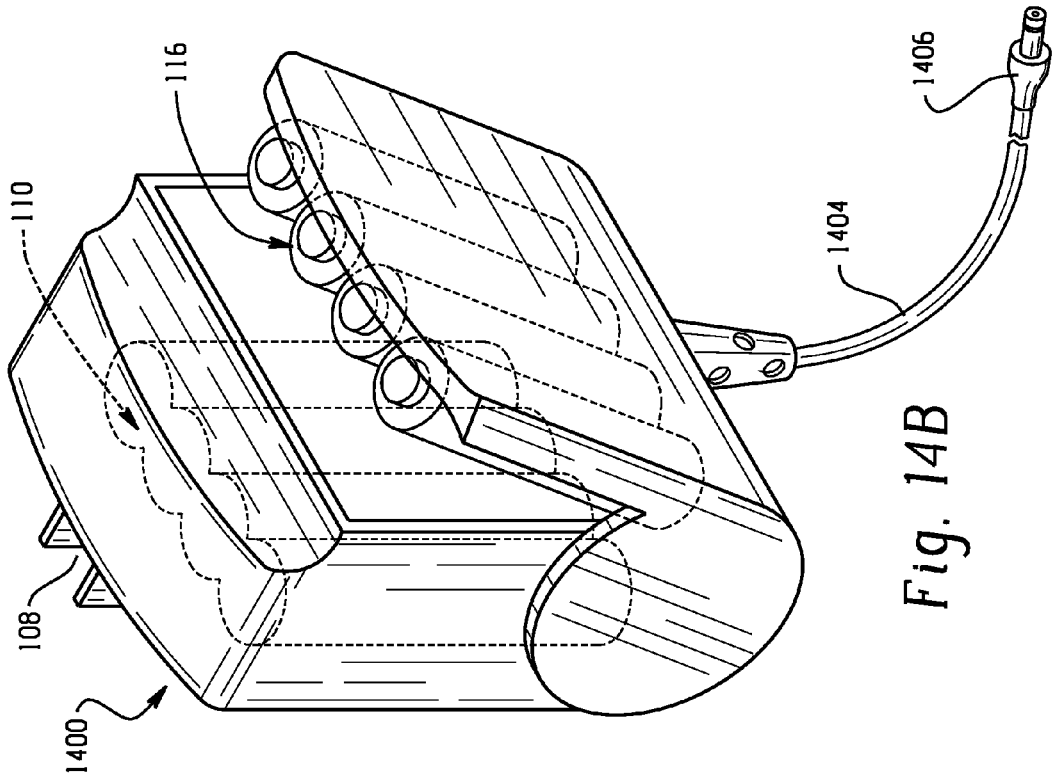
FIGS. 14A and 14B are perspective views of a wall adapter having battery backup capability.
Figure 14A:
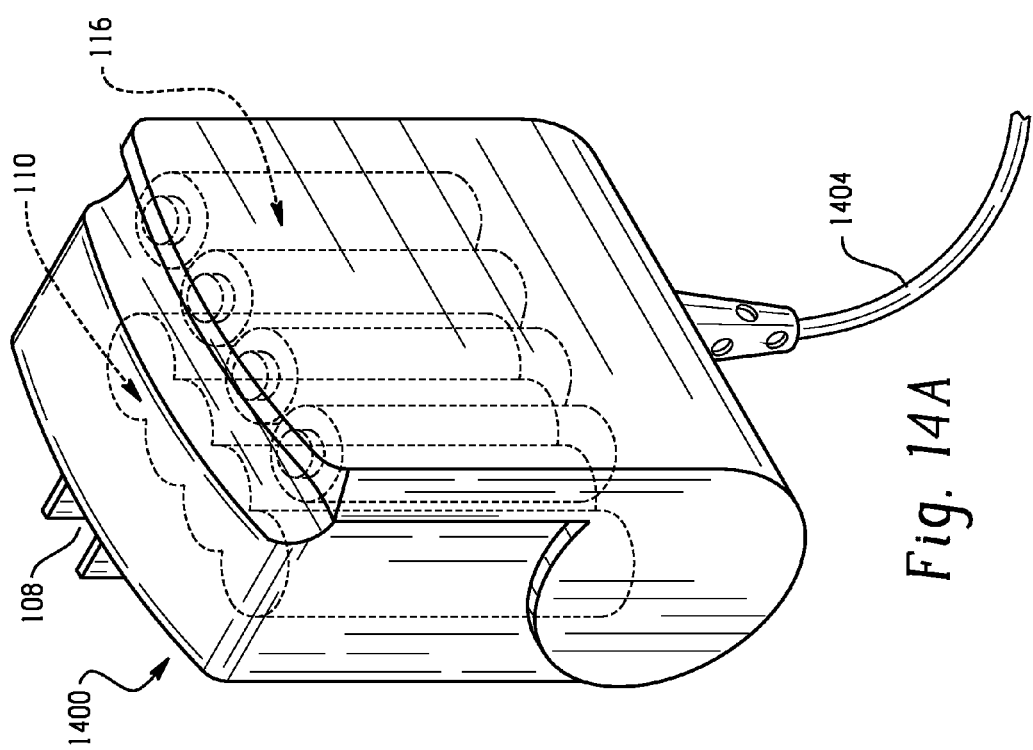

FIGS. 14A and 14B depict a wall plug adapter 1400 which includes battery backup capabilities. The adapter 1400 includes a conventional electrical plug 108 adapted to engage a standard AC power receptacle, receiving region(s) for accepting secondary 110 and/or primary 116 batteries, a power cable 1404, and an electrical connector 1406 adapted to engage the corresponding electrical connector of a battery powered device. Note also that the connector 1406 may be omitted; the adapter 1400 may then be hard wired to the battery powered device.

Figure 15:
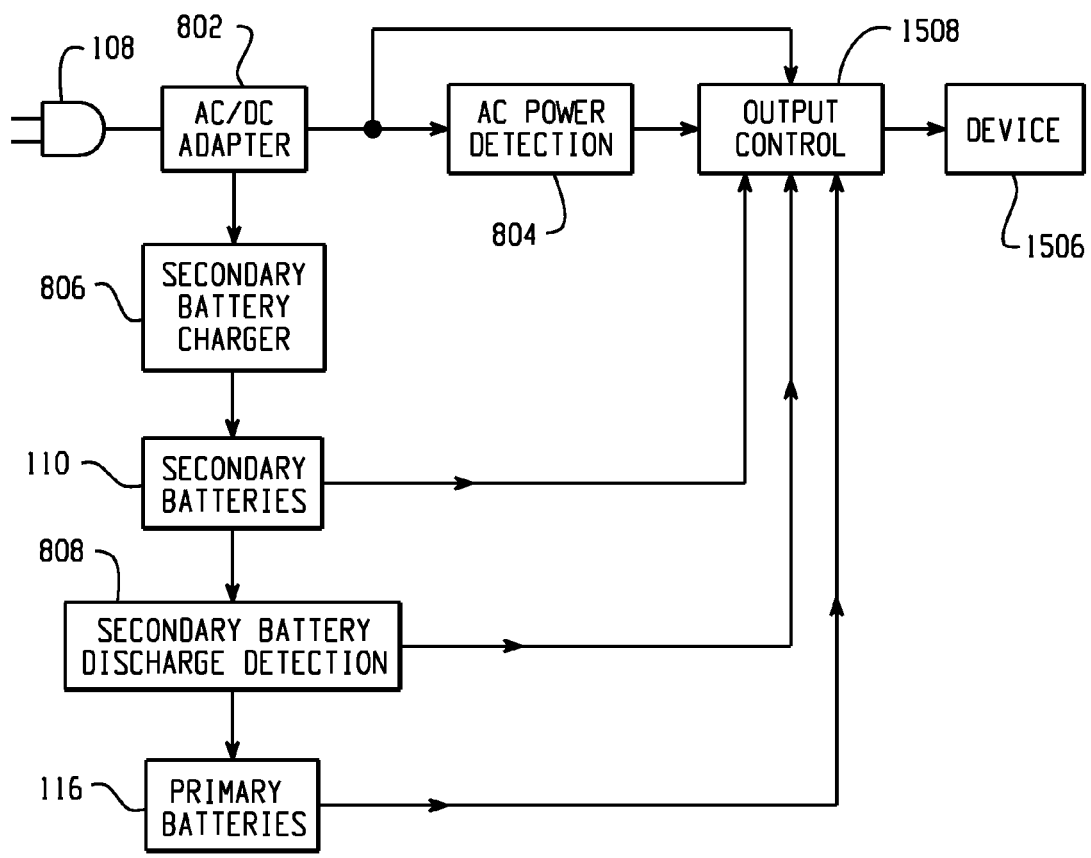
FIG. 15 is an electrical block diagram of a wall adapter.

FIG. 15 is an electrical block diagram of an adapter which accepts both secondary 110 and primary 116 batteries. The charger includes output control circuitry 1508 which selects the source of energy provided to the external device 1506. During normal operation, power from the AC lines is used to power the device 1506. In the event of a power loss, the control circuitry 1508 switches to the secondary batteries 110. Should the secondary batteries become discharged, the control circuitry 1508 switches to the primary batteries 116. Again, the user may readily replace the primary batteries 116 should they also become discharged. Note that the adapter 1400 may also include a suitable DC to DC converter(s) to convert the battery 110, 116 output voltage to a desired output voltage. The adapter 1400 may also include a switch which allows a user to selectively de-power the device output during a power interruption. The foregoing device is particularly well suited for use with appliances such as cordless telephones, answering machines, and the like which advantageously remain operational in the event of a power interruption.

Turning now to FIGS. 16A-D, a portable battery powered lighting device 1600 includes a portable light source 1602, a power switch 1604, and one or more secondary batteries (not shown). The devices 1600 are adapted to be removably mounted to a suitable mount 1610 such as a wall or ceiling mount which may in turn be permanently or semi-permanently mounted in a desired location. The devices 1600 may be mounted to the mounts 1610 using cut and loop fasteners, a mechanical or magnetic coupling, or other suitable fasteners 1612. An AC powered charging base 1608 is adapted to receive one or more lighting devices 1600 for charging. Following charging, the devices 1600 may be returned to a desired mounting base 1610. The portable light sources 1602 may also be adapted to operate with the cabinet appliance 700. As will appreciated, the foregoing device is especially well suited for providing lighting in locations which are not otherwise located near a suitable AC power outlet, for example near a stairwell as shown in FIG. 16D.

Figure 17:
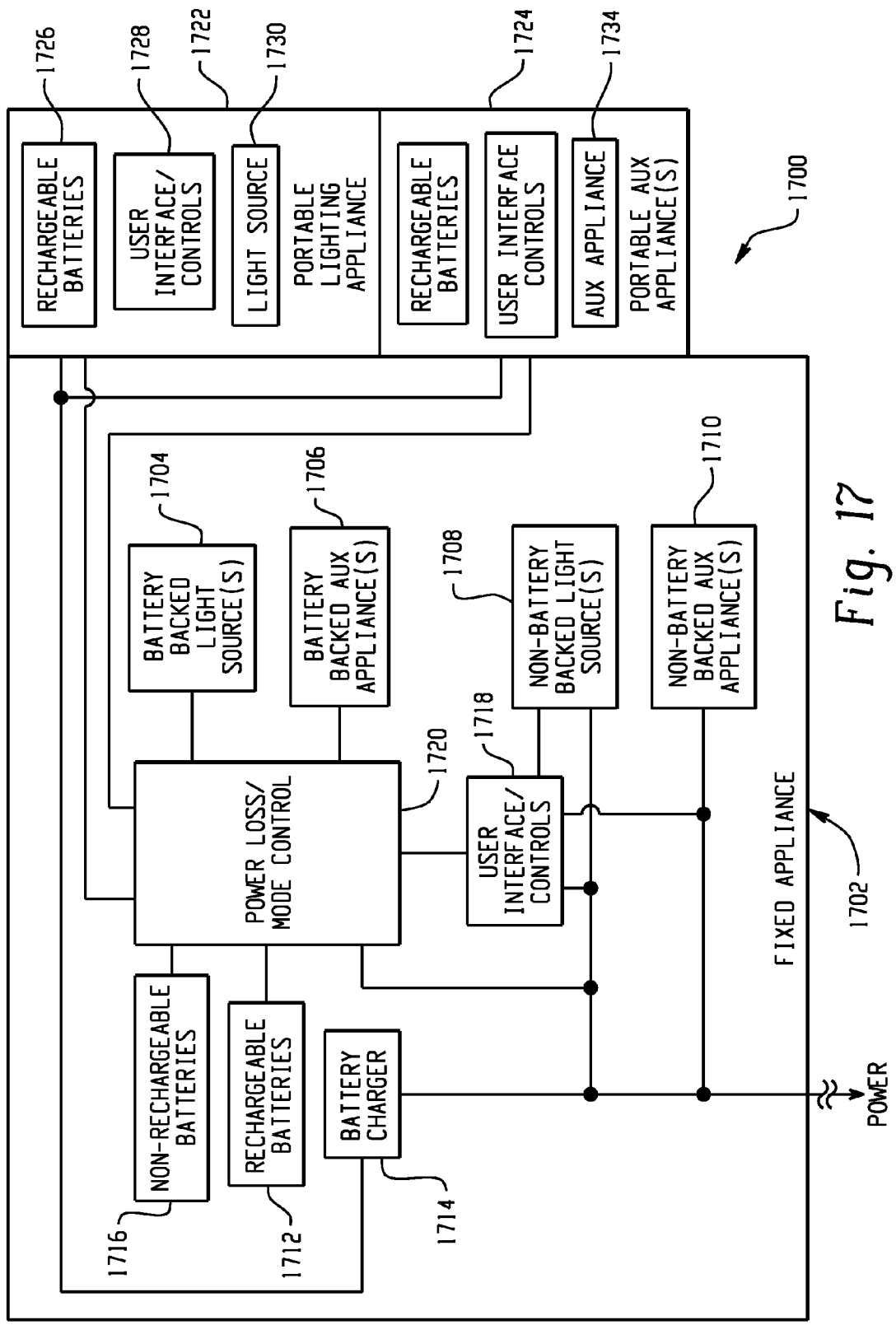
FIG. 17 is a block diagram of a hybrid battery powered electrical appliance.

More generally, a functional block diagram of a hybrid battery powered appliance 1700 is shown in FIG. 17. As can be seen, the appliance includes a fixed appliance 1702. In this sense, fixed should be understood to mean that the fixed appliance 1702 is connected to the AC power mains or other suitable power source during normal operation. The fixed appliance 1702 may be readily portable, or may be permanently or semi-permanently affixed in a particular location. It should also be noted that the connection to the power source may be made through an external power supply such as a conventional power cube. Some or all of the power supply functionality may also be incorporated into the fixed appliance 1702.

The fixed lighting appliance 1702 includes one or more battery backed light sources 1704. The fixed lighting appliance 1702 may also include one or more battery backed auxiliary appliances 1706, one or more non-battery backed light sources 1708, and one or more non-battery backed auxiliary appliances 1710.

The fixed appliance 1702 also includes rechargeable (secondary) batteries 1712. A battery charger 1714 operatively electrically connected to the rechargeable batteries 1712 and the power source maintains the charge state of the batteries 1712. The fixed appliance may also include non-rechargeable (primary) batteries 1716. A user interface 1718 includes one or more user operable switches, input devices, remote control inputs, or other user operable controls which allow the user to control the operation of the various light source(s) and/or auxiliary appliance(s) associated with the appliance 1700. Where the user interface includes a remote control input, the appliance 1700 may be supplied with a suitable remote control device. The user interface 1718 may also include one or more human readable status indicators which indicate an operating status or mode of the appliance 1700 or its various components.

A power loss/mode controller 1720 controls the operation of the battery backed lights source(s) 1704 and/or the battery backed light auxiliary appliance(s) 1706 based on the user controls 1718 and the status of the power source. When power is available from the power source, the power loss/mode control circuitry 1720 allows the battery-backed light source(s) 1704 and appliance(s) 1706 to function normally as specified by the user controls 1718.

In the case of a power failure, or when the external power source is otherwise unavailable, the power loss/mode control circuitry 1720 automatically controls the operation of the various battery-backed devices according to desired priority rules. Where the fixed appliance 1702 includes both rechargeable 1712 and non-rechargeable 1716 batteries, the rechargeable batteries 1712 are used first. Should the rechargeable batteries 1712 become discharged, operation switches to the non-rechargeable batteries 1716. The various devices 1704, 1706 may also be automatically turned on in a low power mode or, if operating, placed into a power saving operating state. In one embodiment, the user may elect to over-ride the automatically determined mode and thus cause a desired device to turn off or to operate in a full power mode.

Operation of the non-battery backed light sources 1708 and/or auxiliary appliances 1710, where provided, is also controlled via the user interface 1718. While the FIG. 17 shows the relevant controls as controlling the power provided to the non-battery backed devices 1708, 1710, it will be appreciated that other controls may also be provided depending on the nature of the auxiliary device and the desired degree of control. Of course, the non-battery backed devices 1708, 1710 will ordinarily not function in case of a power loss.

One advantage of including non-battery backed devices 1708, 1710 is that devices which operate at relatively high power levels may readily be incorporated in the appliance 1700. In the case of a lamp, for example, the non-battery backed light source 1708 may be implemented as one or more conventional, AC powered electric lights which provide a relatively high light output. The battery backed devices may be implemented using relatively lower power, higher efficiency light sources such as LEDs. While such sources can generally be used to provide reasonable light levels during normal operation, their relatively lower power requirements are better-suited to battery powered operation than are conventional electric lights.

The hybrid appliance 1700 may also include one or more portable battery backed light sources 1722 and/or one or more portable battery backed auxiliary appliances 1724. The portable devices include rechargeable batteries 1726 and a suitable user interface 1728. During normal operation, the battery charger 1714 maintains the charge state of the various batteries 1726. The portable devices 1722, 1724 also include removable covers or housings which allow the user to replace the batteries 1726 in the case of an extended power outage.

When configured as a portable light source 1722, the portable device includes one or more light sources 1730. A portable appliance 1724 includes one or more battery powered auxiliary appliances 1734. When installed on the fixed appliance 1702, the portable devices 1722, 1724 are advantageously operated via the user controls 1718 and the power loss/mode controller 1720 in a manner similar to those of or otherwise in coordination with the battery backed devices 1704, 1706. Even more advantageously, the portable devices may be configured to contribute to or complement the day-to-day function of the fixed appliance 1702.

In one implementation, the priority rules are such that the portable devices 1722, 1724 are automatically turned off in the case of a power loss as an energy conserving measure. In any case, the portable devices 1722, 1724 are advantageously configured to be readily removable from the fixed appliance as desired by the user.

Various configurations of the hybrid battery powered appliance 1700 are contemplated. As described above in relation to FIGS. 1 through 5 above, for example, the appliance can take the form of a lamp suitable for home or office use. More particularly, the lamps have a form factor, aesthetics, and operating characteristics similar to those of conventional AC powered lamps, but have additional utility in case of a power failure. As described in relation to FIG. 7, the appliance 1700 takes the form of an under cabinet mounted device. Of course, the various lamps may be provided with portable devices 1722, 1724; the under cabinet appliance may be provided without portable devices 1722. Of course, still other configurations, whether suitable for home use, office use, or otherwise, are also contemplated. Still additional examples are provided below.

Figure 18:
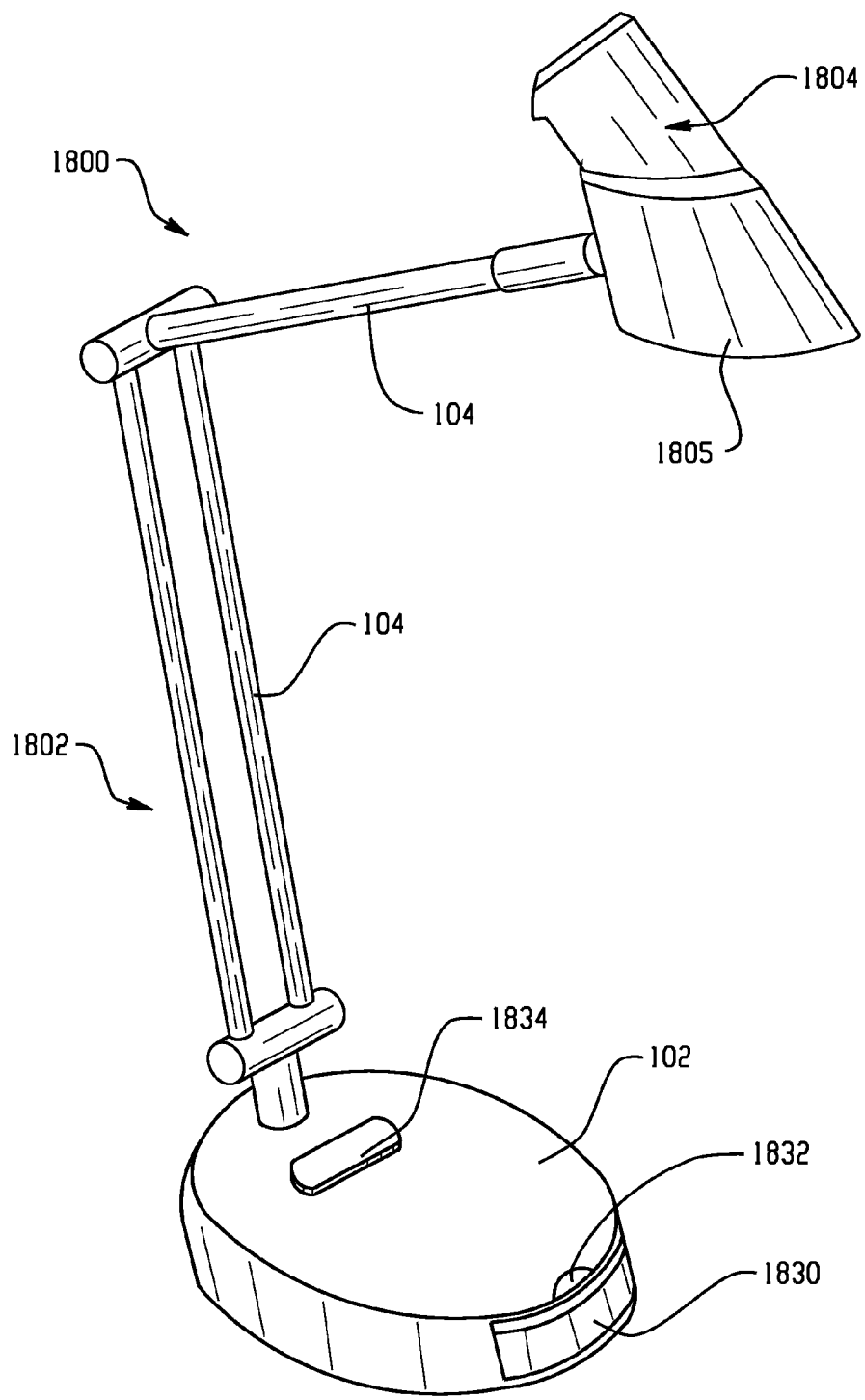
FIG. 18 depicts a desk lamp.
Figure 19:
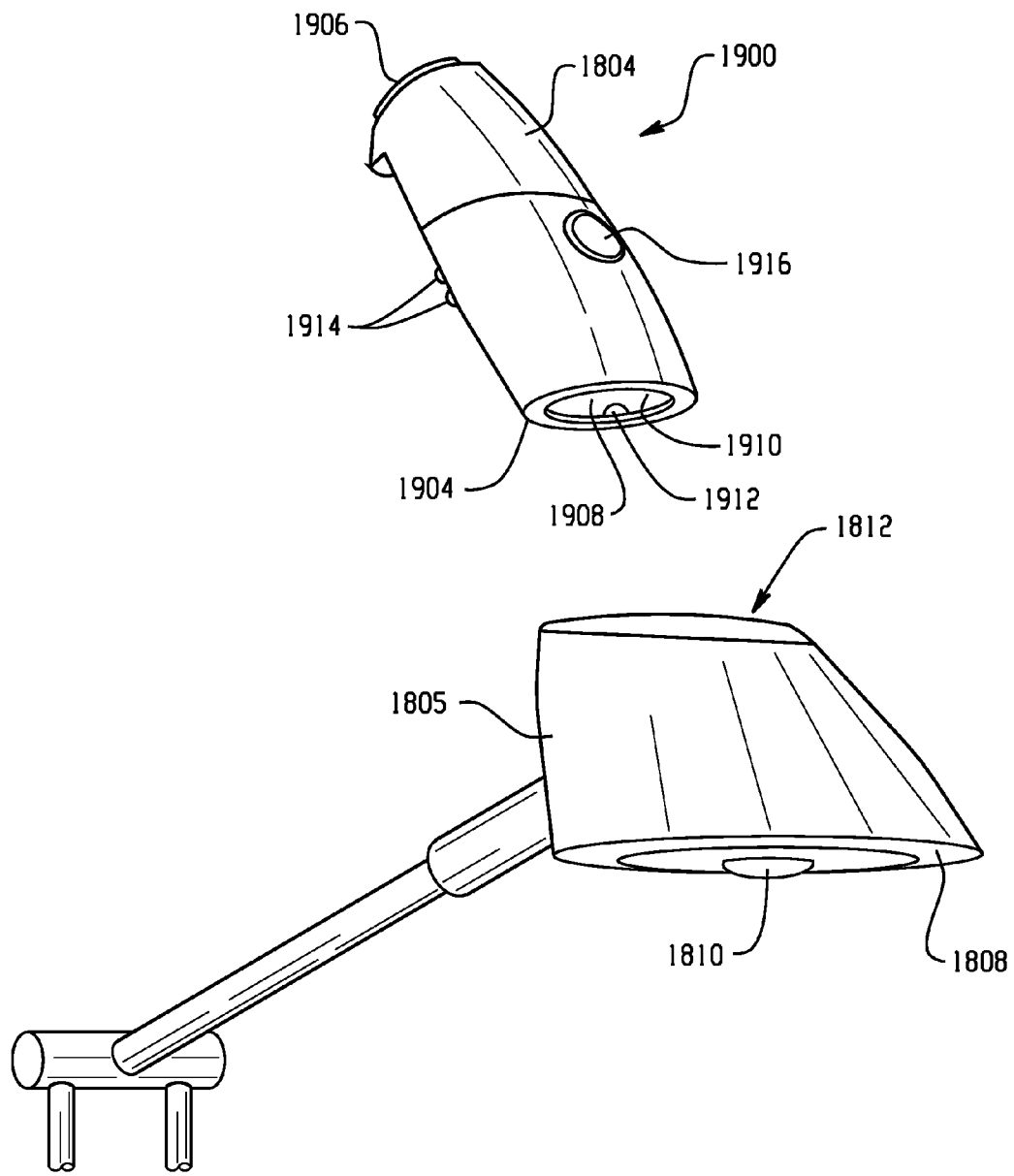
FIG. 19 is an exploded view of a portion of a desk lamp.
Figure 20:
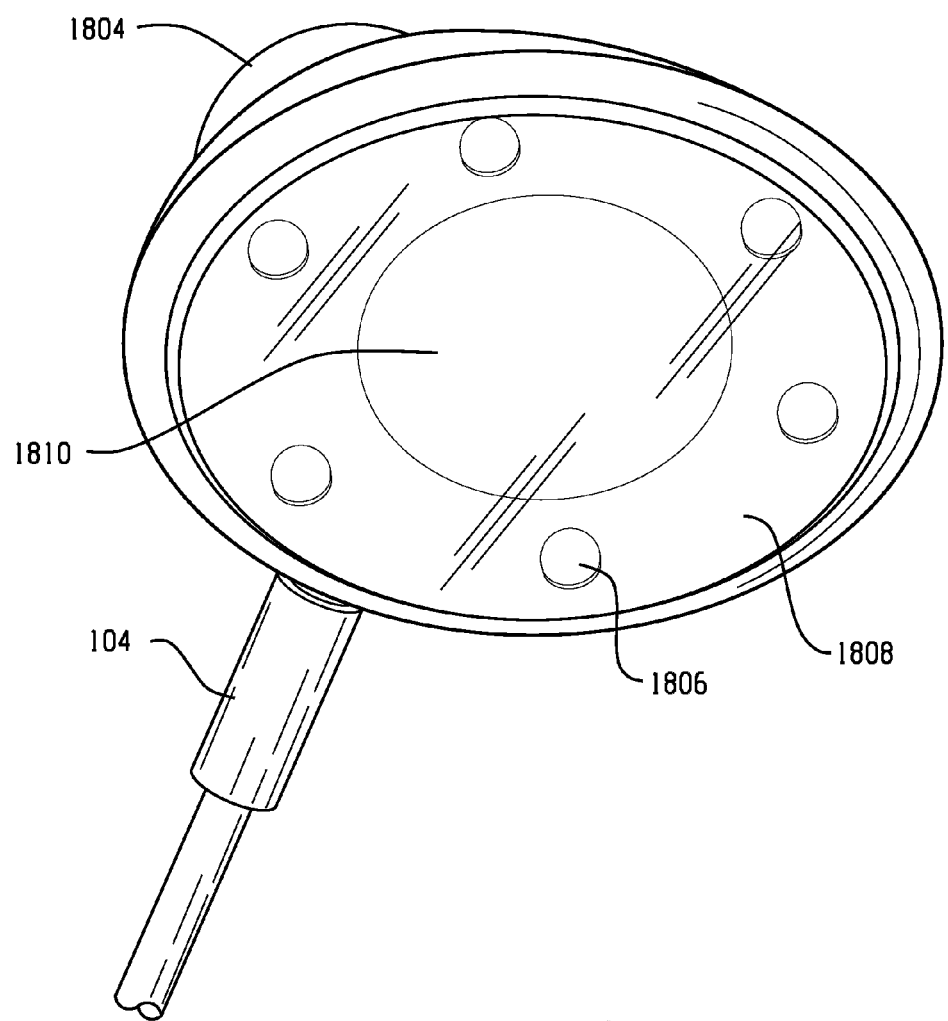
FIG. 20 depicts a portion of a desk lamp.

Turning now to FIGS. 18, 19, and 20 an exemplary desk lamp 1800 includes both a fixed appliance 1802 and a portable appliance 1804. The portable appliance 1804 can be readily removed from the lamp 1800 for use as a flashlight.

The fixed appliance 1802 includes a base 102 and support arms 104 analogous to those described above in relation to FIGS. 1 and 2. With additional reference to FIG. 19, the fixed appliance 1802 includes shroud or head 1805.

The shroud 1805 carries a battery backed light source 1806 such as a plurality of LEDs disposed in a generally circular arrangement for illuminating the surface of a desk or other desired area. The light from the light source 1806 shines through a protective cover 1808 which, in the vicinity of the LEDs, is substantially non-diffuse. A central portion of the cover 1808 includes an optical diffuser 1810 such as an etched, frosted, or translucent portion which serves to diffuse or soften light shining therethrough. The shroud 1805 also includes a generally cylindrical material free region 1812 which selectively receives the portable lighting appliance 1804. The material free region 1812 generally aligns with the diffuser 1810.

The portable lighting appliance 1804 includes a generally cylindrical housing 1900 having proximal 1904 and distal 1906 ends. The housing 1900 can be opened by the user to access a battery receiving region which selectively receives a plurality of batteries, for example three (3) AA or AAA size nickel metal hydride (NiMH) batteries, although other numbers, sizes, or chemistries (including primary and secondary batteries) are also contemplated.

Disposed at the proximal end 1904 of the portable lighting appliance 1804 is a light source 1908 such as an LED, a reflector 1910, and a lens 1912. In one implementation, the reflector 1910 and lens 1912 are configured to provide a relatively narrow spot or beam light similar to that of a conventional flashlight beam. In such a configuration, the lens 1912 would ordinarily be substantially clear or otherwise non-diffuse.

A user operable switch 1916 such as a pushbutton on-off switch allows the user to turn the light source 1908 on and off as desired. Electrical connectors 1914 such as positive and negative contacts engage corresponding electrical connectors disposed in the shroud 1805 to provide power to the portable lighting appliance 1804 when it is installed in the shroud 1805.

As illustrated, the portable lighting appliance 1804 has a generally cylindrical form factor similar to that of a conventional flashlight. The housing exterior advantageously has a somewhat asymmetrical cross section or is otherwise keyed so that the portable lighting appliance 1804 is received in the shroud 1805 proximal end 1904 first and in a defined angular orientation.

The base 102 contains a user-operable switch 118, batteries, and circuitry as generally described above. In one implementation, the base 102 receives four (4) AA or AAA size rechargeable batteries. Using batteries of the same size as those in the portable lighting appliance 1804, while not essential, is generally more convenient for the user. As illustrated, the base 102 also includes a slide-out battery tray 1830 which holds a plurality of primary batteries (e.g., four (4) AA or AAA size batteries). A user operable latch 1832 controls opening or closing of the tray 1830.

In one implementation, the user controls include a multiple position slide, rotary, or other switch 1834, the operation of which is shown in relation to Table 2:

TABLE 2

| | Light Source Status | | | |
|---|---|---|---|---|
| | External Power On | | External Power Off | |
| Switch 1834 Position | Battery Backed Light Source 1806 | Portable Light Source 1908 | Battery Backed Light Source 1806 | Portable Light Source 1908 |
| On/High | On | On | On | Off |
| On/Low | On | Off | On | Off |
| Auto/Off | Off | Off | On | Off |
| Off | Off | Off | Off | Off |

In the event of a power failure, the lamp 1800 automatically assumes the operating state set out in the External Power Off Column. Optionally, the user may be permitted to override the operating state, for example, by returning the switch 1834 to the off position, and then back to the desired position. Note that one or more intermediate operating modes (e.g. On/Med) may also be provided.

In case of a power failure, the fixed light source 1806 may also be operated in a dim mode (e.g., by operating only a subset of the LEDs and/or by operating the LEDs at a reduced duty cycle). The light source 1806 may also be operated for a limited period of time, for example on the order of several minutes, whereupon the light source 1806 is automatically turned off to conserve battery life. In still another implementation, the portable light source 1908 is illuminated, either alone or in combination with the battery backed light source 1806. The operating controls may also include a dimmer which allows the user to selectively vary the brightness of the fixed 1806 and/or the portable 1908 light sources.

Of course, the operating controls described in relation to the desk lamp 1800 can be applied to the various devices described herein. Similarly, the various operating controls described herein can be applied to the desk lamp 1800.

In operation, the user installs the portable lighting appliance 1804 in the fixed portion 1802 by inserting the proximal end 1904 in the material free region 1812. The relatively narrow light beam provided by the portable lighting appliance 1804 is diffused by the diffuser 1810 so as to soften or disperse the light. The degree of diffusion provided by the diffuser 1810 is advantageously selected so that the area illuminated by the light source 1908 is approximately coextensive with the area illuminated by the fixed light source 1806. Thus, the area illuminated by the lamp 1800 is illuminated relatively more evenly, with the light intensity varying as selected by the user. The diffuser 1810 may also be omitted.

The user may at any time remove the portable lighting appliance 1804 from the lamp 1800 for use as a flashlight, with its operation controlled by the on-off pushbutton switch 1912. When removed from the lamp 1800, however, the portable lighting appliance 1804 provides the illumination characteristics typical of a flashlight beam. To recharge the portable lighting appliance 1804 batteries, the user reinstalls the portable lighting appliance 1804 in the lamp 1800. In case of an extended power outage, the user may replace the portable lighting appliance 1804 batteries and/or the batteries contained in the base 102 as needed.

Figure 21A:
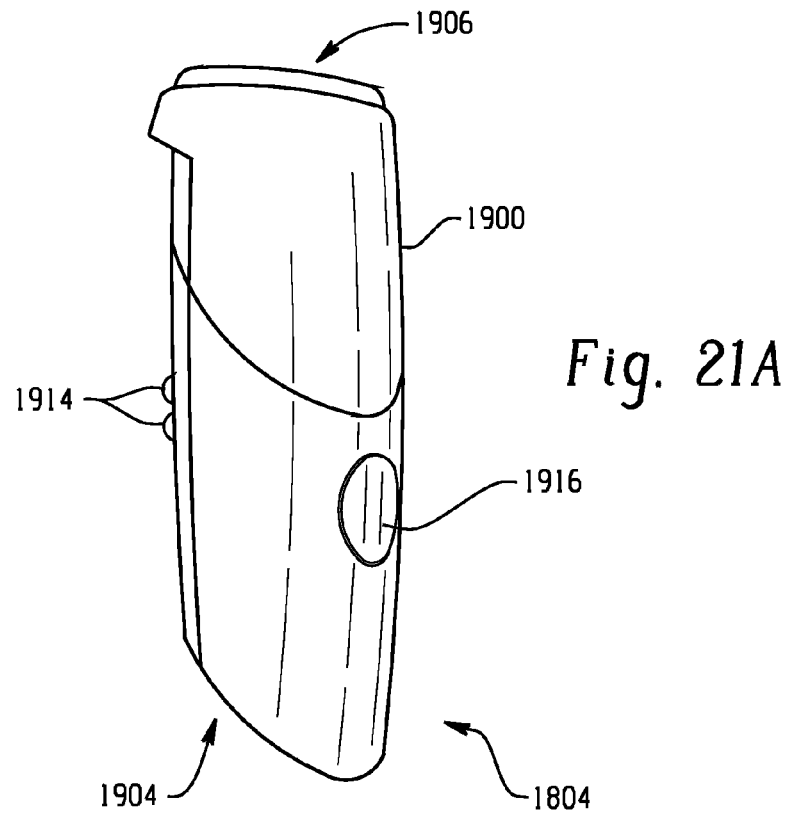
FIGS. 21A and 21B depict portable appliances.
Figure 21B:
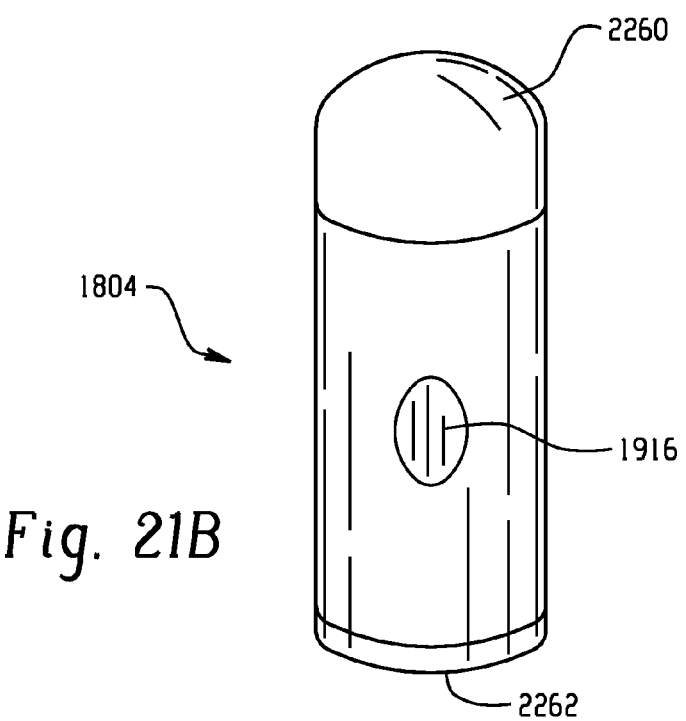

Other variations are contemplated. For example, and as illustrated in FIG. 21B, the portable lighting appliance 1804 may be configured to provide an area flashlight. As illustrated, the portable lighting appliance 1804 includes a dome shaped, translucent cover 2260 so that the portable lighting appliance 1804 provides a substantially omnidirectional lighting pattern. Also as illustrated, the portable lighting appliance 1804 includes a substantially flat bottom surface 2262 so that the light source 1804 may be stood upright. The light source 1804 may also be provided with a flat side surface so that the portable lighting appliance 1804 may be placed on its side.

In another variation, the portable lighting appliance 1804 is installed in the lamp 1800 distal end 1906 first so that it shines in a direction opposite that of the light source 1806 (e.g., upward). In still another variation, the portable lighting appliance 1804 may be inserted in the lamp 1800 either proximal end 1904 or distal end 1906 first as desired by the user. The portable lighting appliance 1804 may also carry two light sources, for example a first light source disposed at the proximal end 1904 and a second light source disposed at the distal end 1906, with operation controlled by a suitable switch or switches. The light sources may be configured as beam sources, area lights, or a desired combination thereof (e.g., one beam source and one area light). The lamp 1800 may also be provided with a non-battery backed light source, either in addition to or in lieu of the battery backed light source 1806. The portable lighting appliance 1804 may also have a non-cylindrical form factor.

Figure 22:
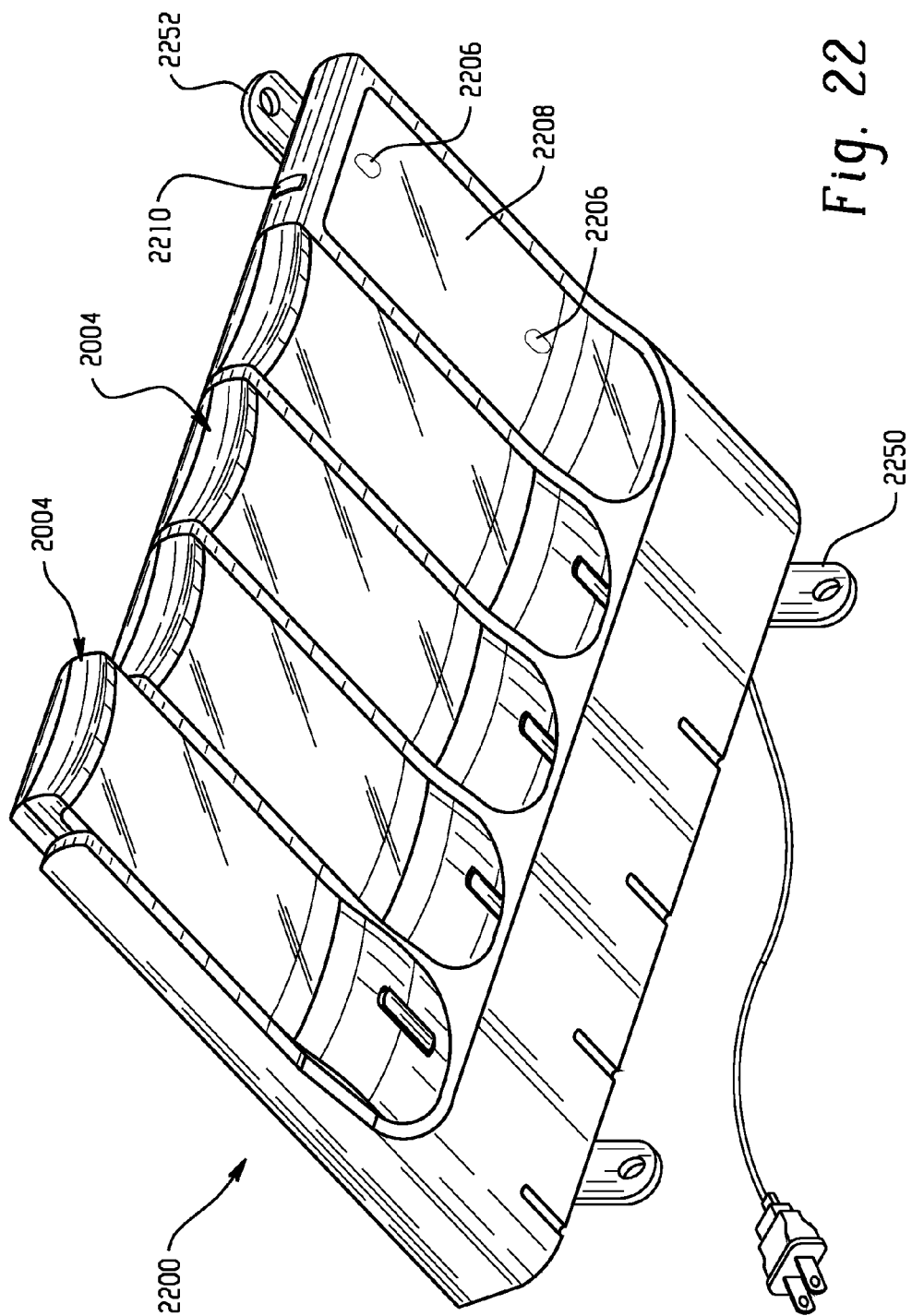

Turning now to FIG. 22, a hybrid battery powered lighting appliance 2200 includes a fixed portion such as a base 2202 and a plurality of portable lighting appliances 2204 which also function as area lights.

The base 2202 includes a battery backed nightlight 2206 which includes two (2) LEDs disposed behind a diffuser 2208 such as cylindrical light pipe diffuser and/or a translucent panel. A user operable switch 2210 includes off, on/high, on/low, and auto/off operating positions which function as described above in relation to Table 2 above, where the nightlight 2206 is analogous to the battery backed light source 1806 and the plurality of portable lighting appliances 2204 are analogous to the portable lighting appliance 1804. The switch 2210 may also include one or more intermediate positions where one, two, or three of the portable lights sources 2204 are illuminated, or other desired positions.

The portable lights sources 2204 ride on rails in their respective receiving regions and are held in place by corresponding spring latch mechanisms. To remove a portable lighting appliance 2204, a user pushes inwardly to release the spring latch mechanism, whereupon the unit is pushed out far enough to be grasped and slid out along the rails. Other mounting techniques may also be used.

Turning now to FIGS. 23A, 23B, and 23C, the portable lighting appliances 2204 include a light source such as two (2) LEDs 2304, 2306 disposed at the opposite ends of a generally cylindrical light pipe diffuser 2302. The diffuser 2302 is in turn disposed behind a translucent cover 2310 (rendered transparent in FIG. 23A for ease of illustration). In the illustrated embodiment, the translucent cover extends along the sides of the portable lighting appliances 2204 so that an approximately 270 degree illumination is provided. A pushbutton switch 2308 allows a user to operate the light source as desired. Fully depressing the switch 2308 turns the light source 2204 on and off.

The switch also includes an intermediate position. When in the intermediate position, the light source illumination is governed by the power provided by the base 2202. With reference to FIG. 22, the switches 2308 engage a corresponding surface of the base 2202 and are thus maintained in the intermediate position when inserted therein. Longitudinally extending grooves or channels 2312, 2314 ride on the corresponding rails in the respective receiving regions. Electrical contacts 2316 provide electrical contact to the base unit 2202.

The portable lights sources 2204 may be placed vertically or horizontally on a desired surface. Rubberized feet 2318 may be provided on the bottom and/or rear surfaces to facilitate placement on a countertop or other desired surface. Magnets, hooks, clasps, or other desired fasteners may be provided.

While portable lighting appliances 2204 have been described as area lights, one or more of the devices may also be configured to provide a flashlight beam or other desired light output, either addition to or in place of the area light. In one such configuration, the flashlight beam shines downwardly (when the appliance is oriented as shown in FIG. 22A) through a based mounted diffuser, so that the portable lighting appliances 2204 provide a relatively more diffused light when installed in the base.

The base 2202 may be configured to facilitate placement or mounting of the appliance 2200 in a plurality of positions, for example suspended underneath a cabinet, placed on a countertop, or mounted to a wall. To this end, the rear side of the base may contain a plurality of mounting bosses or rubberized feet 2252 which facilitate fastening to or placement on a desired surface. Feet 2250 may also be provided to support the base 2202 in a vertical orientation for placement on a horizontal surface. FIG. 24 provides another example of vertical support feet for the base 2202. In FIG. 24, feet 2404 are pivotally mounted to the base 2202 so that they pivot away from a surface 2408 of the base 2202 to provide such support. When not being utilized for support, the feet 2404 can be pivoted towards the surface 2408 of the base 2202.

Figure 25:
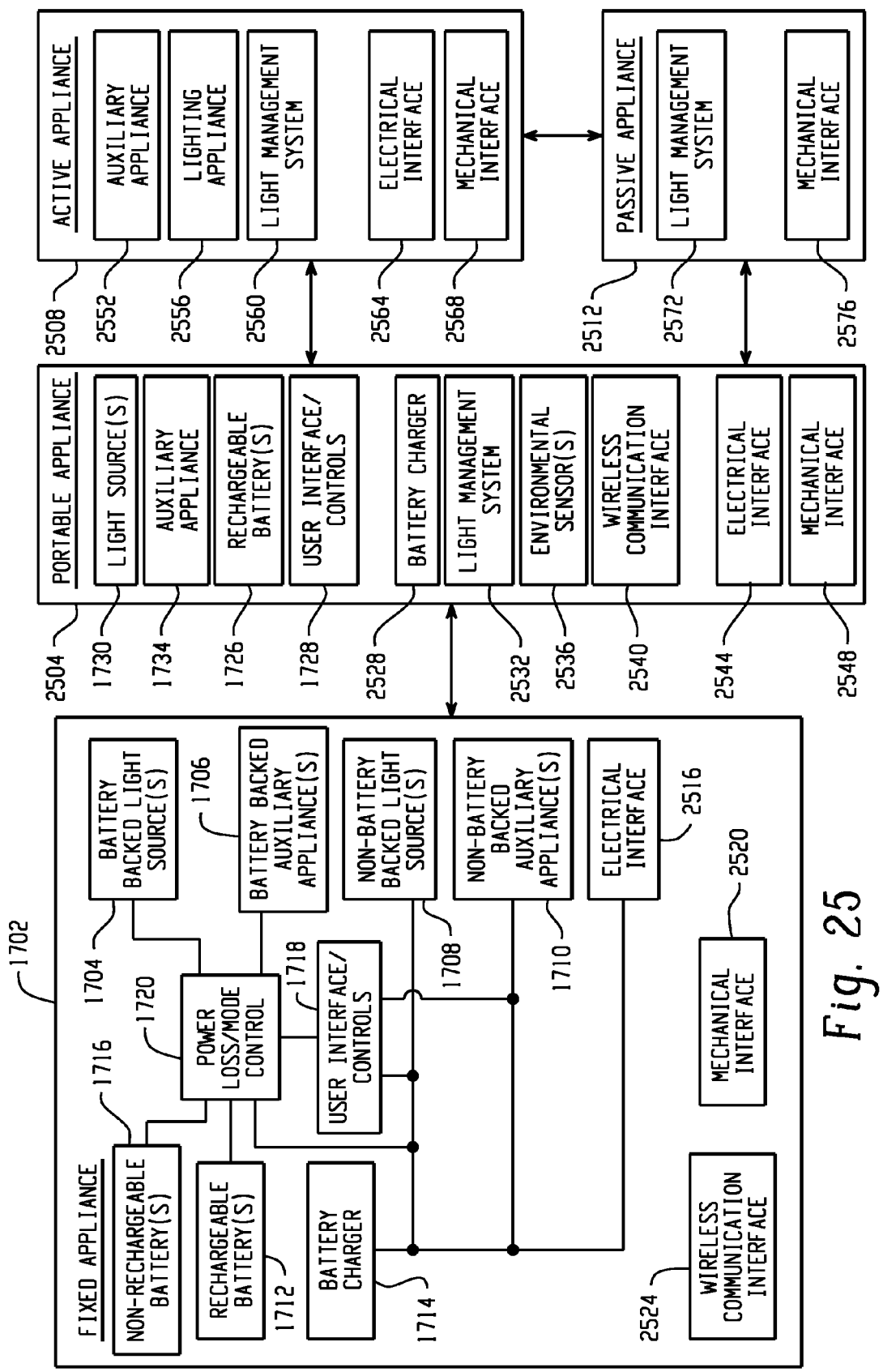
FIG. 25 is a block diagram of a hybrid battery powered electrical appliance.

FIG. 25 illustrates a block diagram of a family of appliances including one or more of the fixed appliance 1702, a portable appliance 2504, an active appliance 2508, and a passive appliance 2512.

The fixed appliance 1702 is generally discussed above in connection with FIG. 17. FIG. 25 additionally expressly shows electrical and mechanical interfaces 2516 and 2520 of the fixed appliance 1702. The electrical interface 2516 provides electrical communication with the AC power main and the portable lighting appliance 2504, for example, through an electrical contact(s), inductive coupling, or the like. The mechanical interface 2520 is used for physical placement or mounting of the fixed appliance 1702 to an external physical structure. The mechanical interface 2520 also receives or otherwise mechanically engages the portable appliance 2504. The fixed appliance 1702 optionally further includes one or more optional environmental sensors 2536 and a wireless communication interface 2524. Examples of suitable environmental sensors 2536 include a light sensor, a temperature sensor, and a motion sensor that respectively sense a state of the environment surrounding the fixed appliance 1702. The wireless communication interface 2524 provides one or two way wireless communication with a wireless communication interface of the portable appliance 2504, a wireless remote control, a wireless network, as well as other devices and/or systems having a suitable wireless communication interface. Examples of suitable wireless communication include radio frequency (RF), visible light, and infrared (IR) wireless communication as well as other wireless communication.

The portable appliance 2504 includes one or both of the light source(s) 1730 and the auxiliary appliance 1734. The user interface/controls 1728 provide user operable controls that allow the user to control the operation of the light source(s) 1730 and/or the auxiliary appliance 1734 and may also include one or more human readable status indicators as described above in connection with FIG. 17. The rechargeable battery(s) 1726 provides power that illuminates the light source(s) 1730 and powers the auxiliary appliance 1726 as described above in connection with FIG. 17. An optional battery charger 2528 maintains the charge state of the rechargeable battery(s) 1726 when the portable appliance 2504 is supplied with AC power from the fixed appliance 1702.

The portable appliance 2504 may also include a light management system 2532 that diffuses or otherwise optically influences light emitted by the light source(s) 1730. One or more optional environmental sensors 2536 sense a state of the environment surrounding the portable appliance 2506. An optional wireless communication interface 2540 wirelessly communicates with the wireless communication interface 2524 of the fixed appliance 1702, the remote control, the wireless network, and the other devices and/or systems having a suitable wireless communication interface.

An electrical interface 2544 provides complementary electrical communication with the electrical interface 2516 of the fixed appliance 1702 and receives AC power for powering the various components of the portable appliance 2506 therefrom. The electrical interface 2544 may also receive power from an AC power main. The electrical interface 2516 further provides electrical communication with the active appliance 2508 such as via an electrical contact(s), inductive coupling, or the like. A mechanical interface 2548 2544 provides complementary communication with the mechanical interface 2520 of the fixed appliance 1702, as well as mechanical communication with the active and passive appliance 2508 and 2512 and various surfaces. For instance, the mechanical interface 2548 of the portable appliance 2504 can be placed on or affixed to an external physical structure.

An active appliance 2508 includes one or more of an auxiliary appliance 2552 and a light source(s) 2556 and a light management system 2560. The auxiliary appliance 2552 and the light source(s) 2556 are substantially as described in connection with the auxiliary appliance 1734 and the light source(s) 1730 of FIG. 17, the light management system 2556 is substantially as described in connection with the light management system 2532. An electrical interface 2564 electrically engages the active appliance 2508 with the electrical interface 2544 of the portable appliance 2504 and receives AC power therefrom. The received power powers the auxiliary appliance 2552 and the light source(s) 2528. A mechanical interface 2568 mechanically engages the mechanical interface 2548 of the portable appliance 2508. Where a passive appliance 2512 is used in conjunction with the active appliance 2508, the mechanical interface 2568 mechanically also engages the passive appliance 2508. The mechanical interface 2568 may also be used to physically place or affix the active appliance 2508 on an external physical structure.

A passive appliance 2508 includes a light management system 2572 as substantially as described in connection with the light management system 2532. A mechanical interface 2576 mechanically engages one of the mechanical interface 2548 of the portable appliance 2504 and the mechanical interface 2568 of the active appliance 2508. The mechanical interface 2576 also allows the passive appliance 2508 to be physically placed or affixed to an external structure such as a wall or table.

Various configurations are now discussed. A family of appliances are described in relation to FIGS. 26-31. Initially referring to FIG. 26, a hybrid battery powered lighting appliance 2600 includes a fixed appliance 2604 and portable appliances 2608. The fixed appliance 2604 is substantially as described above in connection with the fixed appliance 2202 of FIG. 22. However, in this example the fixed appliance 2604 has two portable appliance receiving regions for respectively receiving and holding two portable appliances 2608. Configurations with less than four, with five, and with more than six receiving regions are also contemplated. The portable appliances 2608 are analogous to the portable appliance 2204 of FIGS. 22 and 23.

Turning to FIG. 27, a removable table top light 2700 includes a fixed appliance 2704 and a portable appliance 2708. The fixed appliance 2704 has a mechanical interface 2712 that receives the portable appliance 2708. As shown, the mechanical interface 2712 includes rails 2716 for receiving complementary slots 2720 of a mechanical interface 2724 of the portable appliance 2708. The fixed appliance 2704 also includes an electrical interface 2728 such as electrical conductive contacts 2732 that engage and electrically communicate with electrical conductive contacts of the portable appliance 2708. The fixed appliance 2704 also includes a battery charger and an electrical cord 2736 having electrical contacts 2740 that receive power from a standard AC receptacle. The portable appliance 2708 is analogous to the portable appliance 2204 of FIGS. 22 and 23.

The removable table top light 2700 is well suited for placement on a horizontal surface such as a counter, table, or desk top. When the portable appliance 2708 is received in the fixed appliance 2704, the battery charger charges the rechargeable battery(s) of the portable appliance 2708 using the power received from the AC receptacle. The portable appliance 2708 may also automatically illuminate in the case of a power failure as described above. The user may also remove the portable appliance 2708 from the fixed appliance 2704, in which case the portable appliance 2708 may be used as a portable light source that is powered by power form the rechargeable battery(s). The user may also place the portable appliance 2708 on a horizontal surface or insert the portable appliance 2708 into one of the portable appliance receiving regions of either of the fixed appliances 2202 or 2604.

Turning next to FIG. 28, a removable night light 2800 includes a fixed appliance 2804 and a portable appliance 2808. The fixed appliance 2804 has an electrical interface 2812 that includes electrically conductive contacts 2816. The electrically conductive contacts 2816 physically plug into a standard AC receptacle and receive AC power therefrom. The fixed appliance 2808 also includes an environmental sensor such as a light sensor 2820 that senses ambient light.

When plugged into an AC receptacle, the fixed appliance 2804 is adjacent and mounted to the AC receptacle. When the portable appliance 2808 is engaged with the fixed appliance 2804, the sensor 2820 senses ambient light, and the light source(s) of the portable appliance 2808 operate based on the sensed ambient light. The portable appliance 2808 may alternatively be manually turned on so that the light source(s) emits light regardless of ambient light.

FIG. 29 illustrates a night light portable lighting appliance 2900 having the fixed appliance 1702 and the portable appliance 2504 incorporated within a single unitary device. The portable appliance 2900 includes an electrical interface 2904 such as electrical contacts 2908 that plug into and receive power from a standard AC receptacle. The electrical contacts 2908 are pivotably attached and may be pivoted so that the portable appliance 2900 can be mechanically engaged with a fixed appliance such as one of the fixed appliances 2202, 2504, 2704, and 2804. The night light portable lighting appliance 2900 also includes an environmental sensor such as a motion sensor 2912 that detects motion. The light source(s) of the portable appliance 2900 operate based on the sensed motion. Alternatively, the portable appliance 2900 may alternatively manually turned on to emit light.

FIG. 30 illustrates a portable appliance 3000 having a first light source 3004 and a second light source 3008. The light source 3004 is disposed behind an optical element 3012, and a reflector 3016 directs the light to produce a light beam similar to that of a conventional flashlight. The light source 3008 is disposed behind an optical element 3020, and a diffuser 3024 spreads the emitted light to form an area light. User interface/controls 3028 such as a multi-position switch allow a user to turn on and off the light source 3004, the light source 3008, or both the light sources 3004 and 3008 concurrently.

FIG. 31 illustrates a desk lamp 3100 having a fixed appliance 3104 and a portable appliance 3108. The fixed appliance 3104 includes a first arm 3112 pivotably coupled to a base 3116 of the fixed appliance 3104. A second arm 3120 is pivotably coupled to the first arm 3112 and to a portable appliance-receiving region 3124. The portable appliance 3108 physically and electrically engages the portable appliance-receiving region 3124 through respective electrical and mechanical interfaces. The fixed appliance 3104 further includes user interface/controls 3128.

The desk lamp 3100 is suited for placement on a surface such as a desk or table. When the portable appliance 3108 is engaged with the fixed appliances 3104, the user variously pivots the arms 3112 and 3120 and the portable appliance-receiving region 3124 to direct the light emitted by the light source(s). A user employs the user interface/controls 3128 to operate the portable appliance 3108.

It is to be appreciated that the portable appliances 2708, 2808, 2900, 3000, and 3108 discussed in connection with FIGS. 26-31 are interchangeable in that each can be used with any of the fixed appliances 2202, 2604, 2704, 2804, and 3104. As such, a user may install different fixed appliances in various locations and/or similar fixed appliance at different locations. For example, the user may elect to put a first fixed appliance such as the fixed appliance 2708 in a first location such as a kitchen, another fixed appliance such as the fixed appliance 2808 in a second location such as a basement, and another fixed appliance such as the fixed appliance 3104 in a third location such as a bedroom, as well as other fixed appliances in other locations. The user can then use a desired portable appliance in connection with a desired fixed appliance.

Each of the fixed appliances described above may be provided without a portable appliance. For instance, the four bay fixed appliance 2204 described in connection with FIG. 22 may be sold without any portable appliances. In another example, a replacement four bay fixed appliance 2204 may be obtained without any portable appliances. Likewise, each of the portable appliances described above may be provided without a fixed appliance. For example, a portable appliance 2202 may be sold or obtained without a fixed appliance. Therefore, a user may obtain a fixed appliance based on desired features and install the fixed appliance in a desired location, and obtain a portable appliance based on desired features and use the portable appliance with the fixed appliance. For example, the user may desire an under the counter lighting appliance and a portable appliance having a spot light and an area light. In this case, the user may obtain the fixed appliance 2200 and the portable appliance 3000.

A fixed appliance(s) and a portable appliance(s) may also be provided together. When packaged as such, the number of portable appliances provided with the fixed appliance(s) may represent a number of portable appliances for partially populating the fixed appliance(s) or fully populating the fixed appliance(s), with or without one or more spare portable appliances. The number and type of portable appliances and fixed appliances packaged together may be a default configuration or customized configuration based on a user preference.

By way of example, the four bay fixed appliance 2204 may be provided with one, two, three, four, five or more portable appliances. The portables appliances may all be the same type of portable appliance such as the portable appliance 2204 or include one or more of the portable appliances 2204 and one or more of the portable appliances 2804, as well as one or more of other portable appliances. A second fixed appliance such as another four bay fixed appliance 2204 or a different fixed appliance such as the table top fixed appliance 2704 may also be included with the four bay fixed appliance 2204 and portable appliances.

It is to be appreciated that the fixed appliances 700, 1608, and 1800, which are respectively described above in connection with FIGS. 7A, 16C, and 18 may be adapted for use with the portable appliances 2204, 2608, 2708, 2808, 2900, 3000, and 3104, or vice versa. Furthermore, the passive appliances 720 and 1610, which are respectively described above in connection with FIGS. 7B, 16A, and 16B may be adapted for use with the portable appliances 2204, 2608, 2708, 2808, 2900, 3000, and 3104, or vice versa. It is also to be appreciated that the lamps 100, 200, 500, and 602 described in connection with FIGS. 1A, 2A, 3, 4A, 5A, and 6 may be adapted to receive the portable appliances 2204, 2608, 2708, 2808, 2900, 3000, and 3104, or vice versa.

Figure 32:
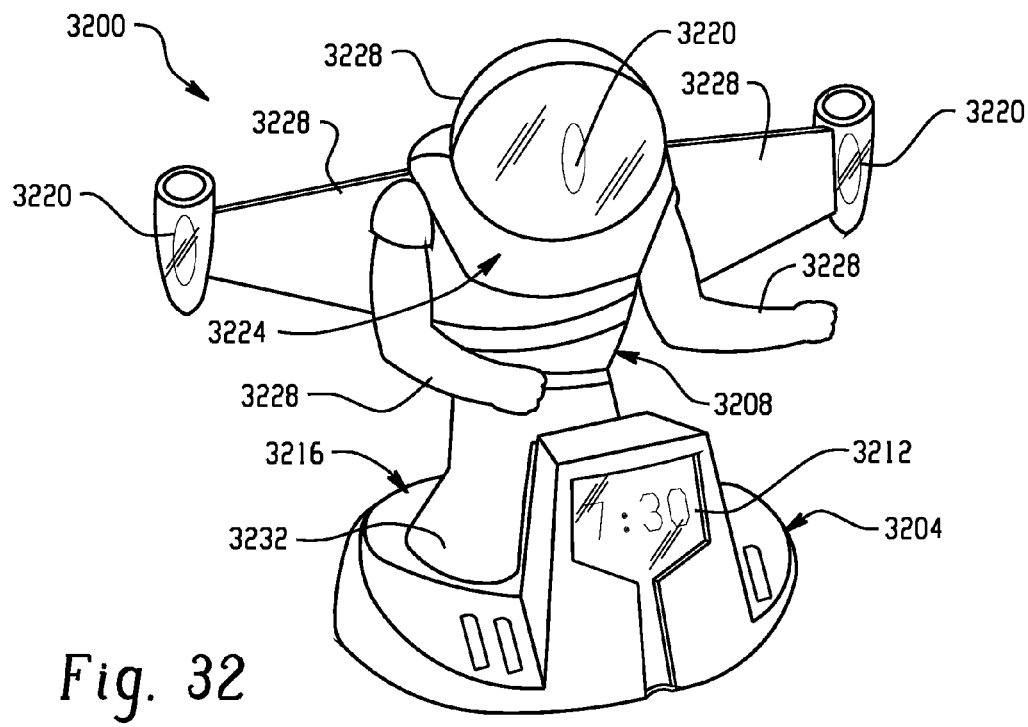
FIGS. 32-34B illustrate alarm clock appliances.
Figure 33:
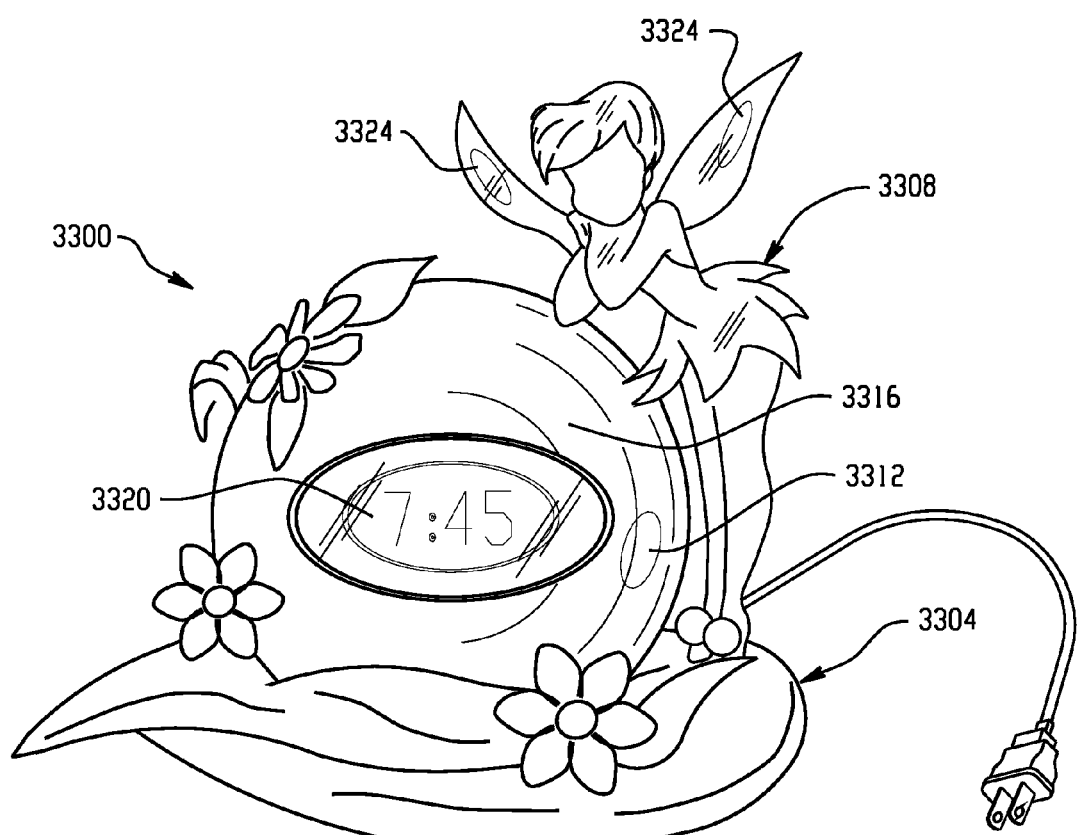
Figure 34B:
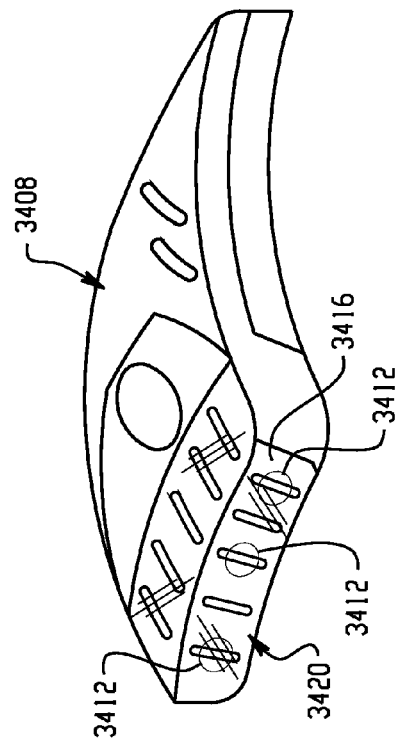
Figure 34A:
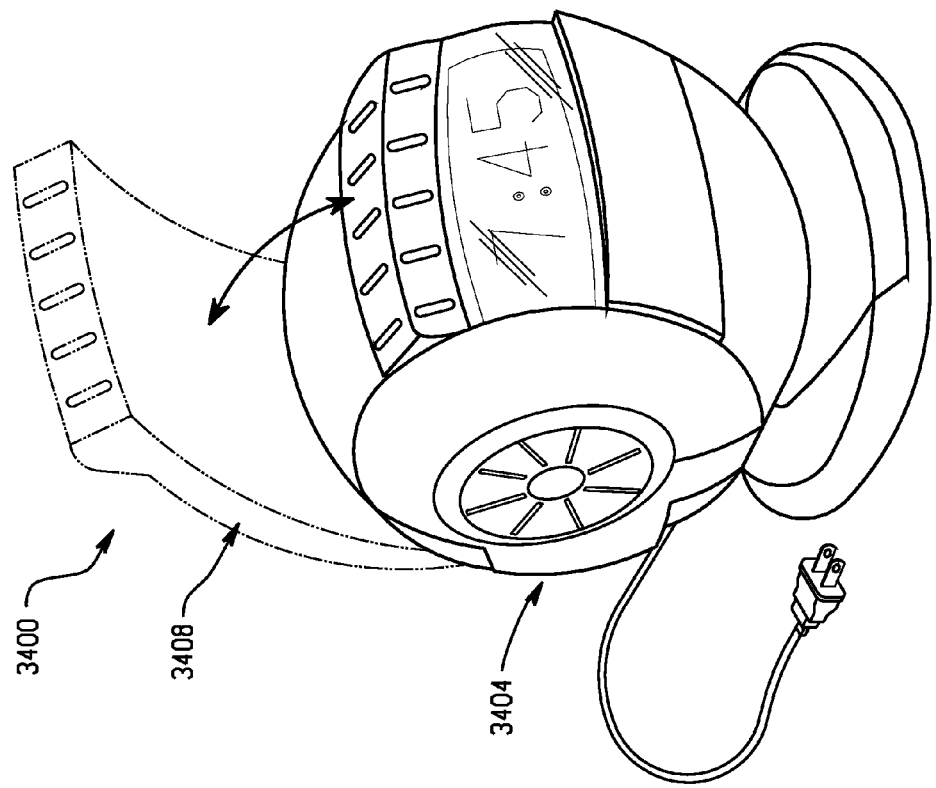

FIGS. 32-34 illustrate alarm clock appliances. The alarm clock appliances are shown as children's fantasy characters. It is to be appreciated that the illustrated characters are provided for explanatory purposes and are not limiting.

Initially referring to FIG. 32, an alarm clock appliance 3200 that includes a fixed appliance 3204 and a portable appliance 3208 is illustrated. The fixed appliance 3204 includes a non-battery backed auxiliary appliance such as an alarm clock 3212, which includes a visual indicator such as a human readable display and an audible indicator such as a beeper or a speaker. User interface/controls provide a user operable control(s) for adjusting the time, setting an alarm time, deactivating a sounding alarm, or otherwise operate the appliance. The fixed appliance 3204 also includes a receiving region 3216 having an electrical and a mechanical interface for electrically and mechanically engaging the portable appliance 3208. The fixed appliance 3204 further includes a battery charger and a wireless communication interface.

The portable appliance 3208 includes a light source(s) 3220 and an auxiliary appliance 3224. The auxiliary appliance 3224 includes one or more actuators that are activated to selectively move moveable structures such as appendages 3228 in response to events or stimuli such as an alarm condition. User interface/controls of the portable appliance 3208 allow a user to control operation of the light source(s) 3220 and the auxiliary appliance 3224 when the portable appliance 3208 is removed from the fixed appliance 3204. A mechanical interface 3232 mechanically engages the mechanical interface in the receiving region 3216. The mechanical interface 3232 can also be used to place the portable appliance 3208 in an ordinary upright position on a table or other surface. An electrical interface of the portable appliance 3208 electrically engages the electrical interface in the receiving region 3216. The portable appliance 3208 also includes a rechargeable battery(s) that power the light source(s) 3220 and the auxiliary appliance 3224. A wireless communication interface provides wireless communication, for example, with wireless interface of the fixed appliance 3204.

A user places the fixed based 3204 at a desired location such as a bedside table. The user may use the user interface/controls of the fixed appliance 3204 to adjust the time and/or set the alarm to sound at a particular time. If an alarm time is set, when the alarm time is reached the fixed appliance 3204 communicates a first or activation signal to the portable appliance 3208. If the portable appliance 3208 is engaged with the fixed appliance 3204, the signal may be communicated via respective electrical interfaces. Otherwise, the signal is communicated via respective wireless communication interfaces.

The signal causes the portable appliance 3208 to react or respond to the alarm condition. Examples of suitable responses include one or more of turning the light source(s) 3220, toggling the light source(s) 3220 on and off, outputting audio such as one or more beeps or a voice message, and/or activating one or more actuators to cause the moveable structures 3228 to move, or otherwise indicate the alarm condition. The user may use the user interface/controls of the fixed appliance 3204 to likewise send a second or deactivation signal to terminate such response. Alternatively, the user may use the user interface/controls of the portable appliance 3208 to likewise send a second or deactivation signal to terminate such response. The user may also employ the user interface/controls of the fixed appliance 3204 to invoke the fixed appliance 3204 to send the activation signal to the portable appliance 3208. Activating the portable appliance 3208 as such may facilitate locating an otherwise lost portable appliance.

The user may also use the portable appliance 3208 as a lamp. For example, the user can manually turn the light source 3220 on and off. The user may also remove the portable appliance 3208 from the fixed appliance 3204 and use the portable appliance 3202 as a light source.

Turning to FIG. 33, an alarm clock appliance 3300 includes a fixed appliance 3304 and a portable appliance 3308. The fixed appliance 3304 includes a non-battery backed light source 3312 disposed behind a translucent globe or lens 3316. The fixed appliance 3304 also includes a non-battery backed auxiliary appliance such as an alarm clock 3320, which is substantially as described above in connection with FIG. 32. The portable appliance 3208 includes a light source(s) 3324.

When an alarm time is reached, power is provided for continuously or periodically turning on the light source 3312 to indicate the alarm condition. If the portable appliance 3308 is engaged with the fixed appliance 3304, the power is also provided to the portable appliance 3308 for continuously or periodically turning on the light source(s) 3324. When the portable appliance 3302 is removed from the fixed appliance 3301, the portable appliance may be placed on or affixed to a structure and used a lamp or may be used as a hand-held flashlight as described above.

FIG. 34 illustrates an alarm clock appliance 3400, which includes a fixed appliance 3404 and a portable appliance 3408. In this example, the fixed appliance 3404 includes a mechanical interface that pivotably receives the portable appliance 3408. The portable appliance 3408 includes a complementary mechanical interface. The portable appliance 3408 also includes a light source(s) 3412 disposed behind a translucent optical element 3416 and a light management system 3420. When the portable appliance 3408 is engaged with the fixed appliance, a user may pivot the portable appliance 3402 to variously direct the light emitted by the light source(s) 3412.

Figure 35A:
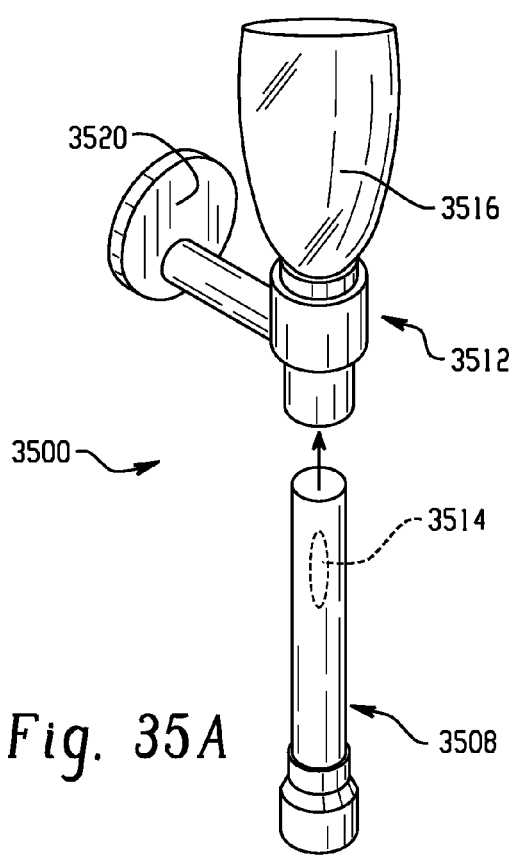
FIGS. 35-37 illustrates sconce lights.
Figure 35B:
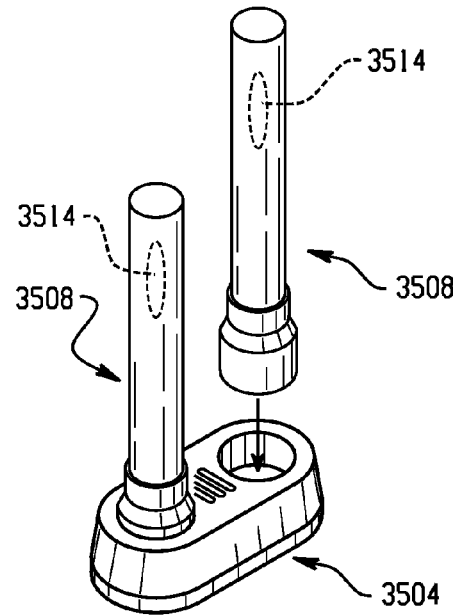
Figure 36A:
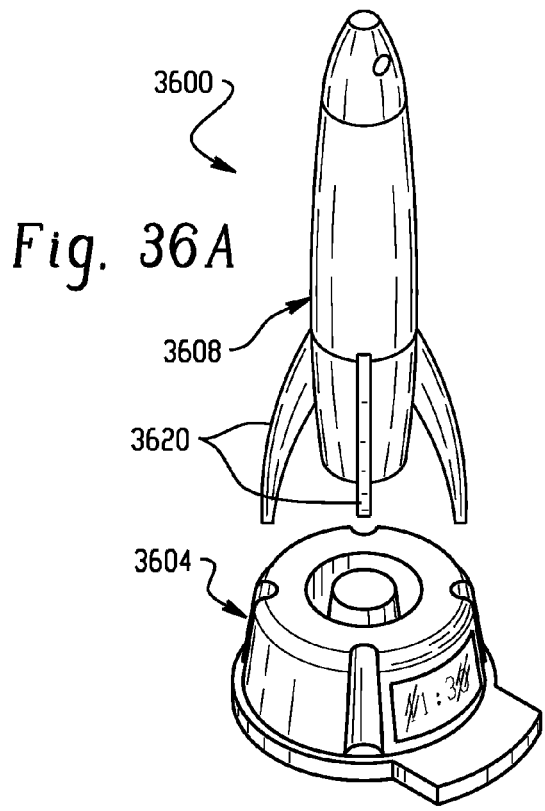
Figure 36B:
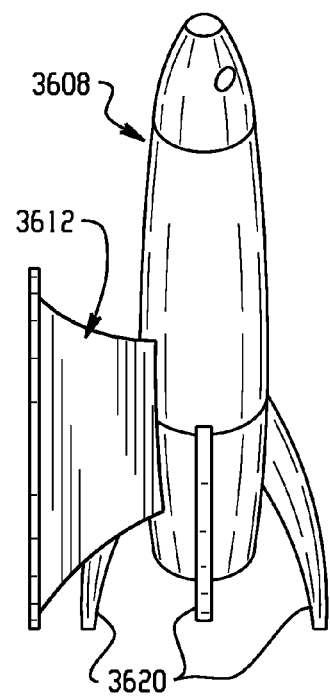
Figure 37:
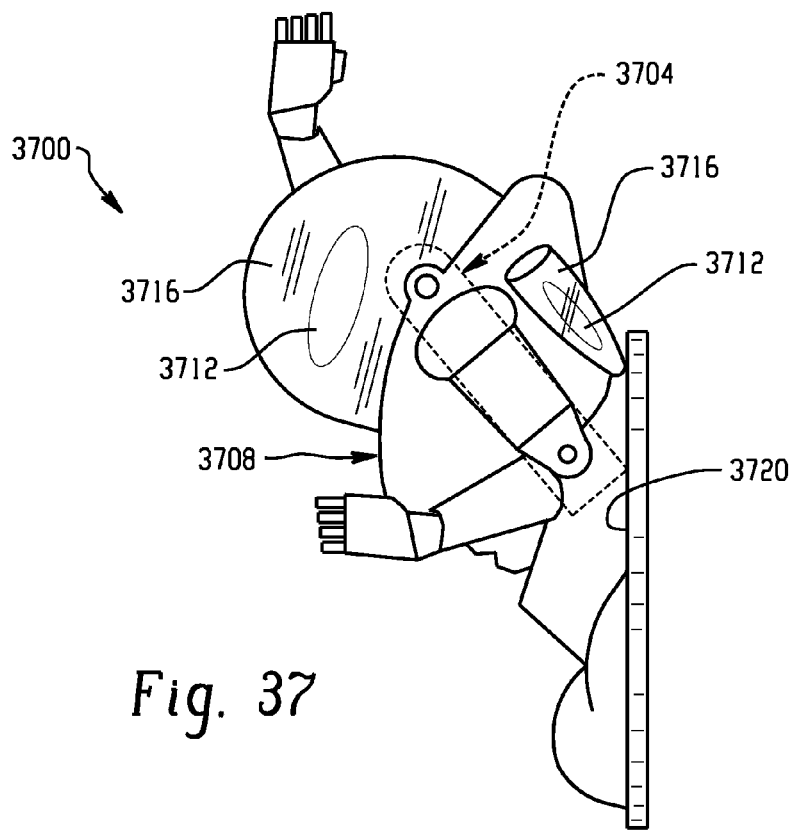

FIGS. 35-37 illustrate various wall or sconce lights. Initially referring to FIG. 35, a sconce light 3500 includes a portable appliance 3508 and a passive appliance 3512.

The portable appliance 3508 includes a light source(s) 3514, a wireless communication interface, and user interface/controls such as a switch. The passive appliance 3512 includes a complementary mechanical interface that mechanically engages the mechanical interface of the portable appliance 3508. The mechanical interface of the passive appliance 3512 includes a light management system 3516 and a mounting bracket 3520. The light management system 3516 is removable and can be replaced by a similar or different light management system. A fixed appliance 3504 receives the portable appliance 3508 and charges a rechargeable battery(s) of the portable appliance 3508 as described above.

A user affixes the passive appliance 3512, via the mounting bracket 3516, to another structure such as a mounting bracket affixed to a wall. For instance, the mounting bracket 3520 may include a material free region(s) such as a slot(s) or a hole(s) through which the user inserts a suitable screw to mechanically fasten the screw to a complementary threaded screw hole in the wall bracket. The user may change the light management system 3516 before or after installing the passive appliance 3512. A light source(s) of the portable appliance 3508 may then be operated by a signal transmitted to the wireless communication interface of the portable appliance 3508 by a wireless communication interface of a remote control or the wireless communication interface of the fixed appliance 3504. The user may alternatively manually operate the light source(s) 3514 via the user interface/controls. The portable appliance 3508 may also be automatically operated in the case of a power failure as described above. The user may remove the portable appliance 3508 from the passive appliance 3504 and place or affix it to an external surface or use it as a hand-held light as described above, or insert it in the fixed appliance 3504 to charge the batteries of the portable appliance 3504.

FIGS. 36 A and B illustrate a sconce light 3600 configured as a children's fantasy spaceship. As shown in FIG. 36 A, the sconce light 3600 includes a portable appliance 3608 which engages a fixed appliance 3604 for charging a rechargeable battery(s) of the portable appliance 3608 as described above. As shown in FIG. 36 B, the portable appliance 3608 includes a mechanical interface having a mounting structure 3612 that can be mechanically engaged with a structure such as a mounting bracket affixed to a wall. FIGS. 36 A and B show that the mechanical interface further includes a plurality of feet 3620 for placing the portable appliance 3608 on a surface or within the fixed appliance 3604 when the portable appliance is removed from the wall bracket.

Referring now to FIG. 37, a sconce light 3700 includes a portable appliance 3704 and an active appliance 3708. The sconce light 3700 is shown as a children's fantasy character. The portable appliance 3704 includes a rechargeable battery(s) and an electrical interface as described above. The active appliance 3708 includes a light source(s) 3712, a light management system 3716, an auxiliary appliance such as an audible indicator, user interface/controls, an electrical interface, a portable appliance-receiving region, and a mechanical interface 3720 that can be mechanically affixed to a physical structure such as a mechanical holster affixed to a wall.

A user electrically and mechanically engages the portable appliance 3704 with the active appliance 3708. When engaged as such, respective electrical interfaces electrically communicate, and power from the rechargeable battery(s) provides power for powering the light source(s) 3712 and the auxiliary appliance. The user employs the user interface/controls to turn the light source(s) 3712 on and off. The user may remove the active appliance 3708 and hence portable appliance 3704 from the holster and user the active appliance 3708 and hence portable appliance 3704 as a hand-held light device. The rechargeable battery(s) removed from the active appliance 3708 and engaged with a suitable fixed appliance where the rechargeable battery(s) can be recharged. The rechargeable battery(s) may also be replace by another rechargeable battery(s).

Figures 38A, 38B:
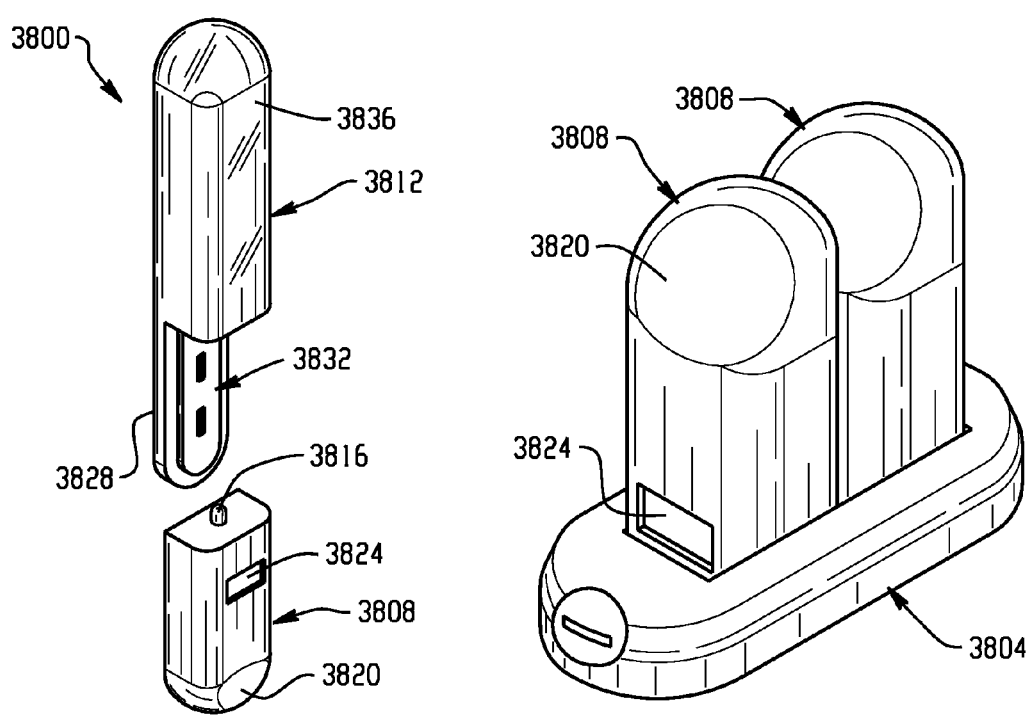
FIGS. 38A and 38B illustrate a motion light.

FIG. 38 illustrates a motion light 3800 having a portable appliance 3808 and a passive appliance 3812. The portable appliance 3808 includes a rechargeable battery(s), a light source(s) 3816, user interface/controls 3820, and motion sensor 3824. The passive appliance 3812 includes a mechanical interface having a mounting region 3828 for physically affixing the passive appliance 3812 to a structure such as a wall and a portable appliance receiving region 3832 for mechanically and electrically receiving the portable appliance 3808. The passive appliance 3812 further includes a light management system 3836. The rechargeable battery(s) can be charged via a fixed appliance 3804 having a battery charger and a plurality of portable appliance receiving regions as described above.

When the portable appliance 3808 is engaged with the passive appliance 3812, the motion sensor 3824 senses motion and the light source(s) 3816 is operated based on the sensed motion. Light emitted by the light source(s) 3816 is diffused or otherwise influenced by the light management system 3836. The user may alternatively manually operate the light source(s) 3816 via the user interface/controls 3820 of the portable appliance 3808. In an alternative implementation, the portable appliance 3808 includes a one or two-way wireless communication interface. As such, the light source(s) 3816 of the portable appliance 3808 can be operated via a remote control wirelessly communicating with the wireless communication interface of the portable appliance 3808.

It is to be appreciated that the user may selectively install the passive appliance 3812 in various locations where the user desires to use the portable appliance 3808. For instance, the user may install the passive appliance 3812 outside, for example, next to an entrance/exit door of a house. The user may then operate the light source(s) 3812 via the remote, for example, when leaving or returning home. Additionally or alternatively, the sensor 3820 can operate the light source(s) 3812, for example, when someone approaches the door. Other suitable locations include a closet, a step in a stairwell, and other desirable locations. When installed in a closet, the motion sensor 3812 senses when the closet door opens and accordingly operates the light source(s) 3812.

Figure 41:
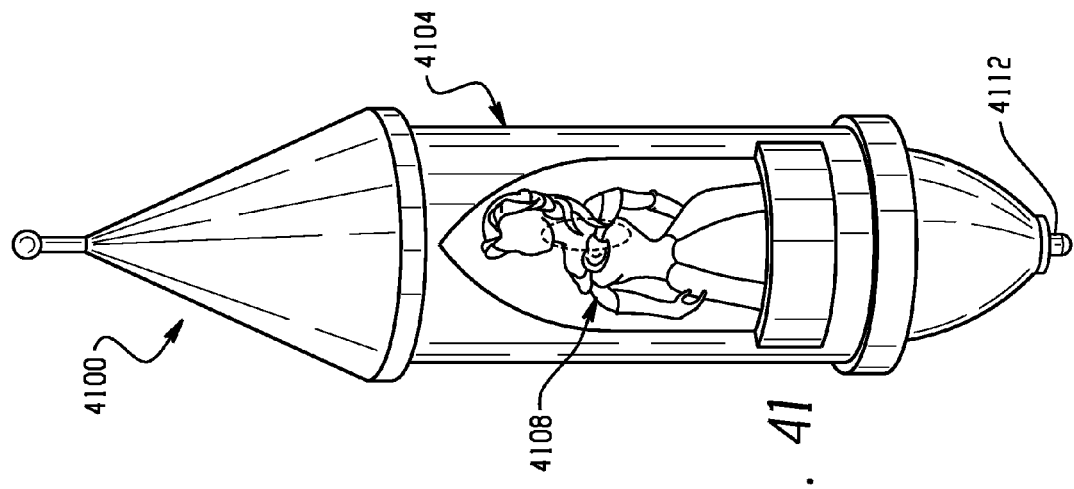
FIGS. 39-41 illustrate nightlights.
Figure 40:
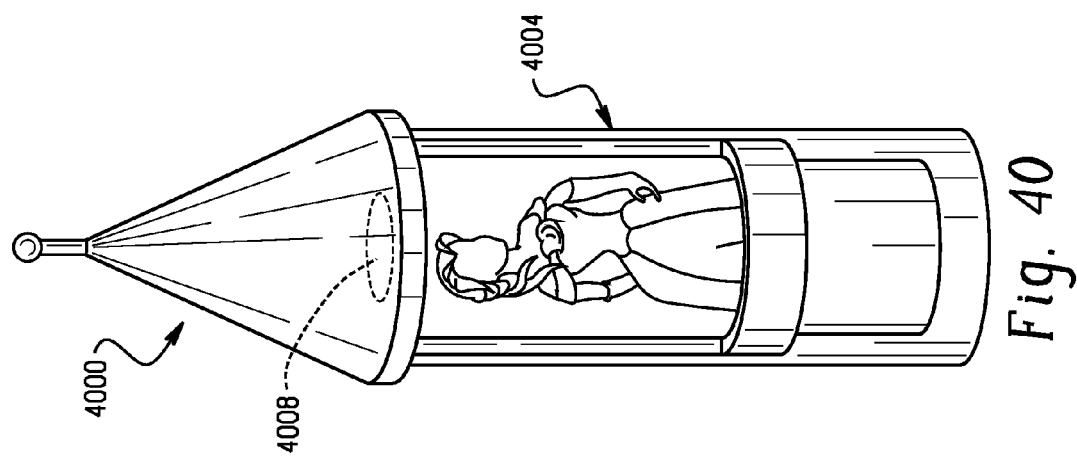
Figure 39:
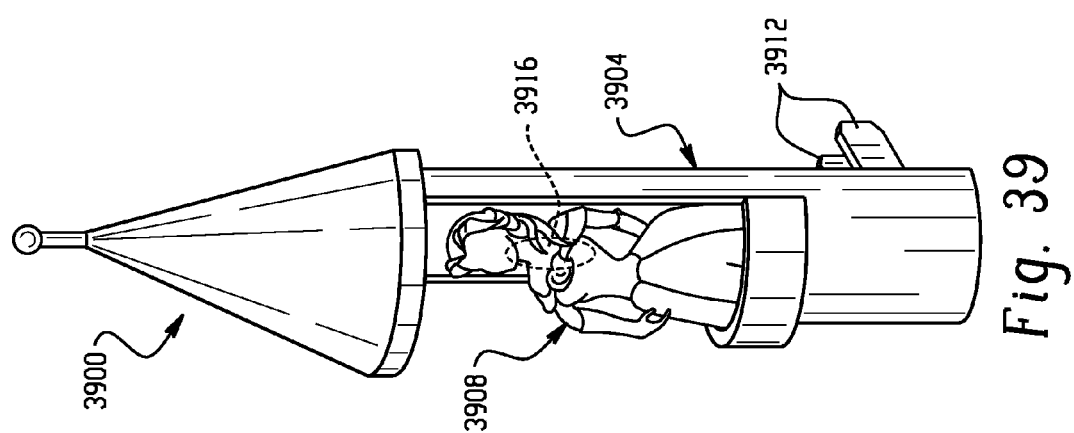
Figure 42A:
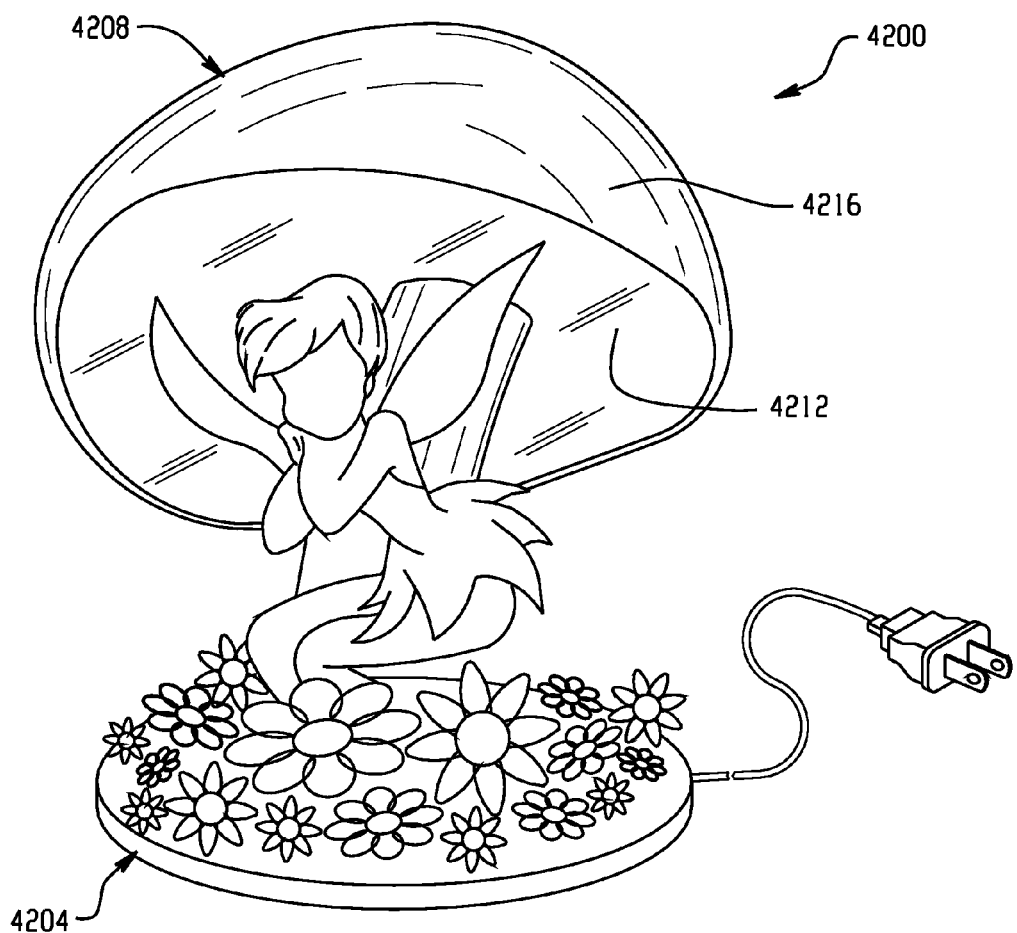
FIGS. 42-46 illustrate bedside lights.
Figure 42B:
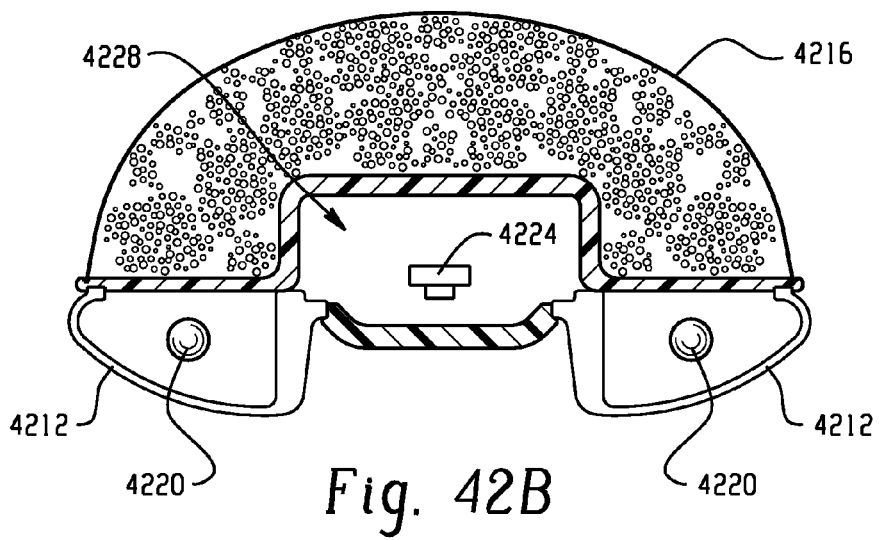

FIGS. 39-41 illustrate various nightlights shown as children's fantasy characters. FIG. 39 illustrates a nightlight 3900 that includes a fixed appliance 3904 and a portable appliance 3908. The fixed appliance 3904 includes an electrical interface having electrical contacts 3912 for physically and electrically engaging a standard AC receptacle and receiving AC power therefrom. Physically engaging the AC receptacle with the electrical contacts 3912 affixes the fixed appliance 3904 to the AC receptacle. The portable appliance 3908 includes a light source(s) 3912 and a rechargeable battery(s), and mechanically and electrically engages the fixed appliance 3904 via complementary mechanical and electrical interfaces as described above. When the portable appliance 3908 is engaged with the fixed appliance 3904 and the electrical contacts 3912 are engaged with the AC receptacle, AC power is received and provided to power the light source(s) 3916. When the portable appliance 3908 is removed from the fixed appliance 3904, the rechargeable battery(s) provides power for powering the light source(s) 3916.

FIG. 40 illustrates a nightlight 4000 having a fixed appliance 4004. The fixed appliance 4004 includes a rechargeable battery(s), a battery charger, and a battery-backed light source(s) 4008. When the fixed appliance is engaged with a standard AC receptacle, AC power received from the receptacle powers the light source(s) 4008 and is used by the battery charger to maintain the charge state of the rechargeable battery(s). In the case of an AC power failure, the rechargeable battery(s) provides power that powers the light source(s) 4008.

FIG. 41 illustrates a nightlight 4100 having a fixed appliance 4104 and a portable appliance 4108. The fixed appliance 4104 and portable appliance 4108 are as substantially described above in connection with the fixed appliance 3904 and the portable appliance 3908 in FIG. 39. The fixed appliance 4104 further includes a sensor 4112 such as a light or motion sensor that senses ambient light or motion. Power is provided to the light source(s) of the portable appliance 4104 based on the sensed light or motion.

FIGS. 42-46 illustrate various bedside lighting appliances. Initially referring to FIG. 42, a bedside lighting appliance 4200 includes a fixed appliance 4204 and a portable appliance 4208. In this example, the portable appliance 4208 includes an optical surface such as a lens 4212 operatively coupled to a generally deformable body or portion 4216. A light source(s) 4220 is disposed behind the lens 4212. User interface/controls provide a user operable control such as a push-button switch 4224 for turning the light source(s) 4212 on and off. A battery-receiving region 4228 receives a rechargeable or non-rechargeable battery(s) that powers the light source(s) 4220. The generally deformable portion 4216 includes a beanbag, polymeric, or other deformable structure, which can be variously shaped to conform to a shape of a surface or otherwise direct light diffused by the lens 4212. A user may alternatively physically hold or otherwise engage the generally deformable portion 4216 to manually direct the emitted light.

Figure 43:
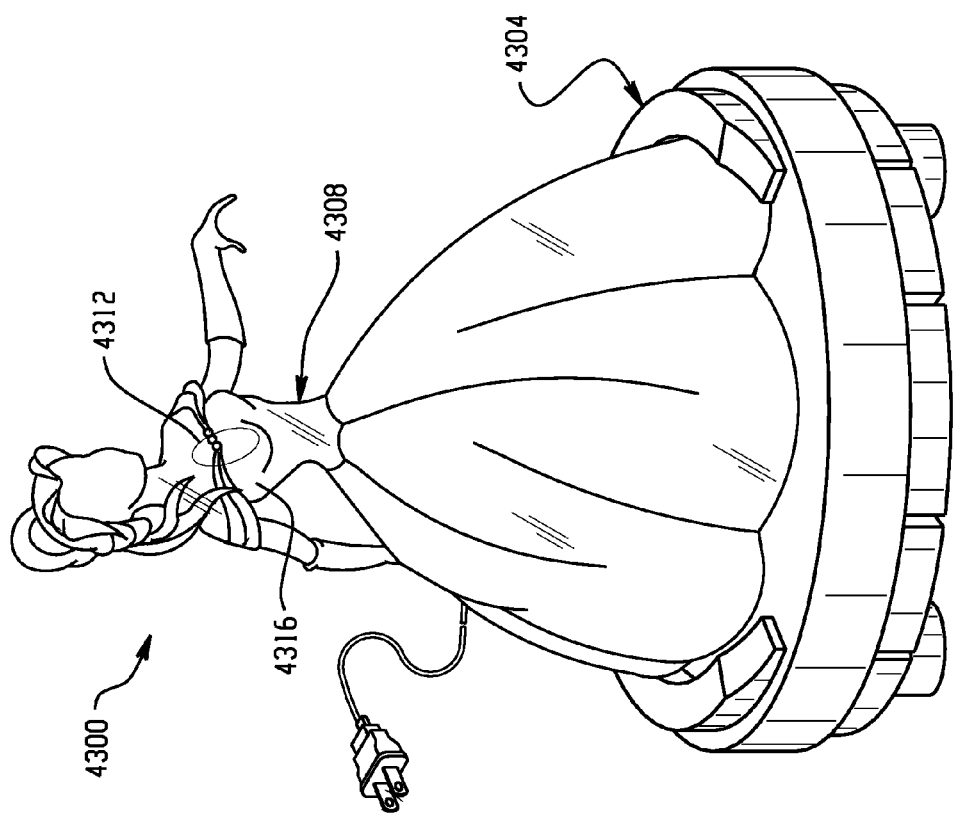

Turning to FIG. 43, a bedside lighting appliance 4300 includes a fixed appliance 4304 and a portable appliance 4308. In this example, the portable appliance 4308 includes a light source(s) 4312 disposed behind a translucent shell 4316. As described above, the portable appliance 4308 may be electrically and mechanically engaged with the fixed appliance 4304 or removed therefrom and placed on an external surface. In either instance, when the light source(s) 4312 is energized, the light source(s) 4312 emits light, and the translucent shell 4316 diffuses the emitted light to produce an area light.

Figure 44:
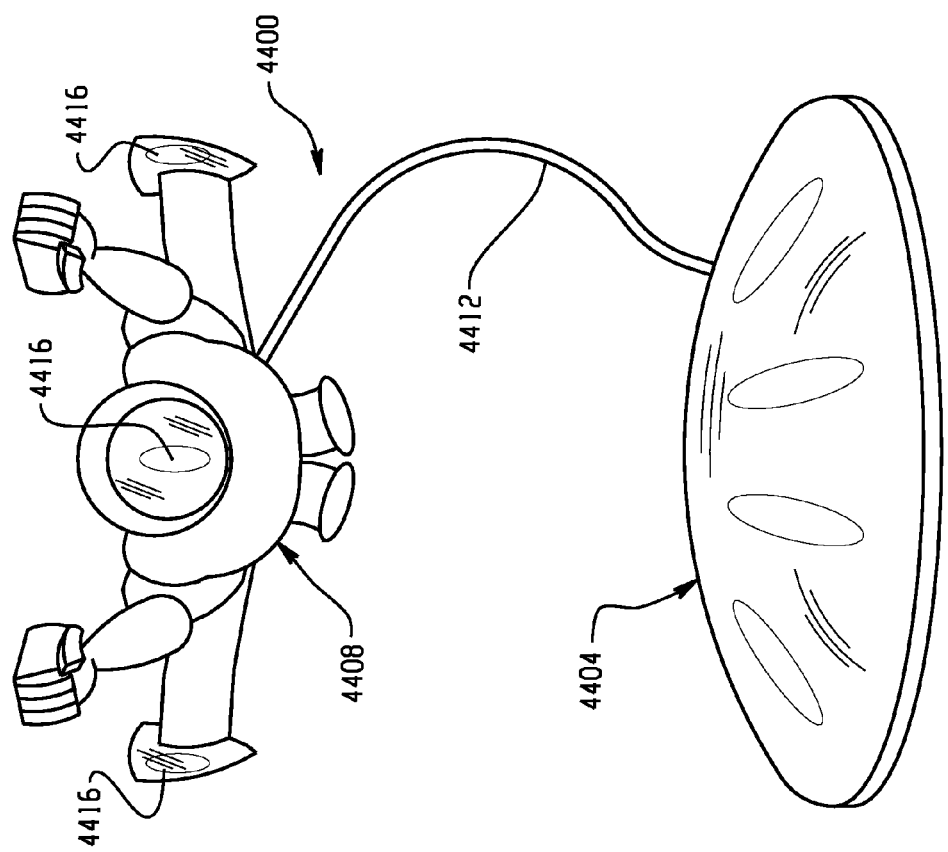

FIG. 44 depicts a bedside lighting appliance 4400 that includes a fixed appliance 4404 and a portable appliance 4408. The fixed appliance 4404 includes a flexible mechanical interface 4412 that mechanically engages a mechanical interface of the portable appliance 4408. The fixed appliance 4404 further includes an electrical interface, which can be routed by the flexible mechanical interface 4412, that electrically engages an electrical interface of the portable appliance 4408. The portable appliance includes a light source(s) 4416 and a rechargeable battery(s). The user variously flexes the flexible mechanical interface 4412, which variously positions the directed light. For example, the user can bend or straighten various sections of the flexible mechanical interface 4412 to change the direction of emitted light. The portable appliance 4408 may be disengaged from the fixed appliance 4404 and used as a hand-held light device. When disengaged as such, the rechargeable battery(s) provides power for the light source(s) 4416.

Figure 45:
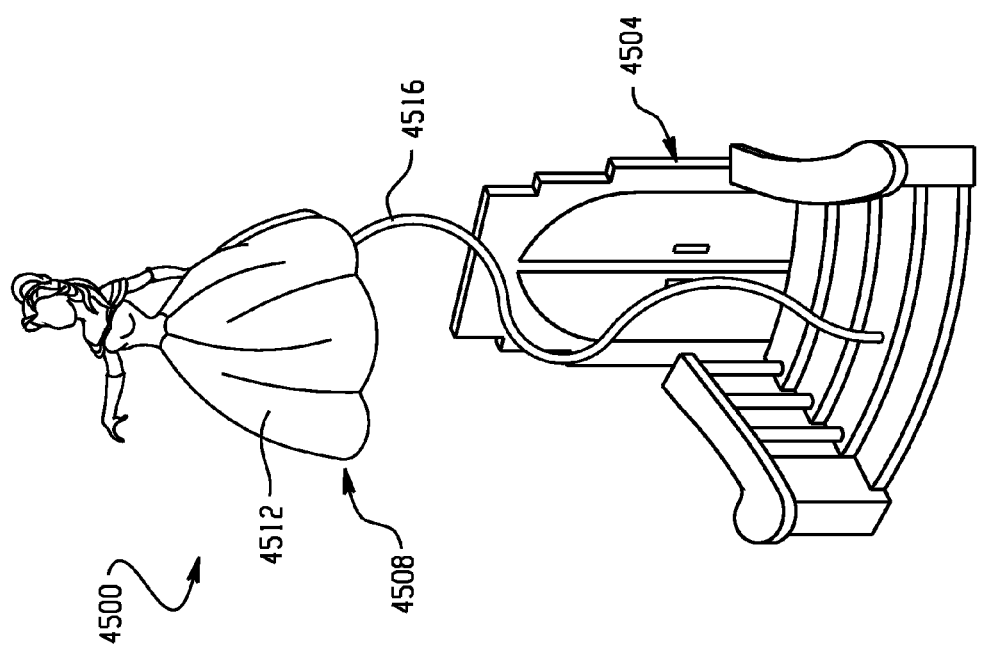

FIG. 45 illustrates a bedside lighting appliance 4500 having a fixed appliance 4504. The fixed appliance 4504 includes a non-battery backed light source(s) 4508 disposed within a light management system such as a translucent shell 4512. The fixed appliance 4504 further includes a flexible mechanical interface 4516, which is analogous to the flexible mechanical interface 4412 described above in FIG. 44. The user can variously flex the flexible mechanical interface 4412 as described above. The translucent shell 4512 diffuses light emitted by the light source(s) 4512 to produce an area light.

Figure 46:
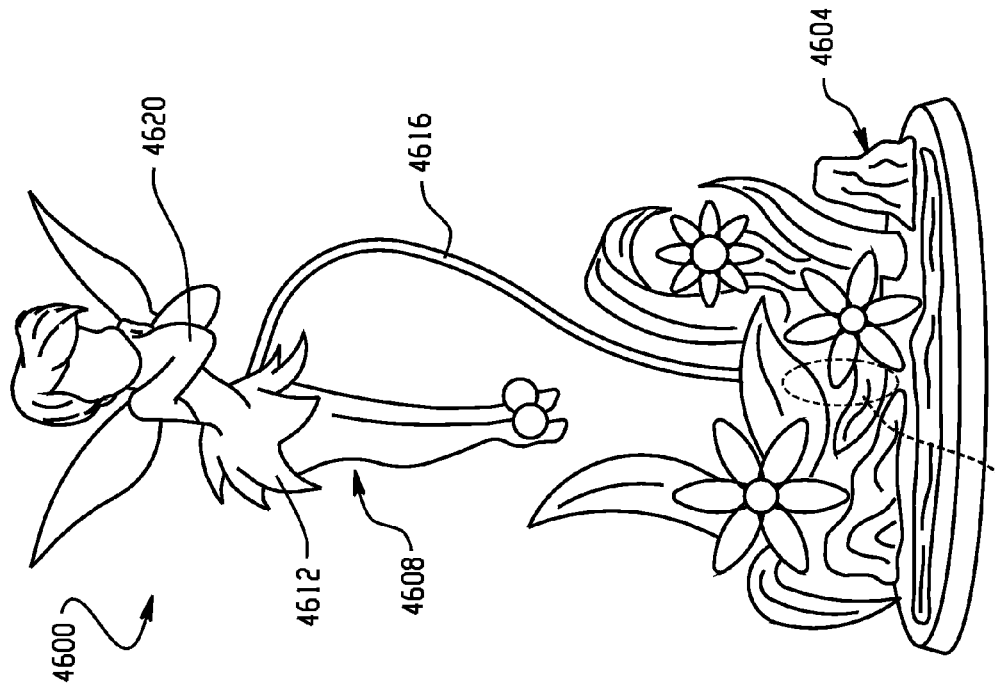

In FIG. 46, a bedside lighting appliance 4600 includes a fixed appliance 4604, a portable appliance 4608, and a passive appliance 4612. The fixed appliance 4604 includes non-battery backed light source(s) 4614 and a flexible mechanical interface 4616 to which the portable appliance 4608 mechanically and electrically engages as described above. The portable appliance 4608 includes a light source(s) and a rechargeable battery(s). The passive appliance 4612 includes a portable appliance-receiving region for receiving the portable appliance 4608 and a light management system 4620. AC power received by the fixed appliance provides power for powering the non-battery backed light source(s) 4614 and the light source(s) of the portable appliance 4608 and for charging the rechargeable battery(s).

Figure 47:
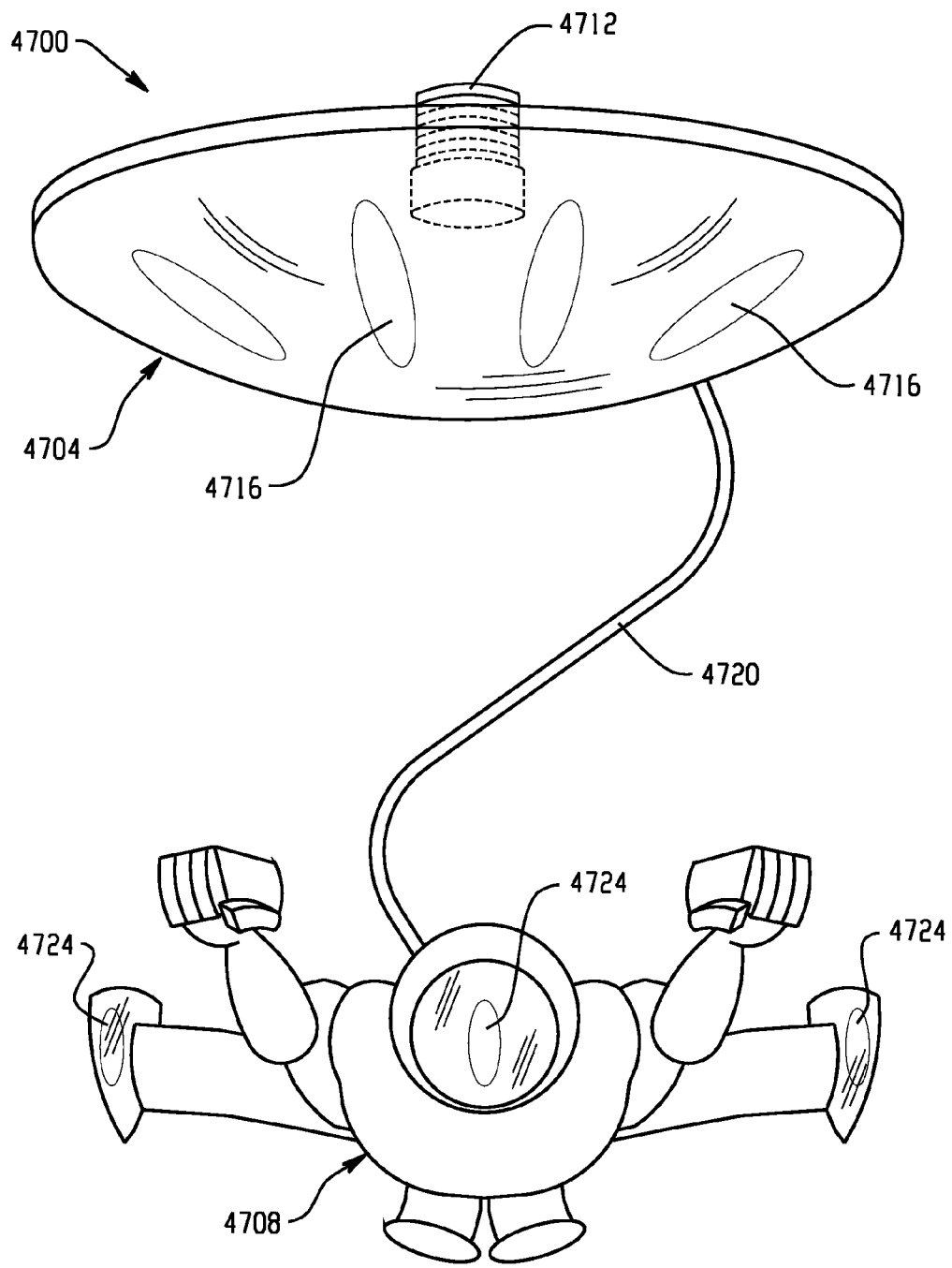
FIGS. 47-49 illustrate pendant lights.
Figure 48:
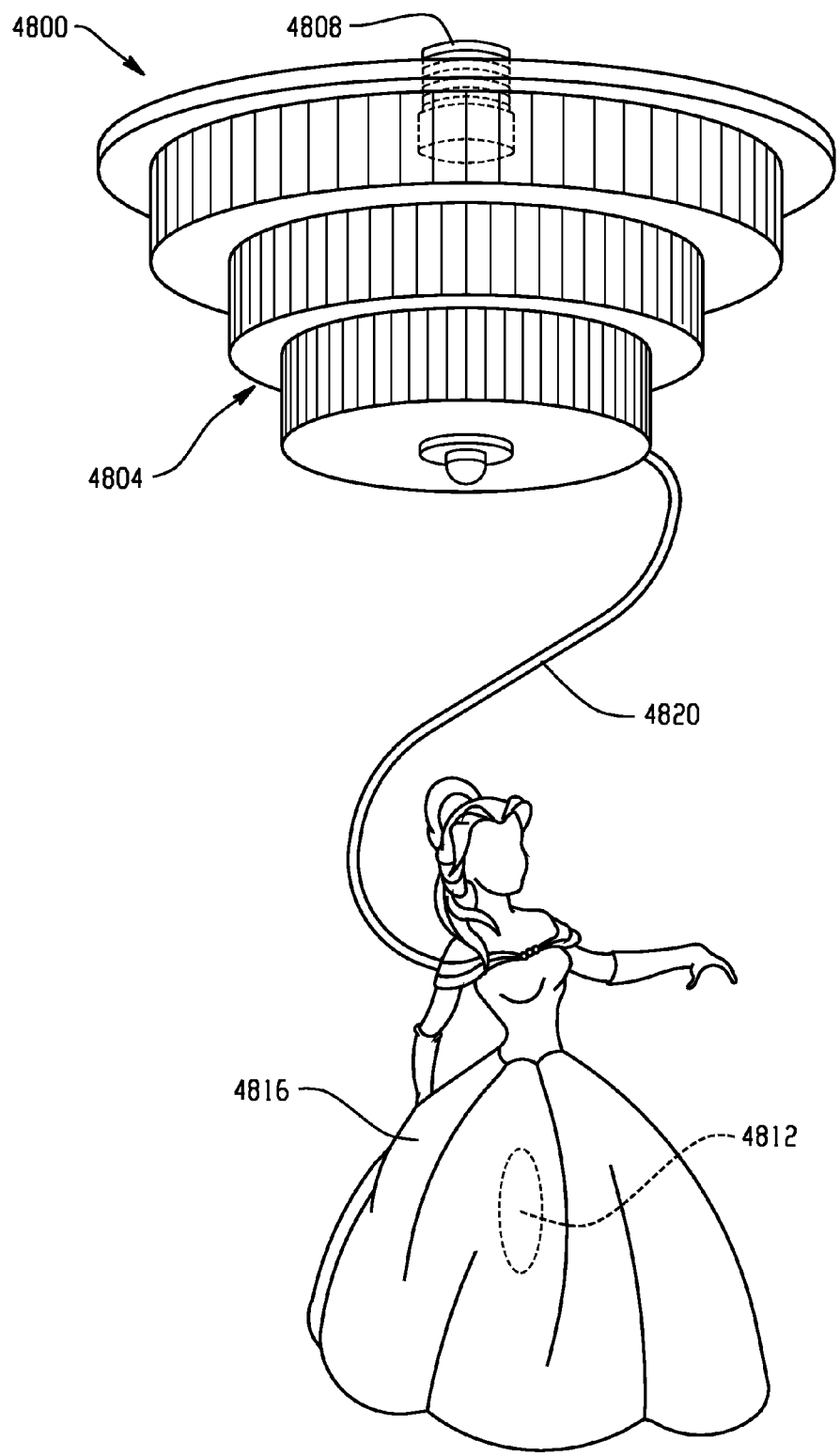
Figure 49:
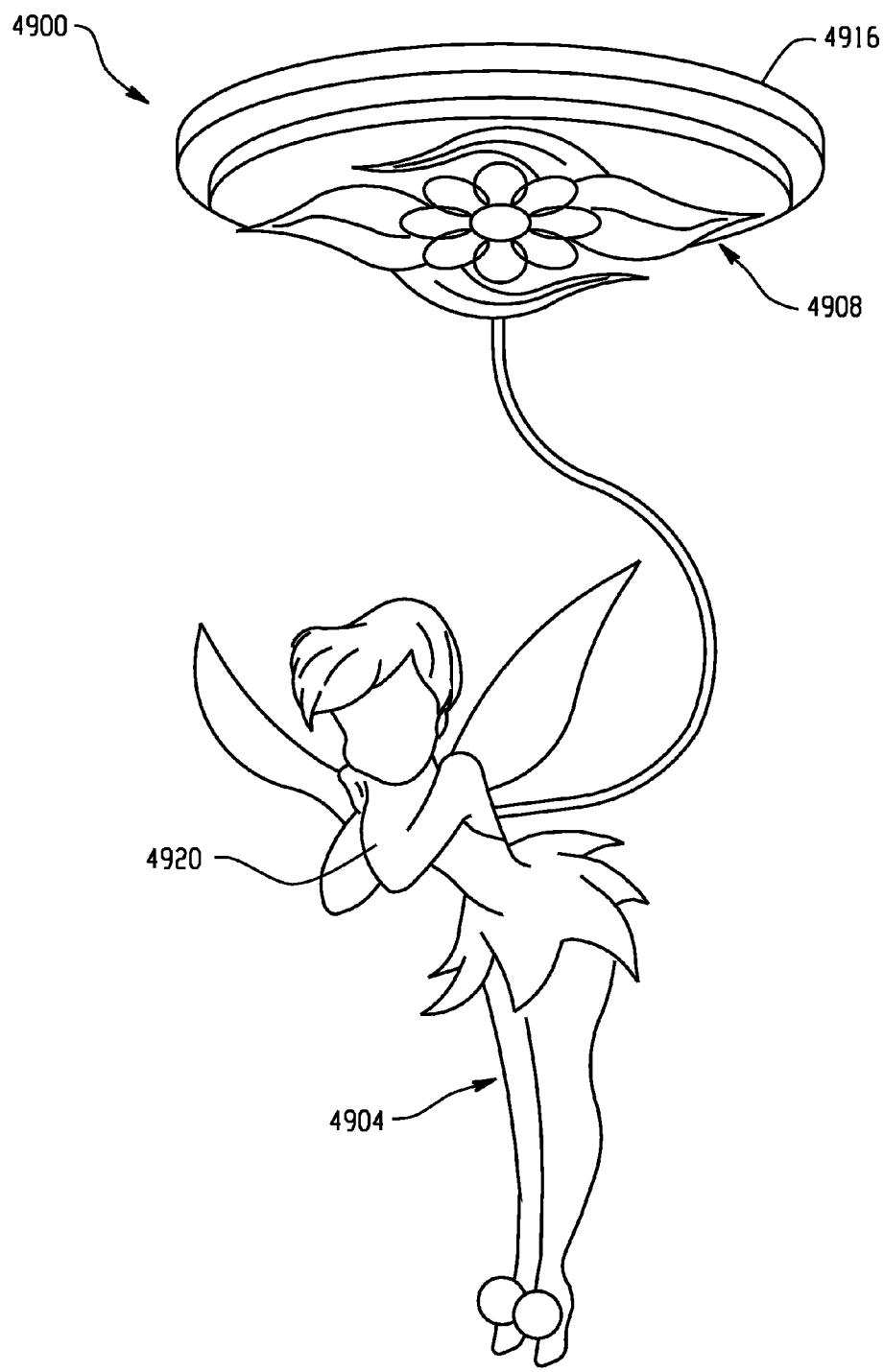

FIGS. 47-49 illustrate various pendant lights configured as children's fantasy characters. Initially referring to FIG. 47, a pendant light 4700 includes a fixed appliance 4704 and a portable appliance 4708. The fixed appliance 4704 includes an electrical interface such as an electrical adapter 4712 that is received in a light receptacle such as an incandescent light, light receptacle. The electrical interface includes an electrical contact that electrically engages and receives AC power from an electrical contact of the light receptacle. The fixed appliance 4704 further includes a non-battery back light source(s) 4016 that is powered by the power received by the electrical contact of the adapter 4712. The fixed appliance 4704 further includes a flexible mechanical interface 4720 that mechanically engages a mechanical interface of the portable appliance 4708. The portable appliance 4708 includes a light source(s) 4724 and a rechargeable battery(s).

A user mechanically connects the adapter 4712 to a light receptacle. The electrical contact of the adapter 4712 electrically contacts and electrically communicates with the electrical contact of the light receptacle. When AC power is provided to the light receptacle, for example, when a light switch in the electrical path to the light receptacle is placed in a closed position by a user, the electrical contact of the adapter 4712 receives AC power. The received AC power provides power for powering the non-battery backed light source(s) 4716 and the light source(s) 4724. The received AC power also provides power for maintaining the charge state of the rechargeable battery(s). When the portable appliance 4708 is disengaged from the flexible mechanical interface 4720, the rechargeable battery(s) provides power for powering the light source(s) 4724.

With respect to FIG. 48, a pendant light 4800 includes a fixed appliance 4804 having an adapter 4808 as substantially described above in connection with the adapter 4712 of FIG. 47. The fixed appliance 4804 also includes a non-battery backed light source(s) 4812 disposed within a light management system 4816 and a flexible mechanical interface 4820 as described above. The fixed appliance 4804 is affixed to the light receptacle via the adapter 4808 and receives AC power as described above. The light management system 4816 diffuses light emitted by the non-battery backed light source(s) 4812 to produce an area light.

In FIG. 49, a pendant light 4900 includes a portable appliance 4904 and a passive appliance 4908. The portable appliance 4904 includes light source(s), a rechargeable battery(s), and a mechanical interface 4916 for attaching the portable appliance 4904 to a surface such as a ceiling or wall. The passive appliance 4908 includes a light management system 4920. The portable and passive appliances 4904 and 4908 electrically and mechanically engage as described above. The pendant light 4900 is well-suited for being affixed to ceiling that otherwise does not have a light receptacle.

Figure 50B:
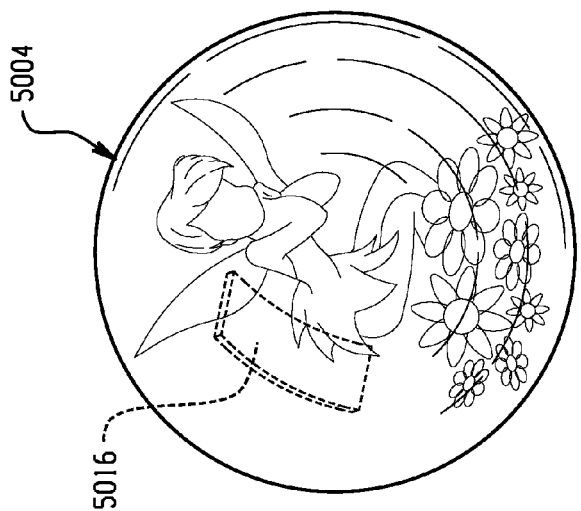
FIGS. 50A and 50 B illustrate a light appliance.
Figure 50A:
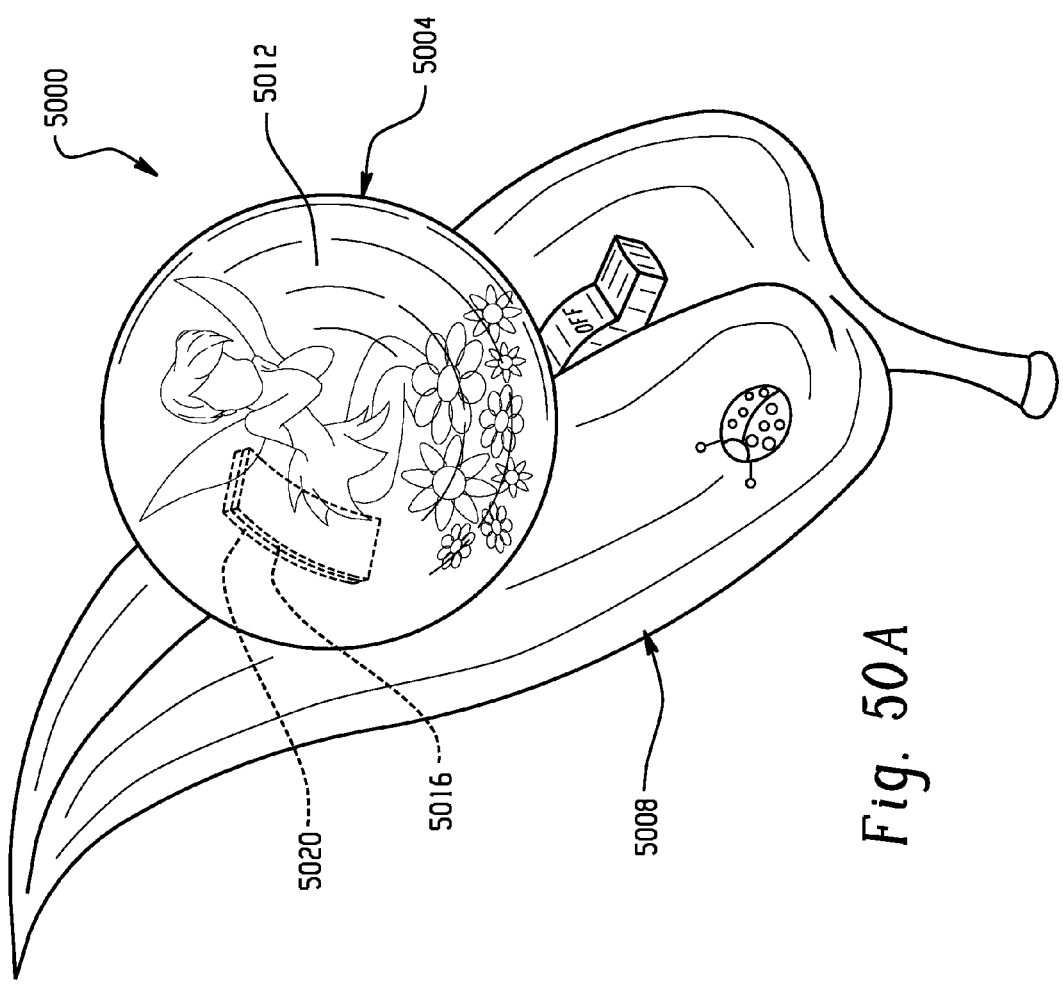

FIG. 50 illustrate a lighting appliance 5000 having a portable appliance 5004 and a passive appliance 5008. The portable appliance 5004 includes a rechargeable battery(s) and a light source(s) 5012. The portable appliance 5004 also has a mechanical interface such as a magnet 5016. The passive appliance 5008 includes a ferromagnetic region 5020 for magnetically engaging the magnet 5016. When the magnet 5016 of the portable appliance 5004 is engaged with the ferromagnetic region 5020, a switch such as a magnetic of the portable appliance 5004 turns off the light source(s) 5012. When the magnet 5016 of the portable appliance 5004 is removed from the ferromagnetic region 5020, the switch turns the light source(s) 5012 on. As such, the portable appliance 5004 can be removed from the passive appliance 5008 and used as a hand-held or other light device. The portable appliance 5004 can be adapted to engage a fixed appliance in order to charge the rechargeable battery(s).

Figure 51:
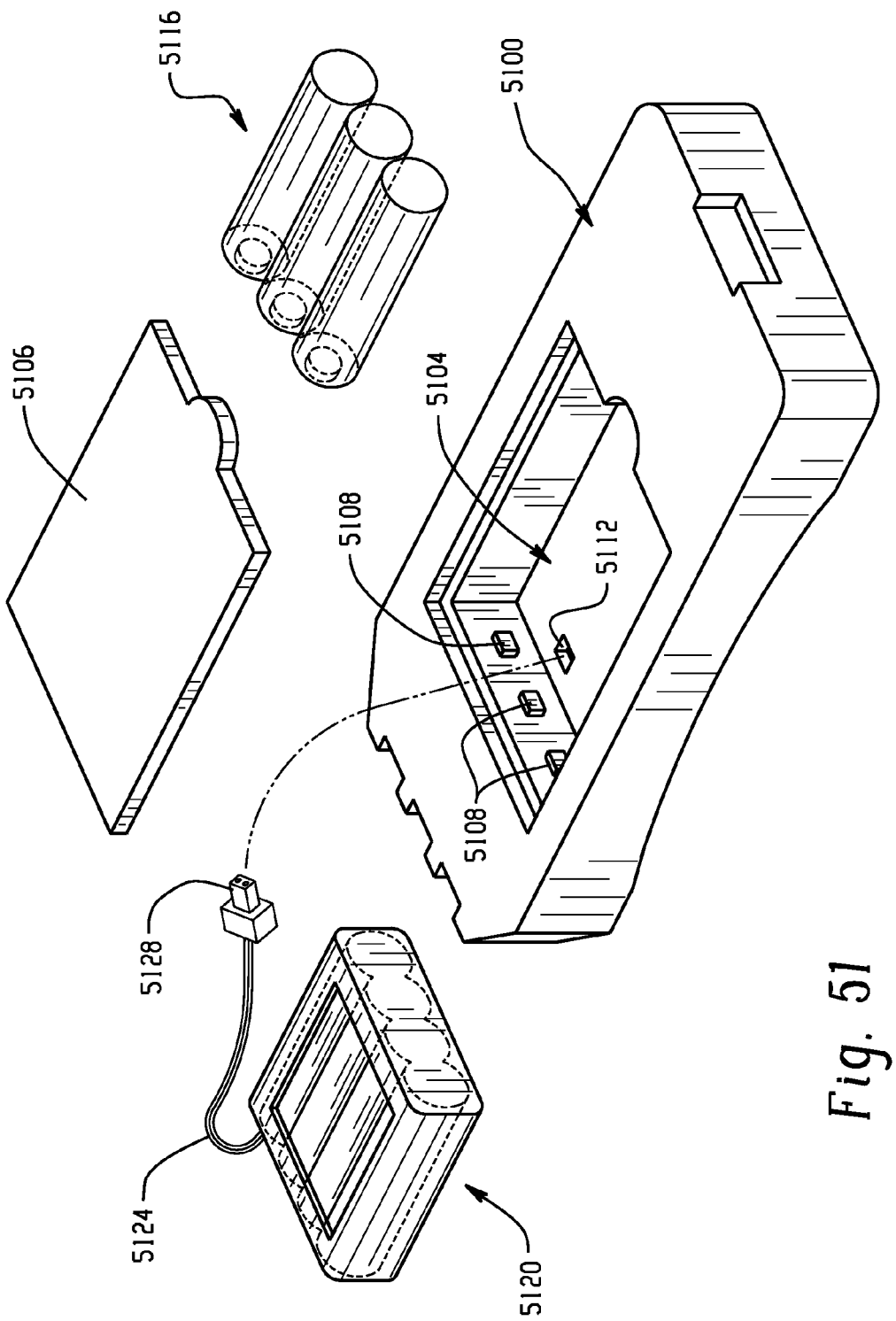
FIG. 51 illustrates a portable appliance.

FIG. 51 illustrates a portable appliance 5100 having a battery-receiving region 5104. It is to be appreciated that a fixed appliance may also include the battery-receiving region 5104. First and second sets of electrical contacts 5108 and 5112 are disposed in the battery-receiving region 5104. It is to be appreciated that the illustrated positioning of the electrical contacts in the battery-receiving region 5104 is for explanatory purposes and is not limiting. The portable appliance 5100 also includes electrical and mechanical interfaces that electrically and mechanically engage electrical and mechanical interfaces of a fixed appliance as described above and a battery-receiving region cover 5104.

In one non-limiting implementation, the battery-receiving region 5104 is suitably dimensioned to receive AA sized batteries. As such, the battery-receiving region 5104 may receive three individual AA sized batteries such as those illustrated at 5116 using the first set of electrical contacts 5108. In one instance, the user may elect to insert three individual non-rechargeable AA sized batteries, while in another instance the user may elect to insert three individual rechargeable AA sized batteries. The first set of electrical contacts 5108 includes separate pairs of electrical contacts for electrically engaging the electrical contacts of the individual batteries.

In another example, the battery-receiving region 5104 may receive three AA sized batteries incorporated into a unitary battery pack using the first set of electrical contacts 5112. A suitable battery pack includes three AA sized rechargeable batteries electrically in series and two electrical contacts for electrical communication with complementary electrical contacts. Such a battery pack is shown at 5120 and includes two electrically conductive wires 5124 having first ends respectively connected to the two electrical contacts and second ends connected to a connector that electrically engages and communicates with the electrical contacts 5112 of the portable appliance 5100.

It is to be appreciated that the individual batteries 5116 and the battery pack 5120 occupy substantially the same volume within the battery-receiving region 5104. In addition, in other implementations the battery-receiving region 5104 is suitably dimensioned or adapted to receive other sized batteries and/or number of batteries.

A user installs the battery pack 5120 in the battery-receiving region 5104. This includes electrically engaging the electrical contacts of the battery-pack with the second set of electrical contacts 5112. The portable device 5100 can then be inserted into a fixed appliance such as the fixed appliances as described herein. When AC power is available to the fixed appliance, AC power received by the fixed appliance is used to power the portable appliance 5100. The AC power may also be used by a battery charger of the fixed appliance to maintain the charge state of the rechargeable batteries of the battery pack. When AC power is unavailable, for example, during an AC power outage, the batteries in the battery pack provide the power that powers the portable appliance 5100. Similarly, when the portable appliance 5100 is removed from the fixed appliance, the batteries in the battery pack provide the power that powers the portable appliance 5100.

Under conditions in which suitable power is unavailable from the fixed appliance and the batteries in the battery pack, the user may advantageously replace the battery pack as described next. In one instance, the user may physically and electrically remove the battery pack from the portable appliance 5100 and electrically engage a set of individual non-rechargeable batteries so that the electrical contacts of each non-rechargeable battery electrically engage corresponding electrical contacts from the first set of electrical contacts 5108. These non-rechargeable batteries provide the power that powers the portable appliance 5100. Alternatively, the user can insert individual rechargeable batteries as just described. Alternatively, the user may insert a second, charged battery pack via the second set of electrical contacts 5112. Thus, if the batteries in the battery pack drain to a level that produces an undesired light output, for example, when using the portable appliance 5100 outside of the fixed appliance for a relatively long time period, the user may remove the battery pack and use a set of individual non-rechargeable batteries, a set of individual rechargeable batteries, or a spare charged battery pack.

Various auxiliary appliances are contemplated. For example, the auxiliary appliance may include radios, battery chargers, clocks, powered USB ports, desired domestic or other appliances, and the like.

It is to be appreciated that the lighting appliance described herein can also be used in a motorized vehicle such as a car, a boat, a RV, and the like. For instance, the lighting appliance can be used in connection with a glove compartment light. In this instance, the glove compartment light includes a battery backed light source and a secondary battery. The vehicle's battery provides power for charging the secondary battery and illuminating the light source. The secondary battery powers the light source of the glove compartment light when the vehicle's battery is unable to provide such power. This includes situations in which the vehicle's battery no longer holds a suitable charge or is removed from the vehicle and/or when the glove compartment light is configured as a removable light source and is removed from its holder, and/or in other situations.

The invention has been described with reference to the preferred embodiments. Of course, modifications and alterations will occur to others upon reading and understanding the preceding description. It is intended that the invention be construed as including all such modifications and alterations insofar as they come within the scope of the appended claims.

What is claimed is:

1. A reversible battery cartridge, comprising:
   a first region that receives a primary battery;
   a second region opposite the first region that receives a secondary battery; and
   first, second, and third electrical contacts, wherein the first and the second electrical contacts electrically communicates with the primary battery inserted in the first region and the second and third electrical contacts electrically communicates with the secondary battery inserted in the second region.

2. The reversible battery pack of claim 1, wherein the first electrical contact electrically communicates with a positive terminal of the primary battery, the third electrical contact electrically communicates with a positive terminal of the secondary battery, and the second electrical contact electrically communicates with the negative terminals of the primary and secondary batteries.

3. The reversible battery pack of claim 1, wherein the first electrical contact electrically communicates with a negative terminal of the primary battery, the third electrical contact electrically communicates with a negative terminal of the secondary battery, and the second electrical contact electrically communicates with the positive terminals of the primary and secondary batteries.

4. The reversible battery pack of claim 1, wherein the first, second and third electrical contacts are arranged with respect to each other so that rotating the reversible battery pack alternately aligns the electrical contacts for electrical communication with the primary battery or the secondary battery.

5. The reversible battery pack of claim 1, wherein the first, second, and third electrical contacts are arranged so that either the first and second or the second and third align with complementary electrical contacts in a battery receiving region of a lighting appliance.

6. The reversible battery pack of claim 1, wherein the reversible battery pack is connected to lamp circuitry of a lighting device.

7. The reversible battery pack of claim 6, the reversible battery pack having a first orientation that connects the primary battery to the lamp circuitry and a second orientation that connects the rechargeable battery to the lamp circuitry.

8. The reversible battery pack of claim 7, wherein the first orientation prevents the primary battery from receiving energy from a charger.

9. The reversible battery pack of claim 6, wherein the lighting device comprises a charger coupled to the reversible battery pack.

* * * * *